(12) United States Patent
Kusashima et al.

(10) Patent No.: US 11,490,401 B2
(45) Date of Patent: Nov. 1, 2022

(54) SYSTEM AND METHOD FOR TRANSMITTING CONTROL INFORMATION

(71) Applicant: Sony Corporation, Tokyo (JP)

(72) Inventors: Naoki Kusashima, Kanagawa (JP); Kazuyuki Shimezawa, Kanagawa (JP); Hiroki Matsuda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/473,623

(22) PCT Filed: Nov. 27, 2017

(86) PCT No.: PCT/JP2017/042395
§ 371 (c)(1),
(2) Date: Jun. 26, 2019

(87) PCT Pub. No.: WO2018/128031
PCT Pub. Date: Jul. 12, 2018

(65) Prior Publication Data
US 2019/0342896 A1    Nov. 7, 2019

(30) Foreign Application Priority Data

Jan. 6, 2017 (JP) .............................. JP2017-000865

(51) Int. Cl.
*H04W 72/12*  (2009.01)
*H04W 56/00*  (2009.01)
(Continued)

(52) U.S. Cl.
CPC ....... *H04W 72/121* (2013.01); *H04W 56/001* (2013.01); *H04W 72/042* (2013.01);
(Continued)

(58) Field of Classification Search
CPC .................................................. H04W 72/121
See application file for complete search history.

(56) References Cited

U.S. PATENT DOCUMENTS 10,271,181 B2 *  4/2019  Hu ......................... H04W 4/08
2011/0019615 A1  1/2011  Krco et al.
(Continued)

FOREIGN PATENT DOCUMENTS

| EP | 3 076 744 A1 | 10/2016 |
| KR | 2016-0042914 A | 4/2016 |

(Continued)

OTHER PUBLICATIONS

Machine language translation of WO 2018/120156.*
(Continued)

*Primary Examiner* — Edan Orgad
*Assistant Examiner* — Won Tae C Kim
(74) *Attorney, Agent, or Firm* — Xsensus LLP

(57) ABSTRACT

[Object] To provide a mechanism that makes it possible to reduce overhead of control information and flexibly control terminal devices.

[Solution] There is provided a base station device including a transmission processing unit configured to transmit first control information including information specific to a terminal group, to the terminal group including one or more terminal devices, and transmit second control information to the terminal group on a basis of the information specific to the terminal group.

9 Claims, 27 Drawing Sheets

(51) Int. Cl.
H04W 72/04 (2009.01)
H04W 74/08 (2009.01)
H04W 88/02 (2009.01)
H04W 88/12 (2009.01)

(52) U.S. Cl.
CPC ..... H04W 72/046 (2013.01); H04W 74/0833 (2013.01); H04W 88/02 (2013.01); H04W 88/12 (2013.01)

(56) References Cited

U.S. PATENT DOCUMENTS

| | | | | |
|---|---|---|---|---|
| 2013/0343307 | A1* | 12/2013 | Desai | H04W 74/04 370/329 |
| 2014/0128085 | A1* | 5/2014 | Charbit | H04L 5/00 455/450 |
| 2014/0161034 | A1 | 6/2014 | Han et al. | |
| 2016/0234736 | A1* | 8/2016 | Kubota | H04W 48/12 |
| 2016/0269160 | A1* | 9/2016 | Noh | H04L 5/0048 |
| 2019/0289639 | A1* | 9/2019 | Frenger | H04W 72/046 |
| 2020/0170038 | A1* | 5/2020 | Park | H04L 27/26 |

FOREIGN PATENT DOCUMENTS

| | | |
|---|---|---|
| WO | 2016/119148 A1 | 8/2016 |
| WO | WO-2018120156 A1 * | 7/2018 ............ H04W 48/10 |

OTHER PUBLICATIONS

LG Electronics, et al., "WF on System Information Delivery", 3GPP TSG RAN1 #87, R1-163591, 3 Pages total, (Nov. 14-18, 2016).
Interdigital Communications, "System Information Acquisition for New Radio Access", 3 Pages total, (Oct. 10-15, 2016).
International Search Report and Written Opinion dated Jan. 30, 2018 for PCT/JP2017/042395 filed on Nov. 27, 2017, 9 pages including English Translation of the International Search Report.
Ericsson, "Requirements for System Information distribution", 3GPP TSG-RAN WG2 Meeting No. 94 Tdoc R2-164006, Nanjing, P.R. China, May 23-27, 2016, pp. 1-4.
3GPP, "3rd Generation Partnership Project; Technical Specification Group Radio Access Network; Study on Scenarios and Requirements for Next Generation Access Technologies", 3GPP TR 38.913 V0.3.0, Release 14, Mar. 2016, pp. 1-30.
Ericsson, "Basic access configuration acquisition principles for NR", 3GPP TSG-RAN WG2 Meeting No. 96 Tdoc R2-168298, Reno, Nevada, USA, Nov. 14-18, 2016, pp. 1-2.
Ericsson, "Content and distribution of minimum SI", 3GPP TSG-RAN WG2 Meeting No. 96 Tdoc R2-168287, Reno, Nevada, USA, Nov. 14-18, 2016, pp. 1-6.
Catt, "On-demand system information delivery mechanism", 3GPP TSG-RAN WG2 Meeting No. 96 R2-167960, Reno, Nevada, USA, Nov. 14-18, 2016, pp. 1-4.
Ericsson, "On demand distribution of SI", 3GPP TSG-RAN WG2 Meeting No. 96 Tdoc R2-168289, Reno, Nevada, USA, Nov. 14-18, 2016, pp. 1-4.
Office Action dated Jan. 12, 2021, in corresponding Japanese patent Application No. 2017-000865, 6 pages.
Gemalto N V: "System information for NR including ID and version tag". 3GPP Draft; R2-166132. 3rd Generation Partnership Project (3GPP). Mobile Competence Centre ; 650, Route Des Lucioles ; F-06921 Sophia-Antipolis Cedex; France; vol. RAN HG2, No. Kaohsiung, Taiwan:Oct. 10, 2016-Oct. 14, 2016,Oct. 9, 2016 (Oct. 9, 2016), XP051150750,Retrieved from the Internet: URL :http://www.3gpp.org/ftp/Meetings_3GPP_SYNC/RAN2/Docs/[retrieved on Oct. 9, 2016].
Huawei Hisilicon: "Discussion on search space design for DL control channels",3GPP DRAFT; RI-1611211 3rd Generation Partnership Project (3GPP). Mobile Competence Centre ; 650, Route Des Lucioles ; F-06921 Sophia-Antipolis Cedex; France; vol. RAN HG1, No. Reno. USA; Nov. 14, 2016-Nov. 18, 2016; Nov. 13, 2016 (Nov. 13, 2016), XP051175192, Retrieved from the Internet :URL : http ://www.3gpp.org/ftp/Meetings_3GPP_SYNC/RANI/Docs/ [retrieved on Nov. 13, 2016].
Qualcomm Incorporated: "Multi-beam PBCH design", 3GPP Draft; RI-1612028_Multi-Beam PBCH Design. 3rd Generation Partnership Project(3GPP), Mobile Competence Centre ; 650, Route Des Lucioles ; F-06921Sophia-Antipolis Cedex ; France; vol. RAN WG1, No. Reno, NV, U.S.A.; Nov. 14, 2016-Nov. 18, 2016,Nov. 13, 2016 (Nov. 13, 2016), XP051175990, Retrieved from the Internet : URL:http://www.3gpp.org/ftp/Meetings_3GPP_SYNC/RANI/Docs/ [retrieved on Nov. 13, 2016].
Samsung: "System Information Signalling in NR",3GPP Draft; R2-162215 System Information Signaling in NR. 3rd Generation Partnership Project (3GPP), Mobile Competence Centre ; 650, Route Des Lucioles ; F-06921 Sophia-Antipolis Cedex; France; vol. RAN WG2, No. Dubrovnik, Croatia; Apr. 11, 2016-Apr. 15, 2016 Mar. 31, 2016 (Mar. 31, 2016), XP051081924, Retrieved from the Internet :URL: http://www.3gpp.org/ftp/tsg_ran/WG2_RL2/TSGR2_93bis/Docs/[retrieved on Mar. 31, 2016].
Zte et al. "Issues Related to NR-PBC", 3GPP TSG RAN WG1 Meeting #87, R1-1611443, Nov. 14-18, 2016, total 3 pages, Reno, USA.

* cited by examiner

FIG. 5

| | SUB CARRIER INTERVAL | MAXIMUM BANDWIDTH OF COMPONENT CARRIER | CP LENGTH TYPE | NUMBER OF SYMBOLS PER SUB FRAME | SUB FRAME LENGTH | WIRELESS FRAME LENGTH | NUMBER OF SUB CARRIERS PER RESOURCE BLOCK IN NR CELL |
|---|---|---|---|---|---|---|---|
| PARAMETER SET 0 | 15 kHz | 20MHz | TYPE 1 | 14 | 1ms | 10ms | 12 |
| PARAMETER SET 1 | 7.5 kHz | 1.4MHz | TYPE 1 | 70 | 10ms | 10ms | 24 |
| PARAMETER SET 2 | 30 kHz | 80MHz | TYPE 1 | 7 | 0.25ms | 10ms | 6 |
| PARAMETER SET 3 | 15 kHz | 20MHz | TYPE 2 | 12 | 1ms | 10ms | 12 |
| ... | ... | ... | ... | ... | ... | ... | ... |

SYSTEM AND METHOD FOR TRANSMITTING CONTROL INFORMATION

CROSS-REFERENCE TO RELATED APPLICATIONS

The present application is based on PCT filing PCT/JP2017/042395, filed Nov. 27, 2017, which claims priority to JP 2017-000865, filed Jan. 6, 2017, the entire contents of each are incorporated herein by reference.

TECHNICAL FIELD

The present disclosure relates to a base station device, a terminal device, a method, and a recording medium.

BACKGROUND ART

Wireless access schemes and wireless networks of cellular mobile communication (hereinafter also referred to as Long Term Evolution (LTE), LTE-Advanced (LTE-A), LTE-Advanced Pro (LTE-A Pro), New Radio (NR), New Radio Access Technology (NRAT), Evolved Universal Terrestrial Radio Access (EUTRA), or Further EUTRA (FEUTRA)) are under review in 3rd Generation Partnership Project (3GPP). Further, in the following description, LTE includes LTE-A, LTE-A Pro, and EUTRA, and NR includes NRAT and FEUTRA. In LTE and NR, a base station device (base station) is also referred to as an evolved Node B (eNodeB), and a terminal device (a mobile station, a mobile station device, or a terminal) is also referred to as a user equipment (UE). However, the mobile station is also referred to as gNodeB or gNB. LTE and NR are cellular communication systems in which a plurality of areas covered by a base station device is arranged in a cell form. A single base station device may manage a plurality of cells.

NR is a different Radio Access Technology (RAT) from LTE as a wireless access scheme of the next generation of LTE. NR is an access technology capable of handling various use cases including Enhanced Mobile broadband (eMBB), Massive Machine Type Communications (mMTC), and ultra reliable and Low Latency Communications (URLLC). NR is reviewed for the purpose of a technology framework corresponding to use scenarios, request conditions, placement scenarios, and the like in such use cases. The details of the scenarios and the request conditions of the NOMA technology are disclosed in Non-Patent Literature 1.

The wireless access schemes use system information that is setting broadcasted from a base station device to a plurality of terminal devices in a cell. The system information includes at least information used for initial connection to the cell, and information related to cell selection. Since the setting is commonly notified to the terminal devices, it is possible to reduce overhead of control information, in comparison with a case where setting is independently notified to each terminal device. Details of the system information are disclosed in Non-Patent Literature 2.

CITATION LIST

Non-Patent Literature

Non-Patent Literature 1: 3rd Generation Partnership Project; Technical Specification Group Radio Access Network; Study on Scenarios and Requirements for Next Generation Access Technologies; (Release 14), 3GPP TR 38.913 V0.3.0 (2016-03). <http://www.3gpp.org/ftp/Specs/archive/38_series/38.913/38913-030.zip>

Non-Patent Literature 2: R2-164006, "Requirements for System Information distribution", Ericsson, RAN2 #94, May 2016. <http://www.3gpp.org/ftp/tsg_ran/WG2_RL2/TSGR2_94/Docs/R2-164006.zip>

DISCLOSURE OF INVENTION

Technical Problem

Typically, in a wireless access technology, transmittance of system information that is common to a plurality of terminal devices contributes to reduction in overhead of control information. However, this makes it difficult to flexibly control each terminal device. On other hand, transmittance of system information specific to a terminal device makes it easy to perform control flexibly, whereas this causes increase in overhead.

Accordingly, the present disclosure provides a mechanism that makes it possible to reduce overhead of control information and flexibly control terminal devices.

Solution to Problem

According to the present disclosure, there is provided a base station device including a transmission processing unit configured to transmit first control information including information specific to a terminal group, to the terminal group including one or more terminal devices, and transmit second control information to the terminal group on the basis of the information specific to the terminal group.

In addition, according to the present disclosure, there is provided a terminal device including a reception processing unit configured to receive first control information that includes information specific to a terminal group and that has been transmitted to the terminal group to which one or more terminal devices including the own terminal device belong, and receive second control information transmitted to the terminal group, on the basis of the information specific to the terminal group.

In addition, according to the present disclosure, there is provided a method to be executed by a processor, the method including: transmitting first control information including information specific to a terminal group, to the terminal group including one or more terminal devices; and transmitting second control information to the terminal group on the basis of the information specific to the terminal group.

In addition, according to the present disclosure, there is provided a method to be executed by a processor, the method including: receiving first control information that includes information specific to a terminal group and that has been transmitted to the terminal group to which one or more terminal devices including an own terminal device belong; and receiving second control information transmitted to the terminal group, on the basis of the information specific to the terminal group.

In addition, according to the present disclosure, there is provided a recording medium having a program recorded thereon, the program causing a computer to function as a transmission processing unit configured to transmit first control information including information specific to a terminal group, to the terminal group including one or more terminal devices, and transmit second control information to the terminal group on the basis of the information specific to the terminal group.

In addition, according to the present disclosure, there is provided a recording medium having a program recorded thereon, the program causing a computer to function as a reception processing unit configured to receive first control information that includes information specific to a terminal group and that has been transmitted to the terminal group to which one or more terminal devices including an own terminal device belong, and receive second control information transmitted to the terminal group, on the basis of the information specific to the terminal group.

According to the present disclosure, first control information and second control information are transmitted to a terminal group to which one or more terminal devices belong. Therefore, it is possible for a base station device to notify the plurality of terminal devices of control information that is common to the terminal group, through one-time transmission. Therefore, it is possible to reduce overhead of control information in comparison with a case where control information is notified to each terminal device. In addition, it is also possible to perform control more flexibly in comparison with a case where the same control information is transmitted to all the terminal devices.

Advantageous Effects of Invention

As described above, the present disclosure provides the mechanism that makes it possible to reduce overhead of control information and flexibly control terminal devices. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a diagram illustrating examples of parameter sets related to a transmission signal in an NR cell.

MODE(S) FOR CARRYING OUT THE INVENTION

Figure 1:
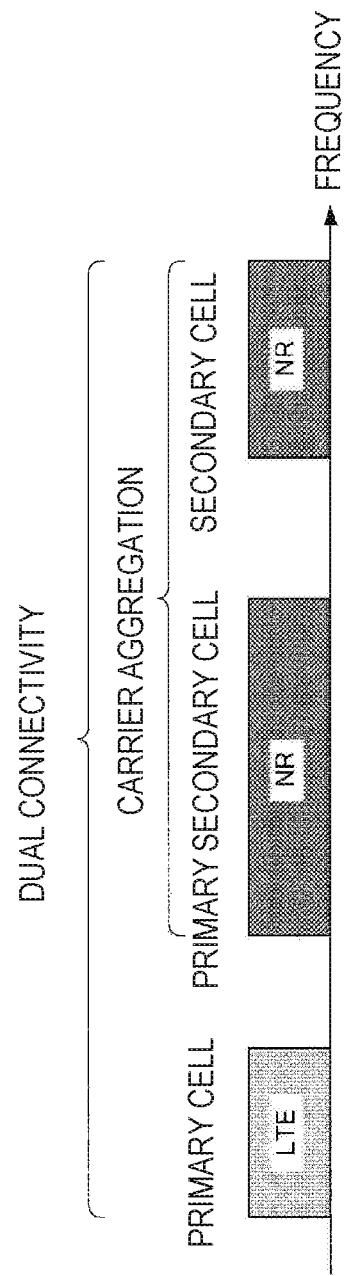
FIG. 1 is a diagram illustrating an example of setting of a component carrier according to a present embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted. In addition, technologies, functions, methods, configurations, and procedures to be described below and all other descriptions can be applied to LTE and NR unless particularly stated otherwise.

Note that the description will be made in the following order.
1. Introduction
2. Technical features
3. Application examples
4. Conclusion

1. INTRODUCTION

<Wireless Communication System in the Present Embodiment>

In the present embodiment, a wireless communication system includes at least a base station device 1 and a terminal device 2. The base station device 1 can accommodate multiple terminal devices. The base station device 1 can be connected with another base station device by means of an X2 interface. Further, the base station device 1 can be connected to an evolved packet core (EPC) by means of an S1 interface. Further, the base station device 1 can be connected to a mobility management entity (MME) by means of an S1-MME interface and can be connected to a serving gateway (S-GW) by means of an S1-U interface. The S1 interface supports many-to-many connection between the MME and/or the S-GW and the base station device 1. Further, in the present embodiment, the base station device 1 and the terminal device 2 each support LTE and/or NR.

<Wireless Access Technology According to Present Embodiment>

In the present embodiment, the base station device 1 and the terminal device 2 each support one or more wireless access technologies (RATs). For example, an RAT includes LTE and NR. A single RAT corresponds to a single cell (component carrier). That is, in a case in which a plurality of RATs is supported, the RATs each correspond to different cells. In the present embodiment, a cell is a combination of a downlink resource, an uplink resource, and/or a sidelink. Further, in the following description, a cell corresponding to LTE is referred to as an LTE cell and a cell corresponding to NR is referred to as an NR cell.

Downlink communication is communication from the base station device 1 to the terminal device 2. Downlink transmission is transmission from the base station device 1 to the terminal device 2 and is transmission of a downlink physical channel and/or a downlink physical signal. Uplink communication is communication from the terminal device 2 to the base station device 1. Uplink transmission is transmission from the terminal device 2 to the base station device 1 and is transmission of an uplink physical channel and/or an uplink physical signal. Sidelink communication is communication from the terminal device 2 to another terminal device 2. Sidelink transmission is transmission from the terminal device 2 to another terminal device 2 and is transmission of a sidelink physical channel and/or a sidelink physical signal.

The sidelink communication is defined for contiguous direct detection and contiguous direct communication between terminal devices. The sidelink communication, a frame configuration similar to that of the uplink and downlink can be used. Further, the sidelink communication can be restricted to some (sub sets) of uplink resources and/or downlink resources.

The base station device 1 and the terminal device 2 can support communication in which a set of one or more cells is used in a downlink, an uplink, and/or a sidelink. A set of a plurality of cells or communication by a set of a plurality of cells is also referred to as carrier aggregation or dual connectivity. The details of the carrier aggregation and the dual connectivity will be described below. Further, each cell uses a predetermined frequency bandwidth. A maximum value, a minimum value, and a settable value in the predetermined frequency bandwidth can be specified in advance.

FIG. 1 is a diagram illustrating an example of setting of a component carrier according to the present embodiment. In the example of FIG. 1, one LTE cell and two NR cells are set. One LTE cell is set as a primary cell. Two NR cells are set as a primary secondary cell and a secondary cell. Two NR cells are integrated by the carrier aggregation. Further, the LTE cell and the NR cell are integrated by the dual connectivity. Note that the LTE cell and the NR cell may be integrated by carrier aggregation. In the example of FIG. 1, NR may not support some functions such as a function of performing standalone communication since connection can be assisted by an LTE cell which is a primary cell. The function of performing standalone communication includes a function necessary for initial connection.

Figure 2:
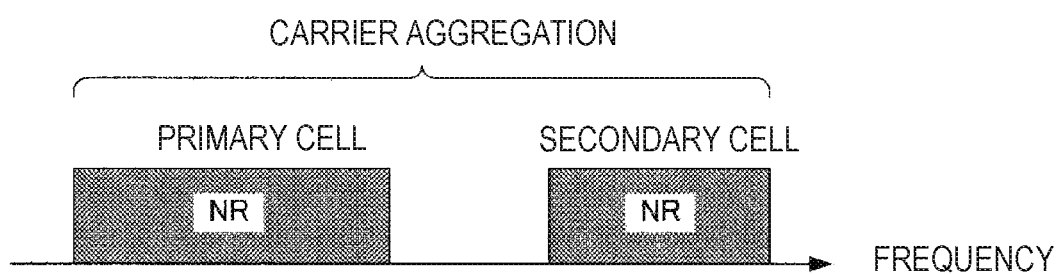
FIG. 2 is a diagram illustrating an example of setting of a component carrier according to a present embodiment.

FIG. 2 is a diagram illustrating an example of setting of a component carrier according to the present embodiment. In the example of FIG. 2, two NR cells are set. The two NR cells are set as a primary cell and a secondary cell, respectively, and are integrated by carrier aggregation. In this case, when the NR cell supports the function of performing standalone communication, assist of the LTE cell is not necessary. Note that the two NR cells may be integrated by dual connectivity.

<Radio Frame Configuration in Present Embodiment>

In the present embodiment, a radio frame configured with 10 ms (milliseconds) is specified. Each radio frame includes two half frames. A time interval of the half frame is 5 ms. Each half frame includes 5 sub frames. The time interval of the sub frame is 1 ms and is defined by two successive slots. The time interval of the slot is 0.5 ms. An i-th sub frame in the radio frame includes a (2×i)-th slot and a (2×i+1)-th slot. In other words, 10 sub frames are specified in each of the radio frames.

Sub frames include a downlink sub frame, an uplink sub frame, a special sub frame, a sidelink sub frame, and the like.

The downlink sub frame is a sub frame reserved for downlink transmission. The uplink sub frame is a sub frame reserved for uplink transmission. The special sub frame includes three fields. The three fields are a Downlink Pilot Time Slot (DwPTS), a Guard Period (GP), and an Uplink Pilot Time Slot (UpPTS). A total length of DwPTS, GP, and UpPTS is 1 ms. The DwPTS is a field reserved for downlink transmission. The UpPTS is a field reserved for uplink transmission. The GP is a field in which downlink transmission and uplink transmission are not performed. Further, the special sub frame may include only the DwPTS and the GP or may include only the GP and the UpPTS. The special sub frame is placed between the downlink sub frame and the uplink sub frame in TDD and used to perform switching from the downlink sub frame to the uplink sub frame. The sidelink sub frame is a sub frame reserved or set for sidelink communication. The sidelink is used for contiguous direct communication and contiguous direct detection between terminal devices.

A single radio frame includes a downlink sub frame, an uplink sub frame, a special sub frame, and/or a sidelink sub frame. Further, a single radio frame includes only a downlink sub frame, an uplink sub frame, a special sub frame, or a sidelink sub frame.

A plurality of radio frame configurations is supported. The radio frame configuration is specified by the frame configuration type. The frame configuration type 1 can be applied only to FDD. The frame configuration type 2 can be applied only to TDD. The frame configuration type 3 can be applied only to an operation of a licensed assisted access (LAA) secondary cell.

In the frame configuration type 2, a plurality of uplink-downlink configurations is specified. In the uplink-downlink configuration, each of 10 sub frames in one radio frame corresponds to one of the downlink sub frame, the uplink sub frame, and the special sub frame. The sub frame 0, the sub frame 5 and the DwPTS are constantly reserved for downlink transmission. The UpPTS and the sub frame just after the special sub frame are constantly reserved for uplink transmission.

In the frame configuration type 3, 10 sub frames in one radio frame are reserved for downlink transmission. The terminal device 2 treats a sub frame by which PDSCH or a detection signal is not transmitted, as an empty sub frame. Unless a predetermined signal, channel and/or downlink transmission is detected in a certain sub frame, the terminal device 2 assumes that there is no signal and/or channel in the sub frame. The downlink transmission is exclusively occupied by one or more consecutive sub frames. The first sub frame of the downlink transmission may be started from any one in that sub frame. The last sub frame of the downlink transmission may be either completely exclusively occupied or exclusively occupied by a time interval specified in the DwPTS.

Further, in the frame configuration type 3, 10 sub frames in one radio frame may be reserved for uplink transmission. Further, each of 10 sub frames in one radio frame may correspond to any one of the downlink sub frame, the uplink sub frame, the special sub frame, and the sidelink sub frame.

The base station device 1 may transmit a downlink physical channel and a downlink physical signal in the DwPTS of the special sub frame. The base station device 1 can restrict transmission of the PBCH in the DwPTS of the special sub frame. The terminal device 2 may transmit uplink physical channels and uplink physical signals in the UpPTS of the special sub frame. The terminal device 2 can restrict transmission of some of the uplink physical channels and the uplink physical signals in the UpPTS of the special sub frame.

Note that a time interval in single transmission is referred to as a transmission time interval (TTI) and 1 ms (1 sub frame) is defined as 1 TTI in LTE.

<Frame Configuration of LTE in Present Embodiment>

Figure 3:
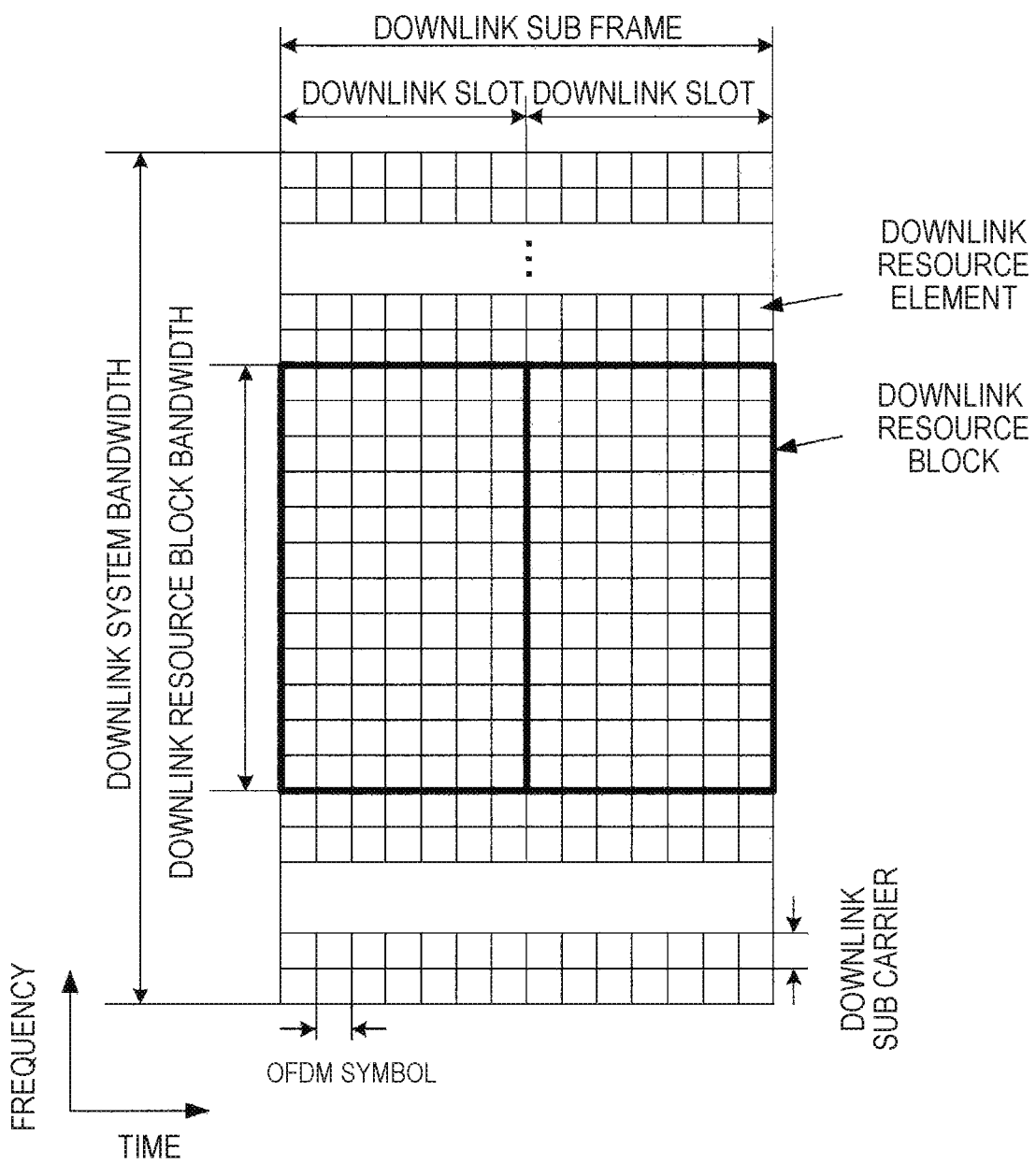
FIG. 3 is a diagram illustrating an example of a downlink sub frame of LTE according to the present embodiment.

FIG. 3 is a diagram illustrating an example of a downlink sub frame of LTE according to the present embodiment. The diagram illustrated in FIG. 3 is referred to as a downlink resource grid of LTE. The base station device 1 can transmit a downlink physical channel of LTE and/or a downlink physical signal of LTE in a downlink sub frame to the terminal device 2. The terminal device 2 can receive a downlink physical channel of LTE and/or a downlink physical signal of LTE in a downlink sub frame from the base station device 1.

Figure 4:
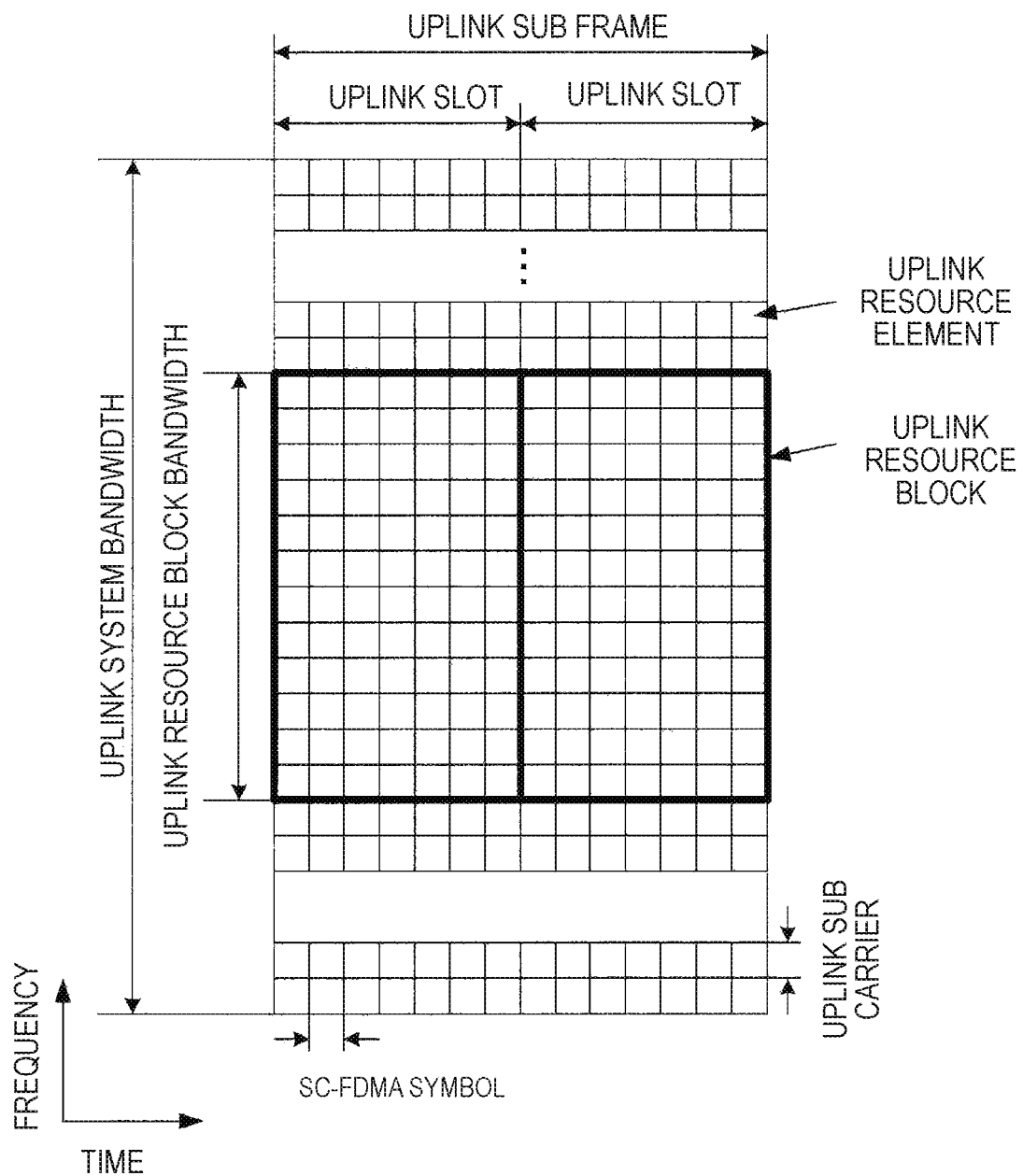
FIG. 4 is a diagram illustrating an example of an uplink sub frame of LTE according to the present embodiment.

FIG. 4 is a diagram illustrating an example of an uplink sub frame of LTE according to the present embodiment. The diagram illustrated in FIG. 4 is referred to as an uplink resource grid of LTE. The terminal device 2 can transmit an uplink physical channel of LTE and/or an uplink physical signal of LTE in an uplink sub frame to the base station device 1. The base station device 1 can receive an uplink physical channel of LTE and/or an uplink physical signal of LTE in an uplink sub frame from the terminal device 2.

In the present embodiment, the LTE physical resources can be defined as follows. One slot is defined by a plurality of symbols. The physical signal or the physical channel transmitted in each of the slots is represented by a resource grid. In the downlink, the resource grid is defined by a plurality of sub carriers in a frequency direction and a plurality of OFDM symbols in a time direction. In the uplink, the resource grid is defined by a plurality of sub carriers in the frequency direction and a plurality of SC-FDMA symbols in the time direction. The number of sub carriers or the number of resource blocks may be decided depending on a bandwidth of a cell. The number of symbols in one slot is decided by a type of cyclic prefix (CP). The type of CP is a normal CP or an extended CP. In the normal CP, the number of OFDM symbols or SC-FDMA symbols constituting one slot is 7. In the extended CP, the number of OFDM symbols or SC-FDMA symbols constituting one slot is 6. Each element in the resource grid is referred to as a resource element. The resource element is identified using an index (number) of a sub carrier and an index (number) of a symbol. Further, in the description of the present embodiment, the OFDM symbol or SC-FDMA symbol is also referred to simply as a symbol.

The resource blocks are used for mapping a certain physical channel (the PDSCH, the PUSCH, or the like) to resource elements. The resource blocks include virtual resource blocks and physical resource blocks. A certain physical channel is mapped to a virtual resource block. The virtual resource blocks are mapped to physical resource blocks. One physical resource block is defined by a predetermined number of consecutive symbols in the time domain. One physical resource block is defined from a predetermined number of consecutive sub carriers in the frequency domain. The number of symbols and the number of sub carriers in one physical resource block are decided on the basis of a parameter set in accordance with a type of CP, a sub carrier interval, and/or a higher layer in the cell. For example, in a case in which the type of CP is the normal CP, and the sub carrier interval is 15 kHz, the number of symbols in one physical resource block is 7, and the number of sub carriers is 12. In this case, one physical resource block includes (7×12) resource elements. The physical resource blocks are numbered from 0 in the frequency domain. Further, two resource blocks in one sub frame corresponding to the same physical resource block number are defined as a physical resource block pair (a PRB pair or an RB pair).

In each LTE cell, one predetermined parameter is used in a certain sub frame. For example, the predetermined parameter is a parameter (physical parameter) related to a transmission signal. Parameters related to the transmission signal include a CP length, a sub carrier interval, the number of symbols in one sub frame (predetermined time length), the number of sub carriers in one resource block (predetermined frequency band), a multiple access scheme, a signal waveform, and the like.

That is, In the LTE cell, a downlink signal and an uplink signal are each generated using one predetermined parameter in a predetermined time length (for example, a sub frame). In other words, in the terminal device 2, it is assumed that a downlink signal to be transmitted from the base station device 1 and an uplink signal to be transmitted to the base station device 1 are each generated with a predetermined time length with one predetermined parameter. Further, the base station device 1 is set such that a downlink signal to be transmitted to the terminal device 2 and an uplink signal to be transmitted from the terminal device 2 are each generated with a predetermined time length with one predetermined parameter.

<Frame Configuration of NR in Present Embodiment>

In each NR cell, one or more predetermined parameters are used in a certain predetermined time length (for example, a sub frame). That is, in the NR cell, a downlink signal and an uplink signal are each generated using or more predetermined parameters in a predetermined time length. In other words, in the terminal device 2, it is assumed that a downlink signal to be transmitted from the base station device 1 and an uplink signal to be transmitted to the base station device 1 are each generated with one or more predetermined parameters in a predetermined time length. Further, the base station device 1 is set such that a downlink signal to be transmitted to the terminal device 2 and an uplink signal to be transmitted from the terminal device 2 are each generated with a predetermined time length using one or more predetermined parameters. In a case in which the plurality of predetermined parameters is used, a signal generated using the predetermined parameters is multiplexed in accordance with a predetermined method. For example, the predetermined method includes Frequency Division Multiplexing (FDM), Time Division Multiplexing (TDM), Code Division Multiplexing (CDM), and/or Spatial Division Multiplexing (SDM).

In a combination of the predetermined parameters set in the NR cell, a plurality of kinds of parameter sets can be specified in advance.

FIG. 5 is a diagram illustrating examples of the parameter sets related to a transmission signal in the NR cell. In the example of FIG. 5, parameters of the transmission signal included in the parameter sets include a sub carrier interval, the number of sub carriers per resource block in the NR cell, the number of symbols per sub frame, and a CP length type. The CP length type is a type of CP length used in the NR cell. For example, CP length type 1 is equivalent to a normal CP in LTE and CP length type 2 is equivalent to an extended CP in LTE.

The parameter sets related to a transmission signal in the NR cell can be specified individually with a downlink and an uplink. Further, the parameter sets related to a transmission signal in the NR cell can be set independently with a downlink and an uplink.

Figure 6:
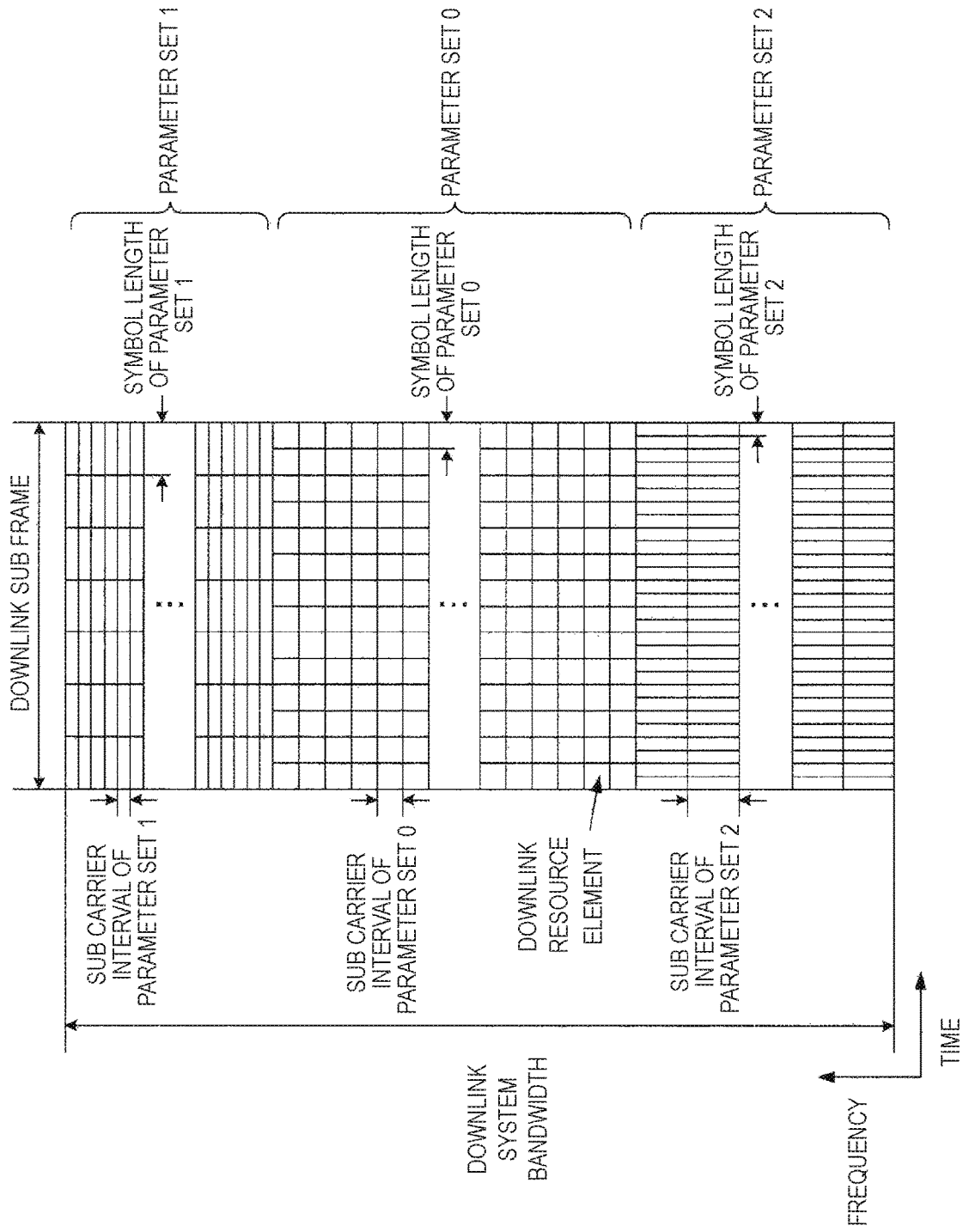
FIG. 6 is a diagram illustrating an example of an NR downlink sub frame of the present embodiment.

FIG. 6 is a diagram illustrating an example of an NR downlink sub frame of the present embodiment. In the example of FIG. 6, signals generated using parameter set 1, parameter set 0, and parameter set 2 are subjected to FDM in a cell (system bandwidth). The diagram illustrated in FIG. 6 is also referred to as a downlink resource grid of NR. The base station device 1 can transmit the downlink physical channel of NR and/or the downlink physical signal of NR in a downlink sub frame to the terminal device 2. The terminal device 2 can receive a downlink physical channel of NR and/or the downlink physical signal of NR in a downlink sub frame from the base station device 1.

Figure 7:
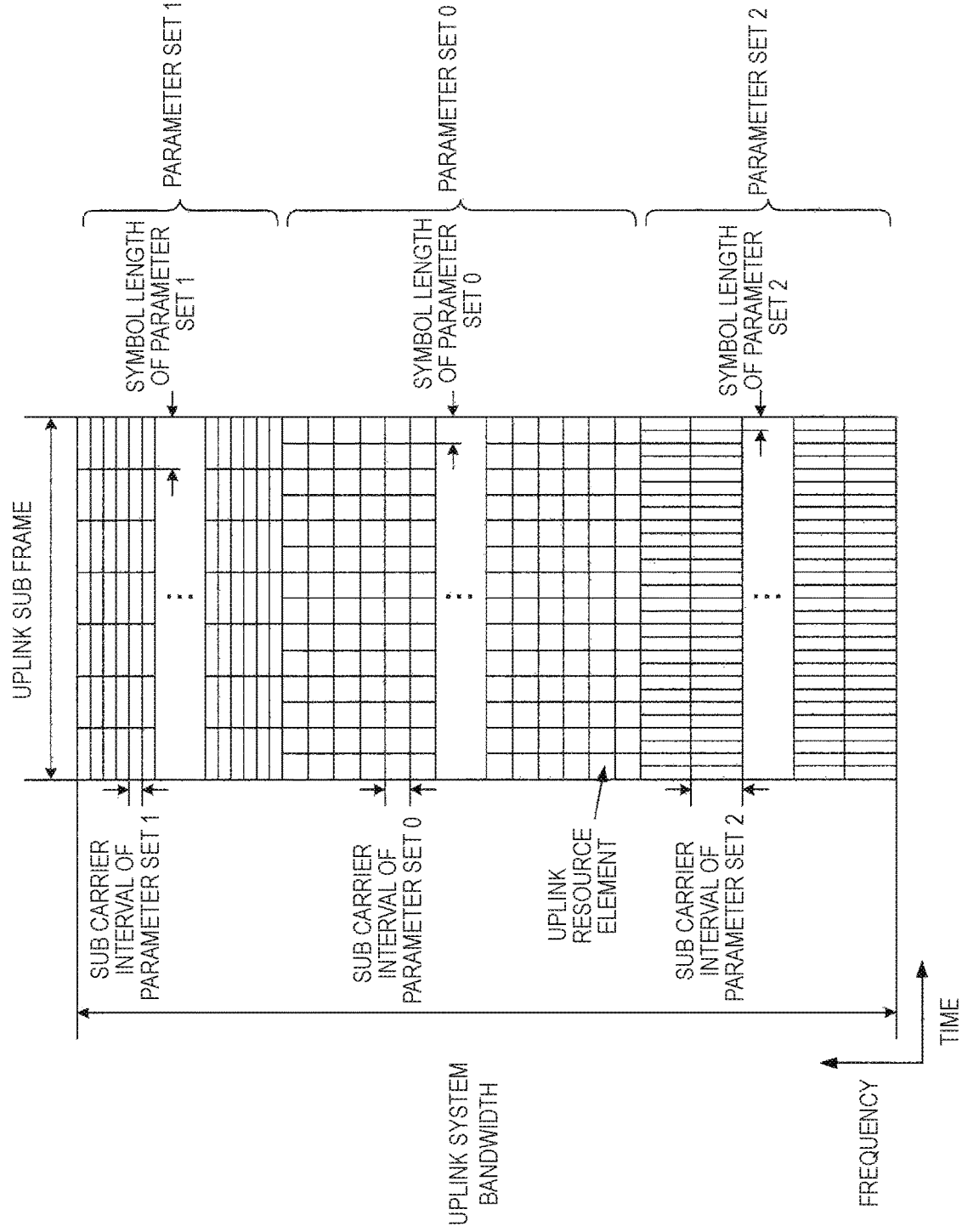
FIG. 7 is a diagram illustrating an example of an NR uplink sub frame of the present embodiment.

FIG. 7 is a diagram illustrating an example of an NR uplink sub frame of the present embodiment. In the example of FIG. 7, signals generated using parameter set 1, parameter set 0, and parameter set 2 are subjected to FDM in a cell (system bandwidth). The diagram illustrated in FIG. 7 is also referred to as an uplink resource grid of NR. The base station device 1 can transmit the uplink physical channel of NR and/or the uplink physical signal of NR in an uplink sub frame to the terminal device 2. The terminal device 2 can receive an uplink physical channel of NR and/or the uplink physical signal of NR in an uplink sub frame from the base station device 1.

<Antenna Port in Present Embodiment>

An antenna port is defined so that a propagation channel carrying a certain symbol can be inferred from a propagation channel carrying another symbol in the same antenna port. For example, different physical resources in the same antenna port can be assumed to be transmitted through the same propagation channel. In other words, for a symbol in a certain antenna port, it is possible to estimate and demodulate a propagation channel in accordance with the reference signal in the antenna port. Further, there is one resource grid for each antenna port. The antenna port is defined by the reference signal. Further, each reference signal can define a plurality of antenna ports.

The antenna port is specified or identified with an antenna port number. For example, antenna ports 0 to 3 are antenna ports with which CRS is transmitted. That is, the PDSCH transmitted with antenna ports 0 to 3 can be demodulated to CRS corresponding to antenna ports 0 to 3.

In a case in which two antenna ports satisfy a predetermined condition, the two antenna ports can be regarded as being a quasi co-location (QCL). The predetermined condition is that a wide area characteristic of a propagation channel carrying a symbol in one antenna port can be inferred from a propagation channel carrying a symbol in another antenna port. The wide area characteristic includes a delay dispersion, a Doppler spread, a Doppler shift, an average gain, and/or an average delay.

In the present embodiment, the antenna port numbers may be defined differently for each RAT or may be defined commonly between RATs. For example, antenna ports 0 to 3 in LTE are antenna ports with which CRS is transmitted. In the NR, antenna ports 0 to 3 can be set as antenna ports with which CRS similar to that of LTE is transmitted. Further, in NR, the antenna ports with which CRS is transmitted like LTE can be set as different antenna port numbers from antenna ports 0 to 3. In the description of the present embodiment, predetermined antenna port numbers can be applied to LTE and/or NR.

<Physical Channel and Physical Signal in Present Embodiment>

In the present embodiment, physical channels and physical signals are used.

The physical channels include a downlink physical channel, an uplink physical channel, and a sidelink physical channel. The physical signals include a downlink physical signal, an uplink physical signal, and a sidelink physical signal.

In LTE, a physical channel and a physical signal are referred to as an LTE physical channel and an LTE physical signal. In NR, a physical channel and a physical signal are referred to as an NR physical channel and an NR physical signal. The LTE physical channel and the NR physical channel can be defined as different physical channels, respectively. The LTE physical signal and the NR physical signal can be defined as different physical signals, respectively. In the description of the present embodiment, the LTE physical channel and the NR physical channel are also simply referred to as physical channels, and the LTE physical signal and the NR physical signal are also simply referred to as physical signals. That is, the description of the physical channels can be applied to any of the LTE physical channel and the NR physical channel. The description of the physical signals can be applied to any of the LTE physical signal and the NR physical signal.

<Downlink Physical Channel in Present Embodiment>

The PBCH is used to broadcast a master information block (MIB) which is broadcast information specific to a serving cell of the base station device 1. The PBCH is transmitted only through the sub frame 0 in the radio frame. The MIB can be updated at intervals of 40 ms. The PBCH is repeatedly transmitted with a cycle of 10 ms. Specifically, initial transmission of the MIB is performed in the sub frame 0 in the radio frame satisfying a condition that a remainder obtained by dividing a system frame number (SFN) by 4 is 0, and retransmission (repetition) of the MIB is performed in the sub frame 0 in all the other radio frames. The SFN is a radio frame number (system frame number). The MIB is system information. For example, the MIB includes information indicating the SFN.

A PCFICH is used for transmitting information related to the number of OFDM symbols used for transmitting a PDCCH. A region indicated by the PCFICH is also referred to as a PDCCH region. The information transmitted through the PCFICH is also referred to as a Control Format Indicator (CFI).

The PDCCH and the EPDCCH are used to transmit downlink control information (DCI). Mapping of an information bit of the downlink control information is defined as a DCI format. The downlink control information includes a downlink grant and an uplink grant. The downlink grant is also referred to as a downlink assignment or a downlink allocation.

The PDCCH is transmitted by a set of one or more consecutive control channel elements (CCEs). The CCE includes 9 resource element groups (REGs). An REG includes 4 resource elements. In a case in which the PDCCH is constituted by n consecutive CCEs, the PDCCH starts with a CCE satisfying a condition that a remainder after dividing an index (number) i of the CCE by n is 0.

The EPDCCH is transmitted by a set of one or more consecutive enhanced control channel elements (ECCEs). The ECCE is constituted by a plurality of enhanced resource element groups (EREGs).

The downlink grant is used for scheduling of the PDSCH in a certain cell. The downlink grant is used for scheduling of the PDSCH in the same sub frame as a sub frame in which the downlink grant is transmitted. The uplink grant is used for scheduling of the PUSCH in a certain cell. The uplink grant is used for scheduling of a single PUSCH in a fourth sub frame from a sub frame in which the uplink grant is transmitted or later.

A cyclic redundancy check (CRC) parity bit is added to the DCI. The CRC parity bit is scrambled using a radio network temporary identifier (RNTI). The RNTI is an identifier that can be specified or set in accordance with a purpose of the DCI or the like. The RNTI is an identifier specified in a specification in advance, an identifier set as information specific to a cell, an identifier set as information specific to the terminal device 2, or an identifier set as information specific to a group to which the terminal device 2 belongs. For example, in monitoring of the PDCCH or the EPDCCH, the terminal device 2 descrambles the CRC parity bit added to the DCI with a predetermined RNTI and identifies whether or not the CRC is correct. In a case in which the CRC is correct, the DCI is understood to be a DCI for the terminal device 2.

The PDSCH is used to transmit downlink data (a downlink shared channel (DL-SCH)). Further, the PDSCH is also used to transmit control information of a higher layer.

In the PDCCH region, a plurality of PDCCHs may be multiplexed according to frequency, time, and/or space. In the EPDCCH region, a plurality of EPDCCHs may be multiplexed according to frequency, time, and/or space. In the PDSCH region, a plurality of PDSCHs may be multiplexed according to frequency, time, and/or space. The PDCCH, the PDSCH, and/or the EPDCCH may be multiplexed according to frequency, time, and/or space.

<Downlink Physical Signal in Present Embodiment>

A synchronization signal is used for the terminal device 2 to obtain downlink synchronization in the frequency domain and/or the time domain. The synchronization signal includes a primary synchronization signal (PSS) and a secondary synchronization signal (SSS). The synchronization signal is placed in a predetermined sub frame in the radio frame. For example, in the TDD scheme, the synchronization signal is placed in the sub frames 0, 1, 5, and 6 in the radio frame. In the FDD scheme, the synchronization signal is placed in the sub frames 0 and 5 in the radio frame.

The PSS may be used for coarse frame/symbol timing synchronization (synchronization in the time domain) or identification of a cell identification group. The SSS may be used for more accurate frame timing synchronization, cell identification, or CP length detection. In other words, frame timing synchronization and cell identification can be performed using the PSS and the SSS.

The downlink reference signal is used for the terminal device 2 to perform propagation path estimation of the downlink physical channel, propagation path correction, calculation of downlink channel state information (CSI), and/or measurement of positioning of the terminal device 2.

The CRS is transmitted in the entire band of the sub frame. The CRS is used for receiving (demodulating) the PBCH, the PDCCH, the PHICH, the PCFICH, and the PDSCH. The CRS may be used for the terminal device 2 to calculate the downlink channel state information. The PBCH, the PDCCH, the PHICH, and the PCFICH are transmitted through the antenna port used for transmission of the CRS. The CRS supports the antenna port configurations of 1, 2, or 4. The CRS is transmitted through one or more of the antenna ports 0 to 3.

The URS associated with the PDSCH is transmitted through a sub frame and a band used for transmission of the PDSCH with which the URS is associated. The URS is used for demodulation of the PDSCH to which the URS is associated. The URS associated with the PDSCH is transmitted through one or more of the antenna ports 5 and 7 to 14.

The PDSCH is transmitted through an antenna port used for transmission of the CRS or the URS on the basis of the transmission mode and the DCI format. A DCI format 1A is used for scheduling of the PDSCH transmitted through an antenna port used for transmission of the CRS. A DCI format 2D is used for scheduling of the PDSCH transmitted through an antenna port used for transmission of the URS.

The DMRS associated with the EPDCCH is transmitted through a sub frame and a band used for transmission of the EPDCCH to which the DMRS is associated. The DMRS is used for demodulation of the EPDCCH with which the DMRS is associated. The EPDCCH is transmitted through an antenna port used for transmission of the DMRS. The DMRS associated with the EPDCCH is transmitted through one or more of the antenna ports 107 to 114.

The CSI-RS is transmitted through a set sub frame. The resources in which the CSI-RS is transmitted are set by the base station device 1. The CSI-RS is used for the terminal device 2 to calculate the downlink channel state information. The terminal device 2 performs signal measurement (channel measurement) using the CSI-RS. The CSI-RS supports setting of some or all of the antenna ports 1, 2, 4, 8, 12, 16, 24, and 32. The CSI-RS is transmitted through one or more of the antenna ports 15 to 46. Further, an antenna port to be supported may be decided on the basis of a terminal device capability of the terminal device 2, setting of an RRC parameter, and/or a transmission mode to be set.

Resources of the ZP CSI-RS are set by a higher layer. Resources of the ZP CSI-RS may be transmitted with zero output power. In other words, the resources of the ZP CSI-RS may transmit nothing. The ZP PDSCH and the EPDCCH are not transmitted in the resources in which the ZP CSI-RS is set. For example, the resources of the ZP CSI-RS are used for a neighbor cell to transmit the NZP CSI-RS. Further, for example, the resources of the ZP CSI-RS are used to measure the CSI-IM. Further, for example, the resources of the ZP CSI-RS are resources with which a predetermined channel such as the PDSCH is not transmitted. In other words, the predetermined channel is mapped (to be rate-matched or punctured) except for the resources of the ZP CSI-RS.

<Uplink Physical Signal in Present Embodiment>

The PUCCH is a physical channel used for transmitting uplink control information (UCI). The uplink control information includes downlink channel state information (CSI), a scheduling request (SR) indicating a request for PUSCH resources, and a HARQ-ACK to downlink data (a transport block (TB) or a downlink-shared channel (DL-SCH)). The HARQ-ACK is also referred to as ACK/NACK, HARQ feedback, or response information. Further, the HARQ-ACK to downlink data indicates ACK, NACK, or DTX.

The PUSCH is a physical channel used for transmitting uplink data (uplink-shared channel (UL-SCH)). Further, the PUSCH may be used to transmit the HARQ-ACK and/or the channel state information together with uplink data. Further, the PUSCH may be used to transmit only the channel state information or only the HARQ-ACK and the channel state information.

The PRACH is a physical channel used for transmitting a random access preamble. The PRACH can be used for the terminal device 2 to obtain synchronization in the time domain with the base station device 1. Further, the PRACH is also used to indicate an initial connection establishment procedure (process), a handover procedure, a connection re-establishment procedure, synchronization (timing adjustment) for uplink transmission, and/or a request for PUSCH resources.

In the PUCCH region, a plurality of PUCCHs is frequency, time, space, and/or code multiplexed. In the PUSCH region, a plurality of PUSCHs may be frequency, time, space, and/or code multiplexed. The PUCCH and the PUSCH may be frequency, time, space, and/or code multiplexed. The PRACH may be placed over a single sub frame or two sub frames. A plurality of PRACHs may be code-multiplexed.

<Uplink Physical Signal According to Present Embodiment>

An UL-DMRS relates to transmission of the PUSCH or the PUCCH. The UL-DMRS is multiplexed with the PUSCH or the PUCCH in a time division multiplexing manner. The base station device 1 may use the UL-DMRS to correct a propagation path of the PUSCH or the PUCCH. According to the present embodiment, transmission of the PUSCH includes transmission of the PUSCH multiplexed with the UL-DMRS. According to the present embodiment, transmission of the PUCCH includes transmission of the PUCCH multiplexed with the UL-DMRS.

An SRS does not relate to transmission of the PUSCH or the PUCCH. The base station device 1 may use the SRS for measuring an uplink channel state.

The SRS is transmitted by using a last symbol in an uplink sub frame. In other words, the SRS is placed in the last symbol in the uplink sub frame. With regard to a certain symbol of a certain cell, the terminal device 2 is capable of limiting concurrent transmission of the SRS, the PUCCH, the PUSCH, and/or the PRACH. In a certain uplink sub frame of a certain cell, the terminal device 2 is capable of transmitting the PUSCH and/or the PUCCH by using a symbol other than the last symbol in the uplink sub frame, and transmitting the SRS by using the last symbol in the uplink sub frame. In other words, in a certain uplink sub frame of a certain cell, the terminal device 2 is capable of transmitting the SRS, the PUSCH, and the PUCCH.

With regard to the SRS, a trigger type 0 SRS and a trigger type 1 SRS are defined as SRSs having different types of trigger. The trigger type 0 SRS is transmitted by signaling of a higher layer in the case where a parameter related to the trigger type 0 SRS is set. The trigger type 1 SRS is transmitted by signaling of a higher layer in the case where a parameter related to the trigger type 1 SRS is set, and an SRS request included in a DCI format 0, 1A, 2B, 2C, 2D, or 4 requests the transmission. Note that, with regard to the DCI format 0, 1A, or 4, the SRS request is included in both the FDD and the TDD. However, with regard to the DCI format 2B, 2C, or 2D, the SRS request is included in the TDD alone. Transmission of the trigger type 1 SRS is prioritized in the case where the trigger type 0 SRS and the trigger type 1 SRS are transmitted in a same sub frame of a same serving cell. The trigger type 0 SRS is also referred to as a periodic SRS. The trigger type 1 SRS is also referred to as an aperiodic SRS.

<Configuration Example of Base Station Device 1 in Present Embodiment>

Figure 8:
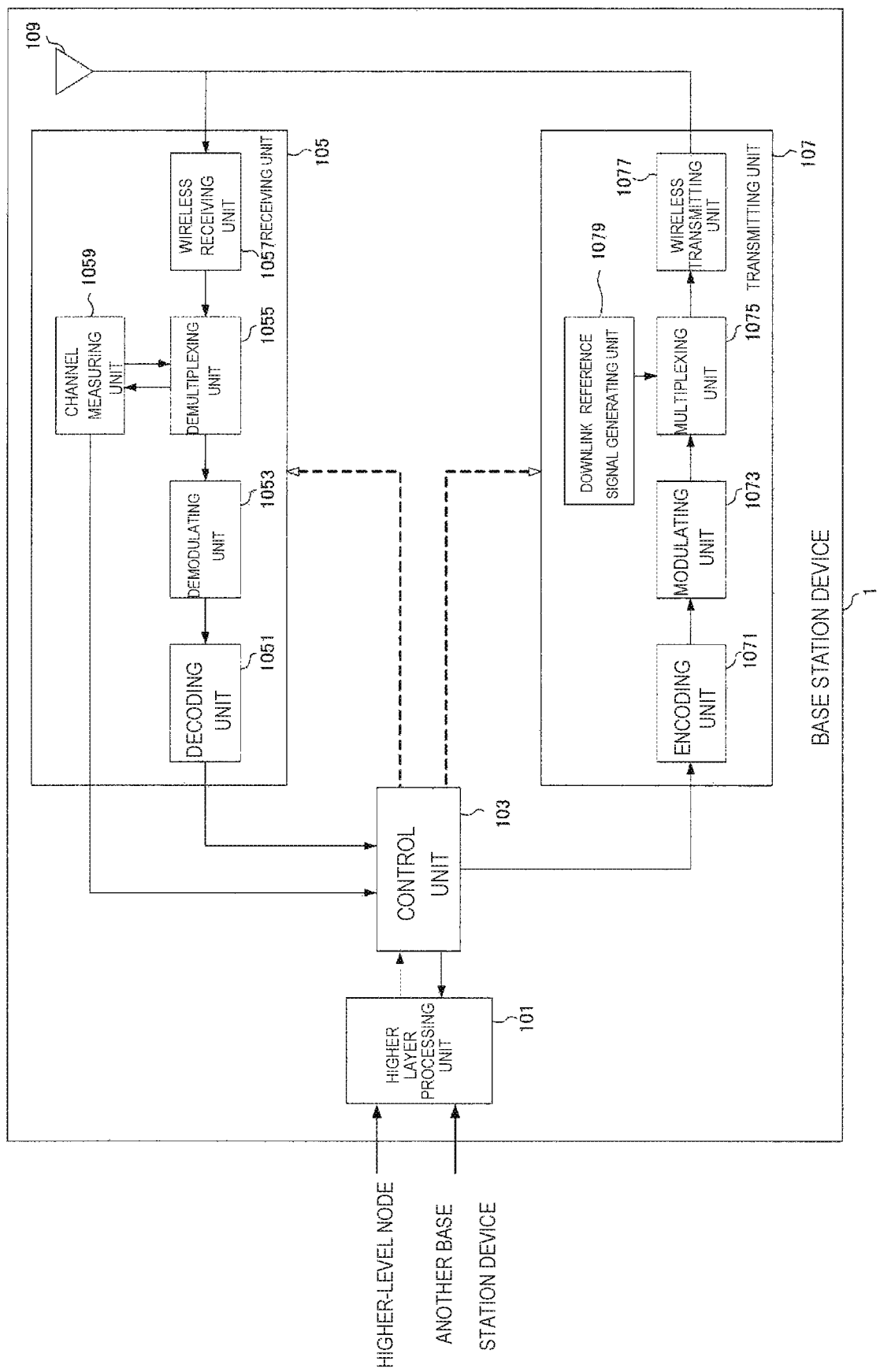
FIG. 8 is a schematic block diagram illustrating a configuration of a base station device of the present embodiment.

FIG. 8 is a schematic block diagram illustrating a configuration of the base station device 1 of the present embodiment. As illustrated, the base station device 1 includes a higher layer processing unit 101, a control unit 103, a receiving unit 105, a transmitting unit 107, and a transceiving antenna 109. Further, the receiving unit 105 includes a decoding unit 1051, a demodulating unit 1053, a demultiplexing unit 1055, a wireless receiving unit 1057, and a channel measuring unit 1059. Further, the transmitting unit 107 includes an encoding unit 1071, a modulating unit 1073, a multiplexing unit 1075, a wireless transmitting unit 1077, and a downlink reference signal generating unit 1079.

As described above, the base station device 1 can support one or more RATs. Some or all of the units included in the base station device 1 illustrated in FIG. 8 can be configured individually in accordance with the RAT. For example, the receiving unit 105 and the transmitting unit 107 are configured individually in LTE and NR. Further, in the NR cell, some or all of the units included in the base station device 1 illustrated in FIG. 8 can be configured individually in accordance with a parameter set related to the transmission signal. For example, in a certain NR cell, the wireless receiving unit 1057 and the wireless transmitting unit 1077 can be configured individually in accordance with a parameter set related to the transmission signal.

The higher layer processing unit 101 performs processes of a medium access control (MAC) layer, a packet data convergence protocol (PDCP) layer, a radio link control (RLC) layer, and a radio resource control (RRC) layer. Further, the higher layer processing unit 101 generates control information to control the receiving unit 105 and the transmitting unit 107 and outputs the control information to the control unit 103.

The control unit 103 controls the receiving unit 105 and the transmitting unit 107 on the basis of the control information from the higher layer processing unit 101. The control unit 103 generates control information to be transmitted to the higher layer processing unit 101 and outputs the control information to the higher layer processing unit 101. The control unit 103 receives a decoded signal from the decoding unit 1051 and a channel estimation result from the channel measuring unit 1059. The control unit 103 outputs a signal to be encoded to the encoding unit 1071. Further, the control unit 103 is used to control the whole or a part of the base station device 1.

The higher layer processing unit 101 performs a process and management related to RAT control, radio resource control, sub frame setting, scheduling control, and/or CSI report control. The process and the management in the higher layer processing unit 101 are performed for each terminal device or in common to terminal devices connected to the base station device. The process and the management in the higher layer processing unit 101 may be performed only by the higher layer processing unit 101 or may be acquired from a higher node or another base station device. Further, the process and the management in the higher layer processing unit 101 may be individually performed in accordance with the RAT. For example, the higher layer processing unit 101 individually performs the process and the management in LTE and the process and the management in NR.

Under the RAT control of the higher layer processing unit 101, management related to the RAT is performed. For example, under the RAT control, the management related to LTE and/or the management related to NR is performed. The management related to NR includes setting and a process of a parameter set related to the transmission signal in the NR cell.

In the radio resource control in the higher layer processing unit 101, generation and/or management of downlink data (transport block), system information, an RRC message (RRC parameter), and/or a MAC control element (CE) are performed.

In a sub frame setting in the higher layer processing unit 101, management of a sub frame setting, a sub frame pattern setting, an uplink-downlink setting, an uplink reference UL-DL setting, and/or a downlink reference UL-DL setting is performed. Further, the sub frame setting in the higher layer processing unit 101 is also referred to as a base station sub frame setting. Further, the sub frame setting in the higher layer processing unit 101 can be decided on the basis of an uplink traffic volume and a downlink traffic volume. Further, the sub frame setting in the higher layer processing unit 101 can be decided on the basis of a scheduling result of scheduling control in the higher layer processing unit 101.

In the scheduling control in the higher layer processing unit 101, a frequency and a sub frame to which the physical channel is allocated, a coding rate, a modulation scheme, and transmission power of the physical channels, and the like are decided on the basis of the received channel state information, an estimation value, a channel quality, or the like of a propagation path input from the channel measuring unit 1059, and the like. For example, the control unit 103 generates the control information (DCI format) on the basis of the scheduling result of the scheduling control in the higher layer processing unit 101.

In the CSI report control in the higher layer processing unit 101, the CSI report of the terminal device 2 is controlled. For example, a setting related to the CSI reference resources assumed to calculate the CSI in the terminal device 2 is controlled.

Under the control from the control unit 103, the receiving unit 105 receives a signal transmitted from the terminal device 2 via the transceiving antenna 109, performs a reception process such as demultiplexing, demodulation, and decoding, and outputs information which has undergone the reception process to the control unit 103. Further, the reception process in the receiving unit 105 is performed on the basis of a setting which is specified in advance or a setting notified from the base station device 1 to the terminal device 2.

The wireless receiving unit 1057 performs conversion into an intermediate frequency (down conversion), removal of an unnecessary frequency component, control of an amplification level such that a signal level is appropriately maintained, quadrature demodulation based on an in-phase component and a quadrature component of a received signal, conversion from an analog signal into a digital signal, removal of a guard interval (GI), and/or extraction of a signal in the frequency domain by fast Fourier transform (FFT) on the uplink signal received via the transceiving antenna 109.

The demultiplexing unit 1055 separates the uplink channel such as the PUCCH or the PUSCH and/or uplink reference signal from the signal input from the wireless receiving unit 1057. The demultiplexing unit 1055 outputs the uplink reference signal to the channel measuring unit 1059. The demultiplexing unit 1055 compensates the propagation path for the uplink channel from the estimation value of the propagation path input from the channel measuring unit 1059.

The demodulating unit 1053 demodulates the reception signal for the modulation symbol of the uplink channel using a modulation scheme such as binary phase shift keying (BPSK), quadrature phase shift keying (QPSK), 16 quadrature amplitude modulation (QAM), 64 QAM, or 256 QAM. The demodulating unit 1053 performs separation and demodulation of a MIMO multiplexed uplink channel.

The decoding unit 1051 performs a decoding process on encoded bits of the demodulated uplink channel. The decoded uplink data and/or uplink control information are output to the control unit 103. The decoding unit 1051 performs a decoding process on the PUSCH for each transport block.

The channel measuring unit 1059 measures the estimation value, a channel quality, and/or the like of the propagation path from the uplink reference signal input from the demultiplexing unit 1055, and outputs the estimation value, a channel quality, and/or the like of the propagation path to the demultiplexing unit 1055 and/or the control unit 103. For example, the estimation value of the propagation path for propagation path compensation for the PUCCH or the PUSCH is measured by the channel measuring unit 1059 using the UL-DMRS, and an uplink channel quality is measured using the SRS.

The transmitting unit 107 carries out a transmission process such as encoding, modulation, and multiplexing on downlink control information and downlink data input from the higher layer processing unit 101 under the control of the control unit 103. For example, the transmitting unit 107 generates and multiplexes the PHICH, the PDCCH, the EPDCCH, the PDSCH, and the downlink reference signal and generates a transmission signal. Further, the transmission process in the transmitting unit 107 is performed on the basis of a setting which is specified in advance, a setting notified from the base station device 1 to the terminal device 2, or a setting notified through the PDCCH or the EPDCCH transmitted through the same sub frame.

The encoding unit 1071 encodes the HARQ indicator (HARQ-ACK), the downlink control information, and the downlink data input from the control unit 103 using a predetermined coding scheme such as block coding, convolutional coding, turbo coding, or the like. The modulating unit 1073 modulates the encoded bits input from the encoding unit 1071 using a predetermined modulation scheme such as BPSK, QPSK, 16 QAM, 64 QAM, or 256 QAM. The downlink reference signal generating unit 1079 generates the downlink reference signal on the basis of a physical cell identification (PCI), an RRC parameter set in the terminal device 2, and the like. The multiplexing unit 1075 multiplexes a modulated symbol and the downlink reference signal of each channel and arranges resulting data in a predetermined resource element.

The wireless transmitting unit 1077 performs processes such as conversion into a signal in the time domain by inverse fast Fourier transform (IFFT), addition of the guard interval, generation of a baseband digital signal, conversion in an analog signal, quadrature modulation, conversion from a signal of an intermediate frequency into a signal of a high frequency (up conversion), removal of an extra frequency component, and amplification of power on the signal from the multiplexing unit 1075, and generates a transmission signal. The transmission signal output from the wireless transmitting unit 1077 is transmitted through the transceiving antenna 109.

Note that, the transmission processing unit of the base station device 1 according to the present embodiment may correspond to at least any of the transmitting unit 107, the control unit 103, or the higher layer processing unit 101. In addition, the reception processing unit of the base station device 1 according to the present embodiment may correspond to at least any of the receiving unit 105, the control unit 103, or the higher layer processing unit 101.

<Configuration Example of Base Station Device 2 in Present Embodiment>

Figure 9:
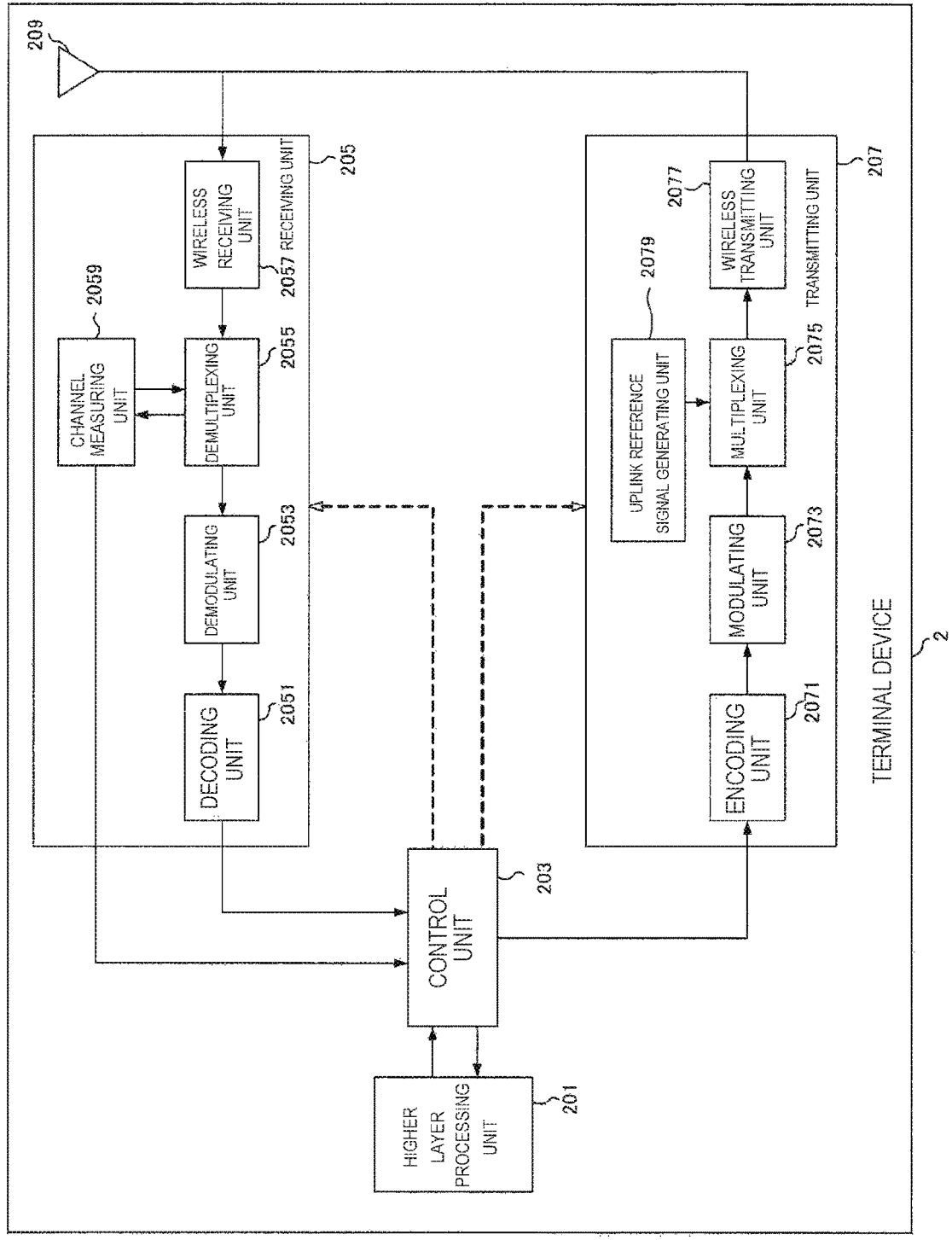
FIG. 9 is a schematic block diagram illustrating a configuration of a terminal device of the present embodiment.

FIG. 9 is a schematic block diagram illustrating a configuration of the terminal device 2 of the present embodiment. As illustrated, the terminal device 2 includes a higher layer processing unit 201, a control unit 203, a receiving unit 205, a transmitting unit 207, and a transceiving antenna 209. Further, the receiving unit 205 includes a decoding unit 2051, a demodulating unit 2053, a demultiplexing unit 2055, a wireless receiving unit 2057, and a channel measuring unit 2059. Further, the transmitting unit 207 includes an encoding unit 2071, a modulating unit 2073, a multiplexing unit 2075, a wireless transmitting unit 2077, and an uplink reference signal generating unit 2079.

As described above, the terminal device 2 can support one or more RATs. Some or all of the units included in the terminal device 2 illustrated in FIG. 9 can be configured individually in accordance with the RAT. For example, the receiving unit 205 and the transmitting unit 207 are configured individually in LTE and NR. Further, in the NR cell, some or all of the units included in the terminal device 2 illustrated in FIG. 9 can be configured individually in accordance with a parameter set related to the transmission signal. For example, in a certain NR cell, the wireless receiving unit 2057 and the wireless transmitting unit 2077 can be configured individually in accordance with a parameter set related to the transmission signal.

The higher layer processing unit 201 outputs uplink data (transport block) to the control unit 203. The higher layer processing unit 201 performs processes of a medium access control (MAC) layer, a packet data convergence protocol (PDCP) layer, a radio link control (RLC) layer, and a radio resource control (RRC) layer. Further, the higher layer processing unit 201 generates control information to control the receiving unit 205 and the transmitting unit 207 and outputs the control information to the control unit 203.

The control unit 203 controls the receiving unit 205 and the transmitting unit 207 on the basis of the control information from the higher layer processing unit 201. The control unit 203 generates control information to be transmitted to the higher layer processing unit 201 and outputs the control information to the higher layer processing unit 201. The control unit 203 receives a decoded signal from the decoding unit 2051 and a channel estimation result from the channel measuring unit 2059. The control unit 203 outputs a signal to be encoded to the encoding unit 2071. Further, the control unit 203 may be used to control the whole or a part of the terminal device 2.

The higher layer processing unit 201 performs a process and management related to RAT control, radio resource control, sub frame setting, scheduling control, and/or CSI report control. The process and the management in the higher layer processing unit 201 are performed on the basis of a setting which is specified in advance and/or a setting based on control information set or notified from the base station device 1. For example, the control information from the base station device 1 includes the RRC parameter, the MAC control element, or the DCI. Further, the process and the management in the higher layer processing unit 201 may be individually performed in accordance with the RAT. For example, the higher layer processing unit 201 individually performs the process and the management in LTE and the process and the management in NR.

Under the RAT control of the higher layer processing unit 201, management related to the RAT is performed. For example, under the RAT control, the management related to LTE and/or the management related to NR is performed. The management related to NR includes setting and a process of a parameter set related to the transmission signal in the NR cell.

In the radio resource control in the higher layer processing unit 201, the setting information in the terminal device 2 is managed. In the radio resource control in the higher layer processing unit 201, generation and/or management of uplink data (transport block), system information, an RRC message (RRC parameter), and/or a MAC control element (CE) are performed.

In the sub frame setting in the higher layer processing unit 201, the sub frame setting in the base station device 1 and/or a base station device different from the base station device 1 is managed. The sub frame setting includes an uplink or downlink setting for the sub frame, a sub frame pattern setting, an uplink-downlink setting, an uplink reference UL-DL setting, and/or a downlink reference UL-DL setting. Further, the sub frame setting in the higher layer processing unit 201 is also referred to as a terminal sub frame setting.

In the scheduling control in the higher layer processing unit 201, control information for controlling scheduling on the receiving unit 205 and the transmitting unit 207 is generated on the basis of the DCI (scheduling information) from the base station device 1.

In the CSI report control in the higher layer processing unit 201, control related to the report of the CSI to the base station device 1 is performed. For example, in the CSI report control, a setting related to the CSI reference resources assumed for calculating the CSI by the channel measuring unit 2059 is controlled. In the CSI report control, resource (timing) used for reporting the CSI is controlled on the basis of the DCI and/or the RRC parameter.

Under the control from the control unit 203, the receiving unit 205 receives a signal transmitted from the base station device 1 via the transceiving antenna 209, performs a reception process such as demultiplexing, demodulation, and decoding, and outputs information which has undergone the reception process to the control unit 203. Further, the reception process in the receiving unit 205 is performed on the basis of a setting which is specified in advance or a notification from the base station device 1 or a setting.

The wireless receiving unit 2057 performs conversion into an intermediate frequency (down conversion), removal of an unnecessary frequency component, control of an amplification level such that a signal level is appropriately maintained, quadrature demodulation based on an in-phase component and a quadrature component of a received signal, conversion from an analog signal into a digital signal, removal of a guard interval (GI), and/or extraction of a signal in the frequency domain by fast Fourier transform (FFT) on the uplink signal received via the transceiving antenna 209.

The demultiplexing unit 2055 separates the downlink channel such as the PHICH, PDCCH, EPDCCH, or PDSCH, downlink synchronization signal and/or downlink reference signal from the signal input from the wireless receiving unit 2057. The demultiplexing unit 2055 outputs the uplink reference signal to the channel measuring unit 2059. The demultiplexing unit 2055 compensates the propagation path for the uplink channel from the estimation value of the propagation path input from the channel measuring unit 2059.

The demodulating unit 2053 demodulates the reception signal for the modulation symbol of the downlink channel using a modulation scheme such as BPSK, QPSK, 16 QAM, 64 QAM, or 256 QAM. The demodulating unit 2053 performs separation and demodulation of a MIMO multiplexed downlink channel.

The decoding unit 2051 performs a decoding process on encoded bits of the demodulated downlink channel. The decoded downlink data and/or downlink control information are output to the control unit 203. The decoding unit 2051 performs a decoding process on the PDSCH for each transport block.

The channel measuring unit 2059 measures the estimation value, a channel quality, and/or the like of the propagation path from the downlink reference signal input from the demultiplexing unit 2055, and outputs the estimation value, a channel quality, and/or the like of the propagation path to the demultiplexing unit 2055 and/or the control unit 203. The downlink reference signal used for measurement by the channel measuring unit 2059 may be decided on the basis of at least a transmission mode set by the RRC parameter and/or other RRC parameters. For example, the estimation value of the propagation path for performing the propagation path compensation on the PDSCH or the EPDCCH is measured through the DL-DMRS. The estimation value of the propagation path for performing the propagation path compensation on the PDCCH or the PDSCH and/or the downlink channel for reporting the CSI are measured through the CRS. The downlink channel for reporting the CSI is measured through the CSI-RS. The channel measuring unit 2059 calculates a reference signal received power (RSRP) and/or a reference signal received quality (RSRQ) on the basis of the CRS, the CSI-RS, or the discovery signal, and outputs the RSRP and/or the RSRQ to the higher layer processing unit 201.

The transmitting unit 207 performs a transmission process such as encoding, modulation, and multiplexing on the uplink control information and the uplink data input from the higher layer processing unit 201 under the control of the control unit 203. For example, the transmitting unit 207 generates and multiplexes the uplink channel such as the PUSCH or the PUCCH and/or the uplink reference signal, and generates a transmission signal. Further, the transmission process in the transmitting unit 207 is performed on the basis of a setting which is specified in advance or a setting set or notified from the base station device 1.

The encoding unit 2071 encodes the HARQ indicator (HARQ-ACK), the uplink control information, and the uplink data input from the control unit 203 using a predetermined coding scheme such as block coding, convolutional coding, turbo coding, or the like. The modulating unit 2073 modulates the encoded bits input from the encoding unit 2071 using a predetermined modulation scheme such as BPSK, QPSK, 16 QAM, 64 QAM, or 256 QAM. The uplink reference signal generating unit 2079 generates the uplink reference signal on the basis of an RRC parameter set in the terminal device 2, and the like. The multiplexing unit 2075 multiplexes a modulated symbol and the uplink reference signal of each channel and arranges resulting data in a predetermined resource element.

The wireless transmitting unit 2077 performs processes such as conversion into a signal in the time domain by inverse fast Fourier transform (IFFT), addition of the guard interval, generation of a baseband digital signal, conversion in an analog signal, quadrature modulation, conversion from a signal of an intermediate frequency into a signal of a high frequency (up conversion), removal of an extra frequency component, and amplification of power on the signal from the multiplexing unit 2075, and generates a transmission signal. The transmission signal output from the wireless transmitting unit 2077 is transmitted through the transceiving antenna 209.

Note that, the transmission processing unit of the terminal device 2 according to the present embodiment may correspond to at least any of the transmitting unit 207, the control unit 203, or the higher layer processing unit 201. In addition, the reception processing unit of the terminal device 2 according to the present embodiment may correspond to at least any of the receiving unit 205, the control unit 203, or the higher layer processing unit 201.

<Signaling of Control Information in Present Embodiment>

The base station device 1 and the terminal device 2 can use various methods for signaling (notification, broadcasting, or setting) of the control information. The signaling of the control information can be performed in various layers (layers). The signaling of the control information includes signaling of the physical layer which is signaling performed through the physical layer, RRC signaling which is signaling performed through the RRC layer, and MAC signaling which is signaling performed through the MAC layer. The RRC signaling is dedicated RRC signaling for notifying the terminal device 2 of the control information specific or a common RRC signaling for notifying of the control information specific to the base station device 1. The signaling used by a layer higher than the physical layer such as RRC signaling and MAC signaling is also referred to as signaling of the higher layer.

The RRC signaling is implemented by signaling the RRC parameter. The MAC signaling is implemented by signaling the MAC control element. The signaling of the physical layer is implemented by signaling the downlink control information (DCI) or the uplink control information (UCI). The RRC parameter and the MAC control element are transmitted using the PDSCH or the PUSCH. The DCI is transmitted using the PDCCH or the EPDCCH. The UCI is transmitted using the PUCCH or the PUSCH. The RRC signaling and the MAC signaling are used for signaling semi-static control information and are also referred to as semi-static signaling. The signaling of the physical layer is used for signaling dynamic control information and also referred to as dynamic signaling. The DCI is used for scheduling of the PDSCH or scheduling of the PUSCH. The UCI is used for the CSI report, the HARQ-ACK report, and/or the scheduling request (SR).

<Details of Downlink Control Information in Present Embodiment>

The DCI is notified using the DCI format having a field which is specified in advance. Predetermined information bits are mapped to the field specified in the DCI format. The DCI notifies of downlink scheduling information, uplink scheduling information, sidelink scheduling information, a request for a non-periodic CSI report, or an uplink transmission power command.

The DCI format monitored by the terminal device 2 is decided in accordance with the transmission mode set for each serving cell. In other words, a part of the DCI format monitored by the terminal device 2 can differ depending on the transmission mode. For example, the terminal device 2 in which a downlink transmission mode 1 is set monitors the DCI format 1A and the DCI format 1. For example, the terminal device 2 in which a downlink transmission mode 4 is set monitors the DCI format 1A and the DCI format 2. For example, the terminal device 2 in which an uplink transmission mode 1 is set monitors the DCI format 0. For example, the terminal device 2 in which an uplink transmission mode 2 is set monitors the DCI format 0 and the DCI format 4.

A control region in which the PDCCH for notifying the terminal device 2 of the DCI is placed is not notified of, and the terminal device 2 detects the DCI for the terminal device 2 through blind decoding (blind detection). Specifically, the terminal device 2 monitors a set of PDCCH candidates in the serving cell. The monitoring indicates that decoding is attempted in accordance with all the DCI formats to be monitored for each of the PDCCHs in the set. For example, the terminal device 2 attempts to decode all aggregation levels, PDCCH candidates, and DCI formats which are likely to be transmitted to the terminal device 2. The terminal device 2 recognizes the DCI (PDCCH) which is successfully decoded (detected) as the DCI (PDCCH) for the terminal device 2.

A cyclic redundancy check (CRC) is added to the DCI. The CRC is used for the DCI error detection and the DCI blind detection. A CRC parity bit (CRC) is scrambled using the RNTI. The terminal device 2 detects whether or not it is a DCI for the terminal device 2 on the basis of the RNTI. Specifically, the terminal device 2 performs de-scrambling on the bit corresponding to the CRC using a predetermined RNTI, extracts the CRC, and detects whether or not the corresponding DCI is correct.

The RNTI is specified or set in accordance with a purpose or a use of the DCI. The RNTI includes a cell-RNTI (C-RNTI), a semi persistent scheduling C-RNTI (SPS C-RNTI), a system information-RNTI (SI-RNTI), a paging-RNTI (P-RNTI), a random access-RNTI (RA-RNTI), a transmit power control-PUCCH-RNTI (TPC-PUCCH-RNTI), a transmit power control-PUSCH-RNTI (TPC-PUSCH-RNTI), a temporary C-RNTI, a multimedia broadcast multicast services (MBMS)-RNTI (M-RNTI)), an eIMTA-RNTI and a CC-RNTI.

The C-RNTI and the SPS C-RNTI are RNTIs which are specific to the terminal device 2 in the base station device 1 (cell), and serve as identifiers identifying the terminal device 2. The C-RNTI is used for scheduling the PDSCH or the PUSCH in a certain sub frame. The SPS C-RNTI is used to activate or release periodic scheduling of resources for the PDSCH or the PUSCH. A control channel having a CRC scrambled using the SI-RNTI is used for scheduling a system information block (SIB). A control channel with a CRC scrambled using the P-RNTI is used for controlling paging. A control channel with a CRC scrambled using the RA-RNTI is used for scheduling a response to the RACH. A control channel having a CRC scrambled using the TPC-PUCCH-RNTI is used for power control of the PUCCH. A control channel having a CRC scrambled using the TPC-PUSCH-RNTI is used for power control of the PUSCH. A control channel with a CRC scrambled using the temporary C-RNTI is used by a mobile station device in which no C-RNTI is set or recognized. A control channel with CRC scrambled using the M-RNTI is used for scheduling the MBMS. A control channel with a CRC scrambled using the eIMTA-RNTI is used for notifying of information related to a TDD UL/DL setting of a TDD serving cell in dynamic TDD (eIMTA). The control channel (DCI) with a CRC scrambled using the CC-RNTI is used to notify of setting of an exclusive OFDM symbol in the LAA secondary cell. Further, the DCI format may be scrambled using a new RNTI instead of the above RNTI.

Scheduling information (the downlink scheduling information, the uplink scheduling information, and the sidelink scheduling information) includes information for scheduling in units of resource blocks or resource block groups as the scheduling of the frequency region. The resource block group is successive resource block sets and indicates resources allocated to the scheduled terminal device. A size of the resource block group is decided in accordance with a system bandwidth.

<Details of Downlink Control Channel in Present Embodiment>

The DCI is transmitted using a control channel such as the PDCCH or the EPDCCH. The terminal device 2 monitors a set of PDCCH candidates and/or a set of EPDCCH candidates of one or more activated serving cells set by RRC signaling. Here, the monitoring means that the PDCCH and/or the EPDCCH in the set corresponding to all the DCI formats to be monitored is attempted to be decoded.

A set of PDCCH candidates or a set of EPDCCH candidates is also referred to as a search space. In the search space, a shared search space (CSS) and a terminal specific search space (USS) are defined. The CSS may be defined only for the search space for the PDCCH.

A common search space (CSS) is a search space set on the basis of a parameter specific to the base station device 1 and/or a parameter which is specified in advance. For example, the CSS is a search space used in common to a plurality of terminal devices. Therefore, the base station device 1 maps a control channel common to a plurality of terminal devices to the CSS, and thus resources for transmitting the control channel are reduced.

A UE-specific search space (USS) is a search space set using at least a parameter specific to the terminal device 2. Therefore, the USS is a search space specific to the terminal device 2, and it is possible for the base station device 1 to individually transmit the control channel specific to the terminal device 2 by using the USS. For this reason, the base station device 1 can efficiently map the control channels specific to a plurality of terminal devices.

The USS may be set to be used in common to a plurality of terminal devices. Since a common USS is set in a plurality of terminal devices, a parameter specific to the terminal device 2 is set to be the same value among a plurality of terminal devices. For example, a unit set to the same parameter among a plurality of terminal devices is a cell, a transmission point, a group of predetermined terminal devices, or the like.

The search space of each aggregation level is defined by a set of PDCCH candidates. Each PDCCH is transmitted using one or more CCE sets. The number of CCEs used in one PDCCH is also referred to as an aggregation level. For example, the number of CCEs used in one PDCCH is 1, 2, 4, or 8.

The search space of each aggregation level is defined by a set of EPDCCH candidates. Each EPDCCH is transmitted using one or more enhanced control channel element (ECCE) sets. The number of ECCEs used in one EPDCCH is also referred to as an aggregation level. For example, the number of ECCEs used in one EPDCCH is 1, 2, 4, 8, 16, or 32.

The number of PDCCH candidates or the number of EPDCCH candidates is decided on the basis of at least the search space and the aggregation level. For example, in the CSS, the number of PDCCH candidates in the aggregation levels 4 and 8 are 4 and 2, respectively. For example, in the USS, the number of PDCCH candidates in the aggregations 1, 2, 4, and 8 are 6, 6, 2, and 2, respectively.

Each ECCE includes a plurality of EREGs. The EREG is used to define mapping to the resource element of the EPDCCH. 16 EREGs which are assigned numbers of 0 to 15 are defined in each RB pair. In other words, an EREG 0 to an EREG 15 are defined in each RB pair. For each RB pair, the EREG 0 to the EREG 15 are preferentially defined at regular intervals in the frequency direction for resource elements other than resource elements to which a predetermined signal and/or channel is mapped. For example, a resource element to which a demodulation reference signal associated with an EPDCCH transmitted through antenna ports 107 to 110 is mapped is not defined as the EREG The number of ECCEs used in one EPDCCH depends on an EPDCCH format and is decided on the basis of other parameters. The number of ECCEs used in one EPDCCH is also referred to as an aggregation level. For example, the number of ECCEs used in one EPDCCH is decided on the basis of the number of resource elements which can be used for transmission of the EPDCCH in one RB pair, a transmission method of the EPDCCH, and the like. For example, the number of ECCEs used in one EPDCCH is 1, 2, 4, 8, 16, or 32. Further, the number of EREGs used in one ECCE is decided on the basis of a type of sub frame and a type of cyclic prefix and is 4 or 8. Distributed transmission and localized transmission are supported as the transmission method of the EPDCCH.

The distributed transmission or the localized transmission can be used for the EPDCCH. The distributed transmission and the localized transmission differ in mapping of the ECCE to the EREG and the RB pair. For example, in the distributed transmission, one ECCE is configured using EREGs of a plurality of RB pairs. In the localized transmission, one ECCE is configured using an EREG of one RB pair.

The base station device 1 performs a setting related to the EPDCCH in the terminal device 2. The terminal device 2 monitors a plurality of EPDCCHs on the basis of the setting from the base station device 1. A set of RB pairs that the terminal device 2 monitors the EPDCCH can be set. The set of RB pairs is also referred to as an EPDCCH set or an EPDCCH-PRB set. One or more EPDCCH sets can be set in one terminal device 2. Each EPDCCH set includes one or more RB pairs. Further, the setting related to the EPDCCH can be individually performed for each EPDCCH set.

The base station device 1 can set a predetermined number of EPDCCH sets in the terminal device 2. For example, up to two EPDCCH sets can be set as an EPDCCH set 0 and/or an EPDCCH set 1. Each of the EPDCCH sets can be constituted by a predetermined number of RB pairs. Each EPDCCH set constitutes one set of ECCEs. The number of ECCEs configured in one EPDCCH set is decided on the basis of the number of RB pairs set as the EPDCCH set and the number of EREGs used in one ECCE. In a case in which the number of ECCEs configured in one EPDCCH set is N, each EPDCCH set constitutes ECCEs 0 to N−1. For example, in a case in which the number of EREGs used in one ECCE is 4, the EPDCCH set constituted by 4 RB pairs constitutes 16 ECCEs.

<Details of CA and DC in Present Embodiment>

A plurality of cells is set for the terminal device 2, and the terminal device 2 can perform multicarrier transmission. Communication in which the terminal device 2 uses a plurality of cells is referred to as carrier aggregation (CA) or dual connectivity (DC). Contents described in the present embodiment can be applied to each or some of a plurality of cells set in the terminal device 2. The cell set in the terminal device 2 is also referred to as a serving cell.

In the CA, a plurality of serving cells to be set includes one primary cell (PCell) and one or more secondary cells (SCell). One primary cell and one or more secondary cells can be set in the terminal device 2 that supports the CA.

The primary cell is a serving cell in which the initial connection establishment procedure is performed, a serving cell that the initial connection re-establishment procedure is started, or a cell indicated as the primary cell in a handover procedure. The primary cell operates with a primary frequency. The secondary cell can be set after a connection is constructed or reconstructed. The secondary cell operates with a secondary frequency. Further, the connection is also referred to as an RRC connection.

The DC is an operation in which a predetermined terminal device 2 consumes radio resources provided from at least two different network points. The network point is a master base station device (a master eNB (MeNB)) and a secondary base station device (a secondary eNB (SeNB)). In the dual connectivity, the terminal device 2 establishes an RRC connection through at least two network points. In the dual connectivity, the two network points may be connected through a non-ideal backhaul.

In the DC, the base station device 1 which is connected to at least an S1-MME and plays a role of a mobility anchor of a core network is referred to as a master base station device. Further, the base station device 1 which is not the master base station device providing additional radio resources to the terminal device 2 is referred to as a secondary base station device. A group of serving cells associated with the master base station device is also referred to as a master cell group (MCG). A group of serving cells associated with the secondary base station device is also referred to as a secondary cell group (SCG). Note that the group of the serving cells is also referred to as a cell group (CG).

In the DC, the primary cell belongs to the MCG Further, in the SCG the secondary cell corresponding to the primary cell is referred to as a primary secondary cell (PSCell). A function (capability and performance) equivalent to the PCell (the base station device constituting the PCell) may be supported by the PSCell (the base station device constituting the PSCell). Further, the PSCell may only support some functions of the PCell. For example, the PSCell may support a function of performing the PDCCH transmission using the search space different from the CSS or the USS. Further, the PSCell may constantly be in an activation state. Further, the PSCell is a cell that can receive the PUCCH.

In the DC, a radio bearer (a date radio bearer (DRB)) and/or a signaling radio bearer (SRB) may be individually allocated through the MeNB and the SeNB. A duplex mode may be set individually in each of the MCG (PCell) and the SCG (PSCell). The MCG (PCell) and the SCG (PSCell) may not be synchronized with each other. That is, a frame boundary of the MCG and a frame boundary of the SCG may not be matched. A parameter (a timing advance group (TAG)) for adjusting a plurality of timings may be independently set in the MCG (PCell) and the SCG (PSCell). In the dual connectivity, the terminal device 2 transmits the UCI corresponding to the cell in the MCG only through MeNB (PCell) and transmits the UCI corresponding to the cell in the SCG only through SeNB (pSCell). In the transmission of each UCI, the transmission method using the PUCCH and/or the PUSCH is applied in each cell group.

The PUCCH and the PBCH (MIB) are transmitted only through the PCell or the PSCell. Further, the PRACH is transmitted only through the PCell or the PSCell as long as a plurality of TAGs is not set between cells in the CG.

In the PCell or the PSCell, semi-persistent scheduling (SPS) or discontinuous transmission (DRX) may be performed. In the secondary cell, the same DRX as the PCell or the PSCell in the same cell group may be performed.

In the secondary cell, information/parameter related to a setting of MAC is basically shared with the PCell or the PSCell in the same cell group. Some parameters may be set for each secondary cell. Some timers or counters may be applied only to the PCell or the PSCell.

In the CA, a cell to which the TDD scheme is applied and a cell to which the FDD scheme is applied may be aggregated. In a case in which the cell to which the TDD is applied and the cell to which the FDD is applied are aggregated, the present disclosure can be applied to either the cell to which the TDD is applied or the cell to which the FDD is applied.

The terminal device 2 transmits information (supportedBandCombination) indicating a combination of bands in which the CA and/or DC is supported by the terminal device 2 to the base station device 1. The terminal device 2 transmits information indicating whether or not simultaneous transmission and reception are supported in a plurality of serving cells in a plurality of different bands for each of band combinations to the base station device 1.

<Details of Resource Allocation in Present Embodiment>

The base station device 1 can use a plurality of methods as a method of allocating resources of the PDSCH and/or the PUSCH to the terminal device 2. The resource allocation method includes dynamic scheduling, semi persistent scheduling, multi sub frame scheduling, and cross sub frame scheduling.

In the dynamic scheduling, one DCI performs resource allocation in one sub frame. Specifically, the PDCCH or the EPDCCH in a certain sub frame performs scheduling for the PDSCH in the sub frame. The PDCCH or the EPDCCH in a certain sub frame performs scheduling for the PUSCH in a predetermined sub frame after the certain sub frame.

In the multi sub frame scheduling, one DCI allocates resources in one or more sub frames. Specifically, the PDCCH or the EPDCCH in a certain sub frame performs scheduling for the PDSCH in one or more sub frames which are a predetermined number after the certain sub frame. The PDCCH or the EPDCCH in a certain sub frame performs scheduling for the PUSCH in one or more sub frames which are a predetermined number after the sub frame. The predetermined number can be set to an integer of zero or more. The predetermined number may be specified in advance and may be decided on the basis of the signaling of the physical layer and/or the RRC signaling. In the multi sub frame scheduling, consecutive sub frames may be scheduled, or sub frames with a predetermined period may be scheduled. The number of sub frames to be scheduled may be specified in advance or may be decided on the basis of the signaling of the physical layer and/or the RRC signaling.

In the cross sub frame scheduling, one DCI allocates resources in one sub frame. Specifically, the PDCCH or the EPDCCH in a certain sub frame performs scheduling for the PDSCH in one sub frame which is a predetermined number after the certain sub frame. The PDCCH or the EPDCCH in a certain sub frame performs scheduling for the PUSCH in one sub frame which is a predetermined number after the sub frame. The predetermined number can be set to an integer of zero or more. The predetermined number may be specified in advance and may be decided on the basis of the signaling of the physical layer and/or the RRC signaling. In the cross sub frame scheduling, consecutive sub frames may be scheduled, or sub frames with a predetermined period may be scheduled.

In the semi-persistent scheduling (SPS), one DCI allocates resources in one or more sub frames. In a case in which information related to the SPS is set through the RRC signaling, and the PDCCH or the EPDCCH for activating the SPS is detected, the terminal device 2 activates a process related to the SPS and receives a predetermined PDSCH and/or PUSCH on the basis of a setting related to the SPS. In a case in which the PDCCH or the EPDCCH for releasing the SPS is detected when the SPS is activated, the terminal device 2 releases (inactivates) the SPS and stops reception of a predetermined PDSCH and/or PUSCH. The release of the SPS may be performed on the basis of a case in which a predetermined condition is satisfied. For example, in a case in which a predetermined number of empty transmission data is received, the SPS is released. The data empty transmission for releasing the SPS corresponds to a MAC protocol data unit (PDU) including a zero MAC service data unit (SDU).

Information related to the SPS by the RRC signaling includes an SPS C-RNTI which is an SPN RNTI, information related to a period (interval) in which the PDSCH is scheduled, information related to a period (interval) in which the PUSCH is scheduled, information related to a setting for releasing the SPS, and/or the number of the HARQ process in the SPS. The SPS is supported only in the primary cell and/or the primary secondary cell.

<Frame Configuration of NR in Present Embodiment>

Figure 10:
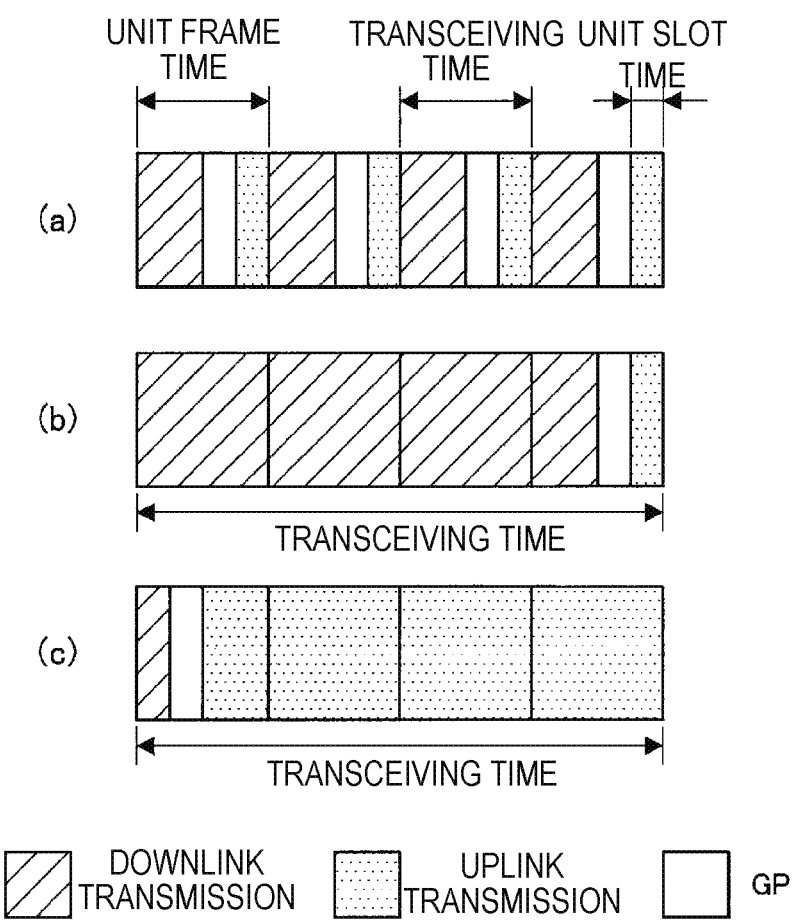
FIG. 10 is a diagram illustrating an example of a frame configuration of self-contained transmission according to the present embodiment.

In NR, a physical channel and/or a physical signal can be transmitted by self-contained transmission. FIG. 10 illustrates an example of a frame configuration of the self-contained transmission in the present embodiment. In the self-contained transmission, single transceiving includes successive downlink transmission, a GP, and successive downlink transmission from the head in that order. The successive downlink transmission includes at least one piece of downlink control information and the DMRS. The downlink control information gives an instruction to receive a downlink physical channel included in the successive downlink transmission and to transmit an uplink physical channel included in the successive uplink transmission. In a case in which the downlink control information gives an instruction to receive the downlink physical channel, the terminal device 2 attempts to receive the downlink physical channel on the basis of the downlink control information. Then, the terminal device 2 transmits success or failure of reception of the downlink physical channel (decoding success or failure) by an uplink control channel included in the uplink transmission allocated after the GP. On the other hand, in a case in which the downlink control information gives an instruction to transmit the uplink physical channel, the uplink physical channel transmitted on the basis of the downlink control information is included in the uplink transmission to be transmitted. In this way, by flexibly switching between transmission of uplink data and transmission of downlink data by the downlink control information, it is possible to take countermeasures instantaneously to increase or decrease a traffic ratio between an uplink and a downlink. Further, by notifying of the success or failure of the reception of the downlink by the uplink transmission immediately after the success or failure of reception of the downlink, downlink communication with low delay can be realized.

A unit slot time is a minimum time unit in which downlink transmission, a GP, or uplink transmission is defined. The unit slot time is reserved for one of the downlink transmission, the GP, or the uplink transmission. In the unit slot time, neither the downlink transmission nor the uplink transmission is included. The unit slot time may be a minimum transmission time of a channel associated with the DMRS included in the unit slot time. One unit slot time is defined as, for example, an integer multiple of a sampling interval ($T_s$) or the symbol length of NR.

The unit frame time may be a minimum time designated by scheduling. The unit frame time may be a minimum unit in which a transport block is transmitted. The unit slot time may be a maximum transmission time of a channel associated with the DMRS included in the unit slot time. The unit frame time may be a unit time in which the uplink transmission power in the terminal device 2 is decided. The unit frame time may be referred to as a sub frame. In the unit frame time, there are three types of only the downlink transmission, only the uplink transmission, and a combination of the uplink transmission and the downlink transmission. One unit frame time is defined as, for example, an integer multiple of the sampling interval ($T_s$), the symbol length, or the unit slot time of NR.

A transceiving time is one transceiving time. A time (a gap) in which neither the physical channel nor the physical signal is transmitted may occupy between one transceiving and another transceiving. The terminal device 2 does not need to average the CSI measurement between different transceiving. The transceiving time may be referred to as TTI. One transceiving time is defined as, for example, an integer multiple of the sampling interval ($T_s$), the symbol length, the unit slot time, or the unit frame time of NR.

<Uplink RS of NR According to Present Embodiment>

An uplink RS in NR may be an NR-SR-DMRS or the like.

An example of an NR-SRS will be described below. Note that, features of the NR-SRS that are not clearly described below may be deemed to be the same as an SRS in LTE.

The NR-SRS does not have to be transmitted by the last symbol in a sub frame or in a slot. For example, the NR-SRS may be transmitted by a first symbol or an intervening symbol in the sub frame or in the slot.

NR-SRSs may be sequentially transmitted by a plurality of symbols. For example, the NR-SRSs may be transmitted by the last few symbols in the sub frame or in the slot.

2. TECHNICAL FEATURES

<Antenna Configuration of NR According to Present Embodiment>

As an antenna of NR, a digital antenna configuration, an analog antenna configuration, and a hybrid antenna configuration may be assumed. The hybrid antenna configuration is a combination of the digital antenna configuration and the analog antenna configuration.

Digital Antenna Configuration

The digital antenna configuration is a configuration that controls an antenna weight by using a digital circuit (baseband region) with respect to each antenna element.

Figure 11:
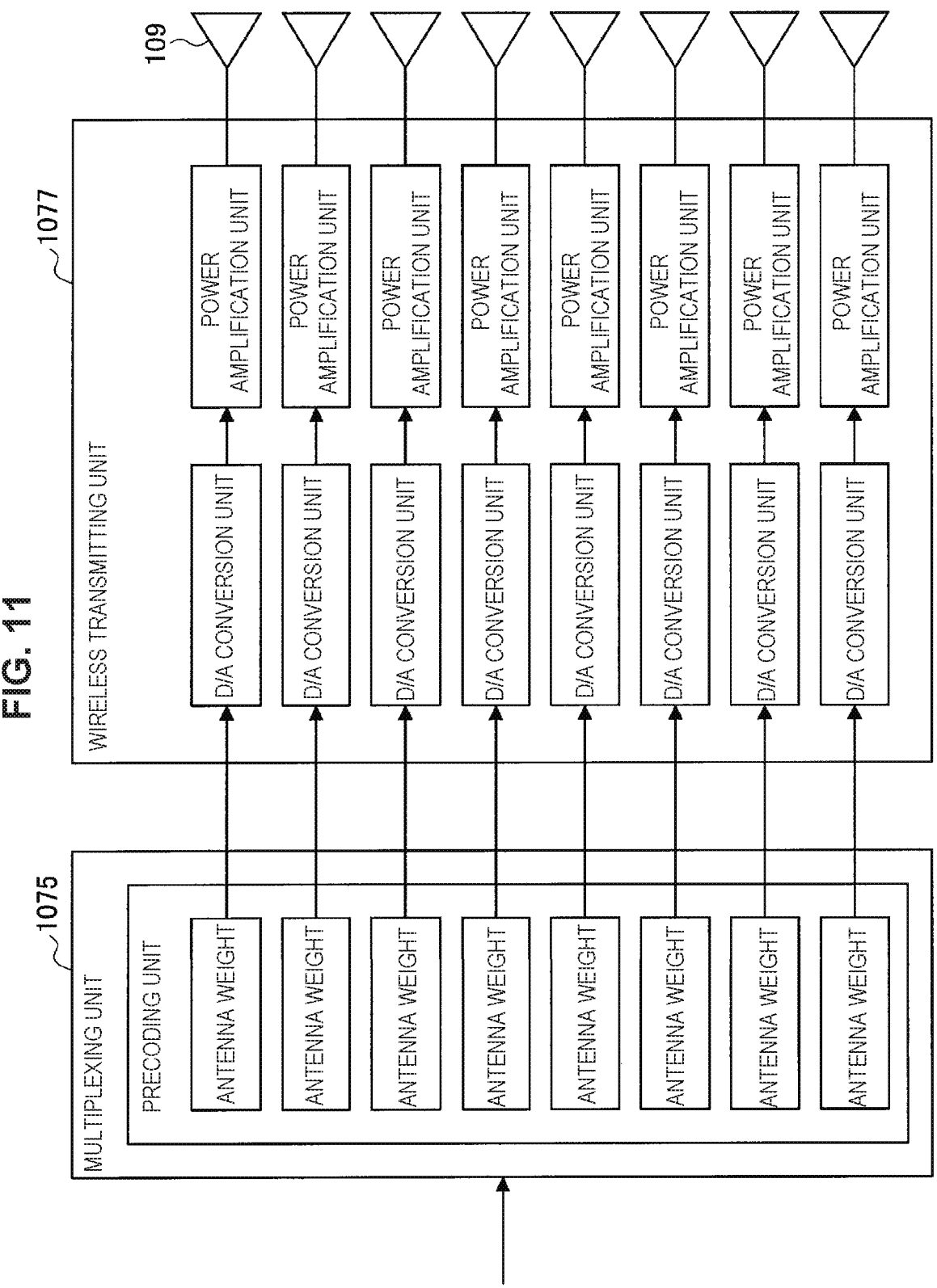
FIG. 11 is a schematic block diagram illustrating an example of a digital antenna configuration according to the present embodiment.

FIG. 11 is a schematic block diagram illustrating an example of the digital antenna configuration according to the present embodiment. FIG. 11 illustrates an example of internal configurations of the multiplexing unit 1075, the wireless transmitting unit 1077, and the transceiving antenna 109 according to the configuration of the base station device 1 illustrated in FIG. 8. Note that, processes that are not necessary for describing the antenna configuration are omitted, whereas the respective units include functions for performing the processes described with reference to FIG. 8.

In the digital antenna configuration, the multiplexing unit 1075 includes a precoding unit. The precoding unit multiplies respective antenna elements by the antenna weight and forms beams.

According to the digital antenna configuration, it is possible to flexibly control phases of the respective antenna element, and it is possible to generate different beams in frequency domains. However, the configuration is complex.

Analog Antenna Configuration

Figure 12:
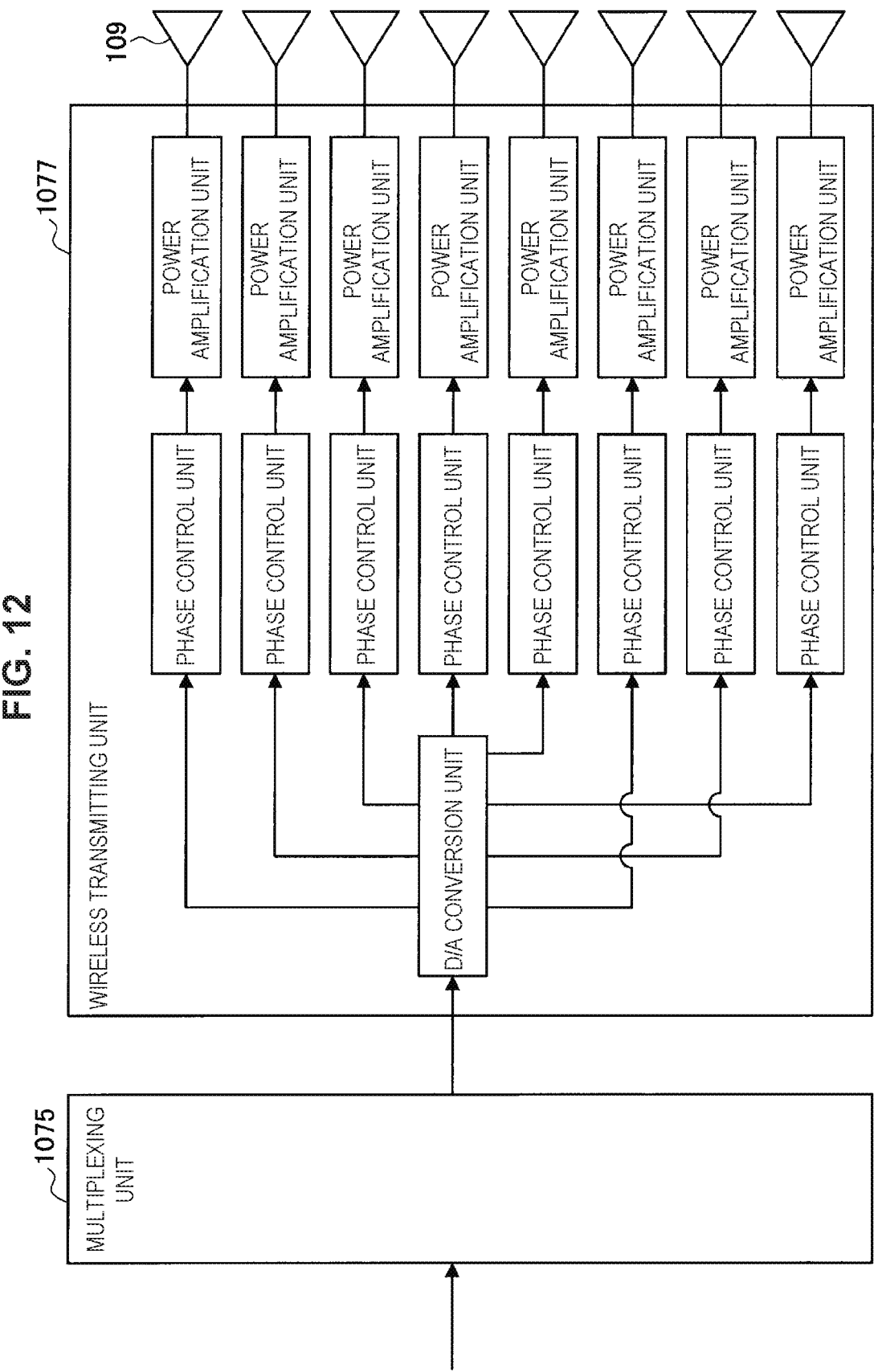
FIG. 12 is a schematic block diagram illustrating an example of a digital antenna configuration according to the present embodiment.

FIG. 12 is a schematic block diagram illustrating an example of the analog antenna configuration according to the present embodiment. As with FIG. 11, FIG. 12 illustrates an example of internal configurations of the multiplexing unit 1075, the wireless transmitting unit 1077, and the transceiving antenna 109 according to the configuration of the base station device 1 illustrated in FIG. 8. Note that, processes that are not necessary for describing the antenna configuration are omitted, whereas the respective units include functions for performing the processes described with reference to FIG. 8.

In the analog antenna configuration, the wireless transmitting unit 1077 includes phase control units. The phase control units rotate phases in an analog domain (RF domain) and forms beams.

Since the phases are controlled in the analog domain, it is difficult to flexibly control the beams. However, the configuration is simple. For example, an antenna switching configuration is a part of the analog antenna configuration.

Hybrid Antenna Configuration

The hybrid antenna configuration is a configuration that combines the digital antenna configuration and the analog antenna configuration. The hybrid antenna configuration includes both a phase control element in an analog domain and a phase control element in a digital domain. The hybrid antenna configuration falls between the digital antenna configuration and the analog antenna configuration with regard to performance of beam forming and complexity of the configuration.

<Beam Operation Scheme of NR According to Present Embodiment>

With regard to NR, two schemes which are single beam operation and multiple beam operation are assumed.

Single Beam Operation

Figure 13:
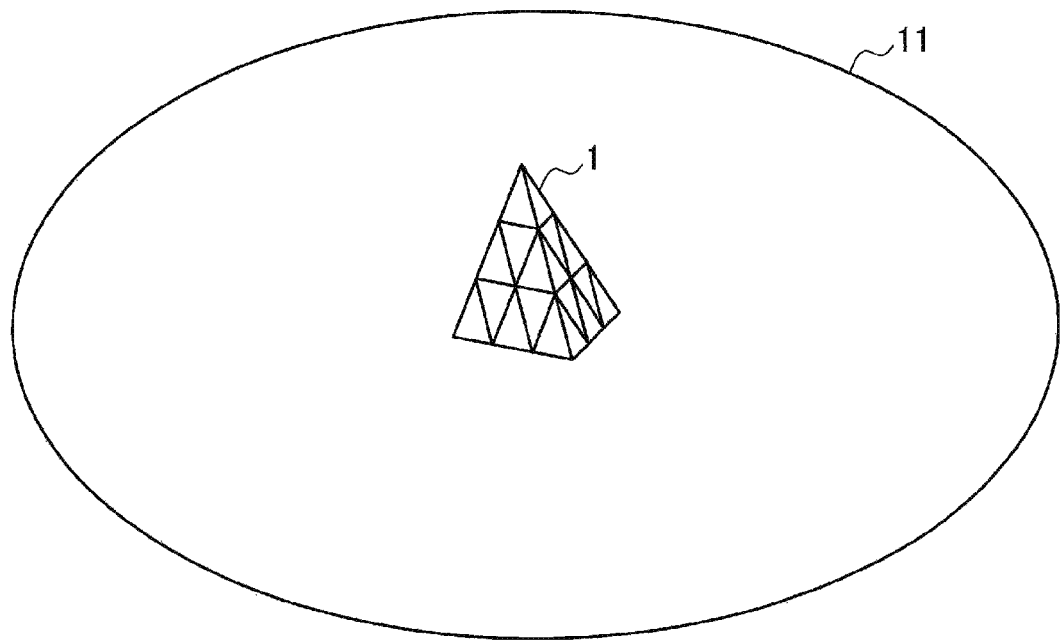
FIG. 13 is a diagram for describing an example of single beam operation according to the present embodiment.

FIG. 13 is a diagram for describing an example of the single beam operation according to the present embodiment. In the example illustrated in FIG. 13, the base station device 1 operates a cell 11 and communicates with a terminal device 2 located in cell coverage.

The single beam operation is a scheme that is operated by using a single beam for predetermined cell coverage. Specifically, in the predetermined cell coverage, a physical signal or a physical channel specific to the cell is transmitted by the single beam. LTE may be deemed as the single beam operation.

Multiple Beam Operation

Figure 14:
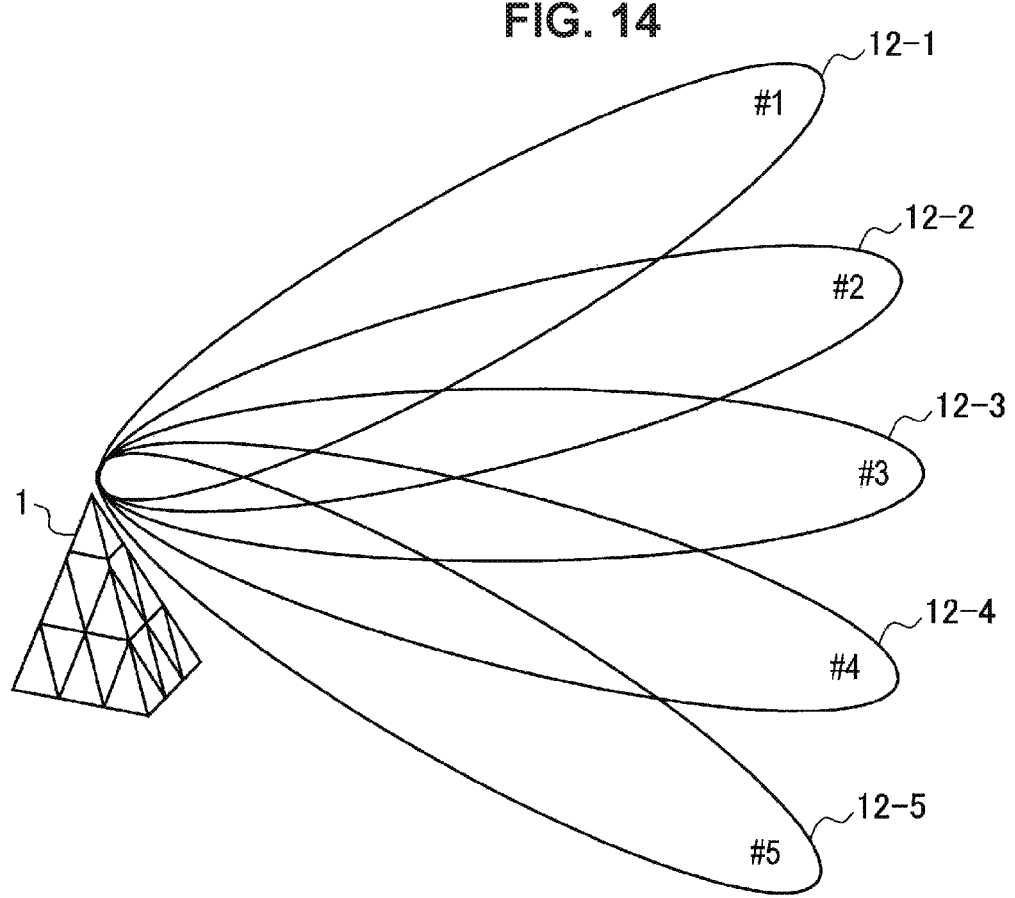
FIG. 14 is a diagram for describing an example of multiple beam operation according to the present embodiment.

FIG. 14 is a diagram for describing an example of the multiple beam operation according to the present embodiment. In the example illustrated in FIG. 14, the base station device 1 forms a plurality of beams 12-1 to 12-5 (beam IDs #1 to #5), and communicates with terminal devices located in irradiation areas of the respective beams.

The multiple beam operation is a scheme that is operated by using one or more beams for predetermined cell coverage. Specifically, a physical signal or a physical channel specific to the cell is transmitted by the plurality of beams.

For example, in analog beam forming or hybrid beam forming, a beam of a predetermined direction is transmitted at a predetermined time instance, whereas it is difficult to transmit beams other than the beam of the predetermined direction. Therefore, by switching the time instance, it is possible to switch the beam to beams of a plurality of directions and the base station device 1 becomes capable of covering a wide area. In other words, the predetermined beam that transmits the physical signal or the physical channel specific to the cell is transmitted at a single time instance (time resource). Different beams are transmitted at different time instances. As described above, the multiple beam operation is performed by switching a plurality of beams at a plurality of time instances. The switching of a plurality of beams at a plurality of time instances is also referred to as beam sweep.

Note that, the multiple beam operation may be performed even in the case of the digital antenna configuration.

<Appropriate Beam Selection of NR According to Present Embodiment>

In NR, it is preferable for a system to select respective beams appropriate for a downlink and an uplink. Specifically, it is preferable to select respective beams appropriate for a downlink transmission beam of the base station device 1 and a downlink reception beam of the terminal device 2. In addition, it is preferable to select respective beams appropriate for an uplink transmission beam of the terminal device 2 and an uplink reception beam for the base station device 1.

It is possible to obtain the appropriate downlink transmission beam of the base station device 1 on the basis of feedback information or a report from the terminal device 2 that receives the beam. An example of a process of obtaining the appropriate downlink transmission beam will be described below. The base station device 1 transmits a predetermined known signal more than once by using different downlink transmission beams. The terminal device 2 decides an appropriate downlink transmission beam on the basis of reception intensity, reception quality, or the like of the known signal that has been transmitted more than once. In addition, the terminal device 2 gives a report or feedback to the base station device 1 about information corresponding to the appropriate downlink transmission beam. Accordingly, it is possible for the base station device 1 to acknowledge the appropriate downlink transmission beam. Here, the known signal may be an NR-SS, a mobility reference signal (MRS), a beam reference signal (BRS), an NR-CSI-RS, an NR-DM-RS, or the like.

Alternatively, it is possible to obtain the appropriate downlink transmission beam of the base station device 1 on the basis of an appropriate uplink reception beam of the base station device 1.

It is possible to obtain the appropriate uplink transmission beam of the terminal device 2 on the basis of feedback information or a report from the base station device 1 that receives the beam. An example of a process of obtaining the appropriate uplink transmission beam will be described below. The terminal device 2 transmits a predetermined known signal more than once by using different uplink transmission beams. The base station device 1 decides an appropriate uplink transmission beam on the basis of reception intensity, reception quality, or the like of the known signal that has been transmitted more than once. In addition, the base station device 1 gives a report or notification to the terminal device 2 about information corresponding to the appropriate uplink transmission beam. Accordingly, it is possible for the terminal device 2 to acknowledge the appropriate uplink transmission beam. Here, the known signal may be an NR-PRACH, an NR-SRS, an NR-DM-RS, or the like.

Alternatively, it is possible to obtain the appropriate uplink transmission beam of the terminal device 2 on the basis of an appropriate downlink reception beam of the terminal device 2.

<Synchronization Signal of NR According to Present Embodiment>

In NR, a synchronization signal is used by the terminal device 2 for synchronizing time domains and/or frequency domains of downlinks. The synchronization signal used in NR is also referred to as an NR-SS.

The NR-SS includes at least an NR-PSS and an NR-SSS. Note that, the NR-SS may include an NR-third synchronization signal (NR-TSS). The NR-SS is preferably constant with respect to a predetermined frequency area (frequency band) regardless of a system bandwidth.

The NR-PSS is used for at least initial synchronization of a symbol boundary with regard to an NR cell. Note that, the NR-PSS may also be used for detecting a part of an NR cell identifier and demodulating the NR-SSS. For example, a sequence of the NR-PSS may be configured by using a Zadoff-Chu sequence.

The terminal device 2 does not detect the NR-PSS by using other reference signals. The terminal device 2 does not have to assume that the NR-PSS is transmitted at an antenna port or a transmission and reception point (TRP) that are the same as any other downlink reference signals.

The NR-SSS is used for detecting at least an NR cell identifier or a part of the NR cell identifier. The NR-SSS is located in a fixed time and frequency resource relation with respect to a resource location of the NR-PSS, and the NR-SSS is detected. The resource relation is constant regardless of a duplex system or beam operation schemes. An M sequence is preferable for the type of the sequence of the NR-SSS, whereas the type of the sequence of the NR-SSS may be a Zadoff-Chu sequence, a gold sequence, or the like, for example. In addition, it is possible to use a combination of a plurality of types of the sequence, and it is possible to use a combination of a plurality of sequences having different generation expressions as long as the plurality of sequences have a same type.

The terminal device 2 may detect the NR-SSS by using information related to the NR cell and/or channel state information obtained by detecting the NR-PSS. The terminal device 2 may assume that the NR-SSS is transmitted at the same antenna port as the NR-PSS.

The NR-TSS may be used for notifying of an index of a synchronization signal block. The NR-TSS may be used for notifying of an index of a beam. The NR-TSS may be used for notifying of the number of repetitions of the synchronization signal block. The NR-TSS may be used for notifying of whether or not a synchronization signal block including the NR-TSS is the same as a part or all of NR-PBCHs and/or other synchronization signals in a synchronization signal burst.

The NR-SS may be used for measuring quality of the NR cell in which the NR-SS is transmitted. For example, the quality of the NR cell is indicated by RSRP, RSRQ, a received signal strength indicator (RSSI), signal to noise ratio (SNR), and/or signal to interference plus noise ratio (SINR).

The NR-SS is transmitted with a predetermined sub carrier interval. The predetermined sub carrier interval is uniquely defined with respect to a frequency band (operating band).

<Broadcast Channel of NR According to Present Embodiment>

In NR, at least one broadcast channel is defined. The broadcast channel is also referred to as an NR-PBCH.

The NR-PBCH is used for broadcasting a piece of system information. The NR-PBCH is not scheduled by other control information. System information carried by the NR-PBCH has a fixed payload size. The NR-PBCH is periodically transmitted. The system information carried by the NR-PBCH is also referred to as first NR system information or an NR-MIB.

The NR-MIB included in the NR-PBCH is encoded by using a polar code. Note that, the NR-MIB may be encoded by using a low-density parity-check (LDPC) code. Note that, the NR-MIB may be encoded by using a convolutional code.

The NR-PBCH may be scrambled by using an NR cell identifier. The terminal device 2 uses the NR cell identifier and descrambles the NR-PBCH. Note that, the NR-PBCH may be scrambled by using another identifier obtained from the NR-SS. Examples of the other identifiers include a beam index, a time index, and the like.

In resource mapping of the NR-PBCH, resources are first allocated sequentially in a frequency direction. As a specific example, modulated symbols are sequentially allocated to sub carriers of an initial symbol, among resource elements reserved by the NR-PBCH. Next, after modulated symbols are allocated to all the sub carriers of the initial symbol, modulated symbols are sequentially allocated to sub carriers of a next symbol. By repeating such procedure, it is possible to allocate the modulated symbols to all the resource elements reserved by the NR-PBCH.

The sub carrier interval of the NR-PBCH is preferably the same as a sub carrier interval of the NR-SS.

The NR-PBCH may be transmitted such that the NR-PBCH is multiplexed with an RS for demodulating the NR-PBCH. The NR-PBCH may be demodulated by using the RS. Note that, the NR-PBCH may be demodulated by using the NR-SS. Note that, the NR-PBCH may be demodulated by using the MRS.

The NR-PBCH is transmitted in a primary cell. The NR-PBCH is transmitted in a stand-alone cell. The NR-PBCH does not have to be transmitted in a secondary cell. The NR-PBCH does not have to be transmitted in a non-stand-alone cell.

<Initial Connection Procedure According to Present Embodiment>

The initial connection is a procedure for causing the terminal device 2 to transition from a state where the terminal device 2 does not connect to any cell (an idol state) to a state where the terminal device 2 has established connection with an arbitrary cell (a connected state). Next, with reference to FIG. 15, an example of the initial connection procedure of the terminal device 2 will be described.

Figure 15:
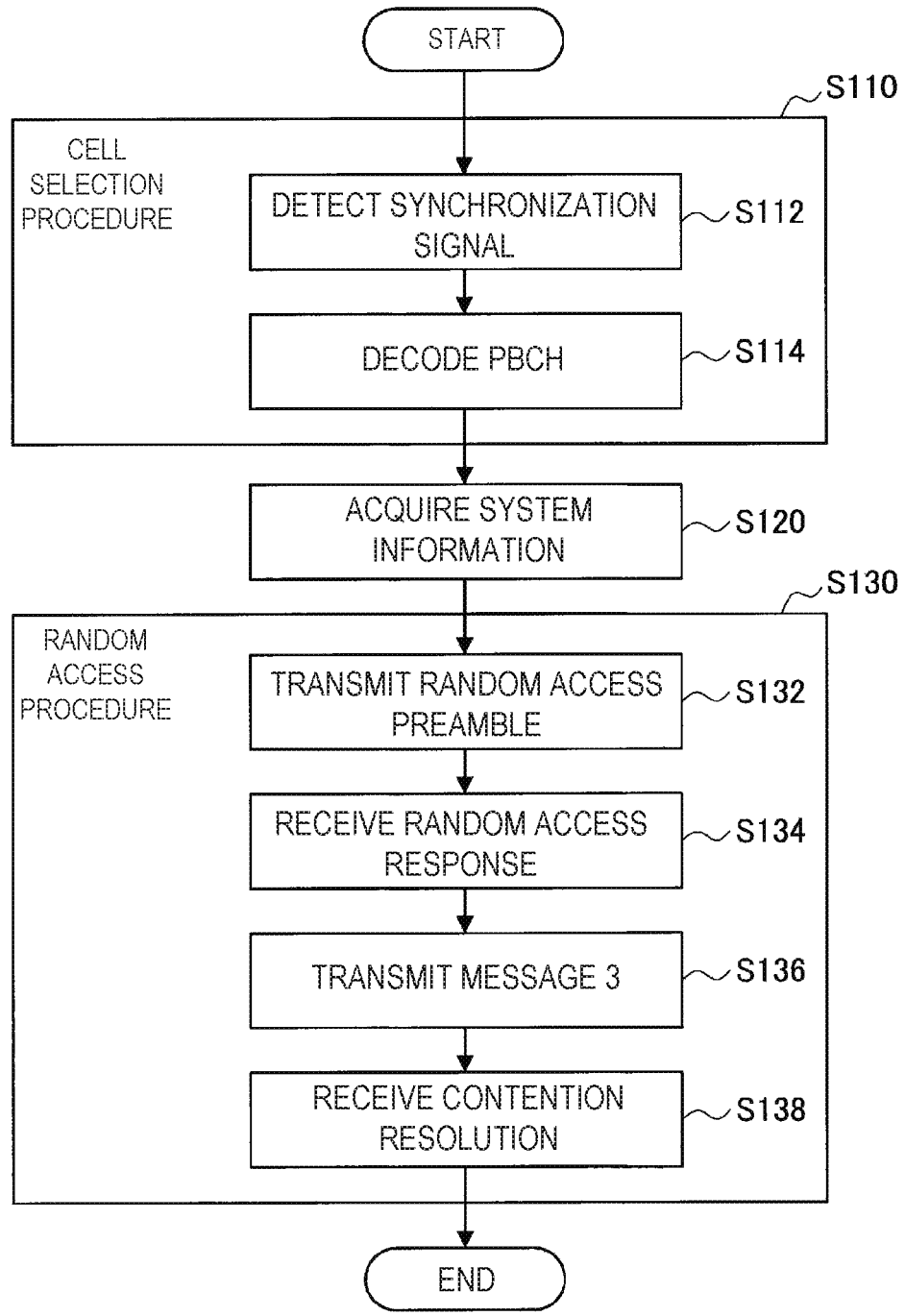
FIG. 15 is a flowchart illustrating an example of an initial connection procedure of a terminal device according to the present embodiment.

FIG. 15 is a flowchart illustrating an example of the initial connection procedure of the terminal device 2 according to the present embodiment. The terminal device 2 that executes the procedure illustrated in FIG. 15 is in the idol state.

As illustrated in FIG. 15, the terminal device 2 in the idol state first executes a cell selection procedure (Step S110). The cell selection procedure includes a synchronization signal detection process (Step S112) and a PBCH decoding process (Step S114). On the basis of detection of a synchronization signal, the terminal device 2 synchronizes a cell with a downlink. Next, after the synchronization with the downlink is established, the terminal device 2 tries to decode a PBCH.

Next, the terminal device 2 acquires system information (Step S120). Specifically, the terminal device 2 decodes the PBCH and acquires first system information transmitted through the PBCH. In addition, the terminal device 2 acquires second system information on the basis of the first system information. Details of the first system information and the second system information will be described later.

Next, the terminal device 2 executes random access procedure on the basis of the first system information and/or the second system information (Step S130). The random access procedure includes a random access preamble transmission process (Step S132), a random access response reception process (Step S134), a Message 3 transmission process (Step S136), and a contention resolution reception process (Step S138). First, the terminal device 2 selects a predetermined PRACH preamble and transmits it. Next, the terminal device 2 receives a PDSCH including a random access response corresponding to the transmitted PRACH preamble. Next, the terminal device 2 transmits a PUSCH including Message 3 by using a resource that is included in the received random access response and that is scheduled by Random Access Response Grant. Last of all, the terminal device 2 receives a PDSCH including contention resolution corresponding to the transmitted PUSCH.

After all the processes in the random access procedure finish, the terminal device 2 is capable of transitioning to the state where the terminal device 2 is connected to the cell (that is, the connected state).

Note that, the random access procedure illustrated in FIG. 15 is also referred to as a 4-step RACH procedure. On the other hand, in a random access procedure that is also referred to as a 2-step RACH procedure, the terminal device 2 also transmits Message 3 with transmission of a random access preamble, and the base station device 1 transmits contention resolution and a random access response as a response thereto.

<Details of Synchronization Signal Block of NR According to Present Embodiment>

In NR, a predetermined block (hereinafter, also referred to as a synchronization signal block) in which a single NR-PSS, a single NR-SSS, and/or an NR-PBCH are transmitted is defined. At a time instance of the predetermined synchronization signal block, the terminal device 2 assumes one beam that transmits the NR-SS and/or the NR-PBCH. The one NR-PSS, one NR-SSS, and/or one NR-PBCH are multiplexed in the synchronization signal block through time division, frequency division, spatial division, and/or code division.

Note that, the synchronization signal block may include a mobility reference signal (MRS). The MRS is used for at least RRM measurement. The terminal device 2 measures RSRP and/or RSRQ by using the MRS. The MRS is preferably transmitted by a gold sequence, whereas it is possible to use another type of sequence. For example, a sequence of the MRS is generated by a time index. For another example, a sequence of the MRS is generated by a beam index. The terminal device 2 is notified of the indexes through blind detection of the sequences.

Figure 16:
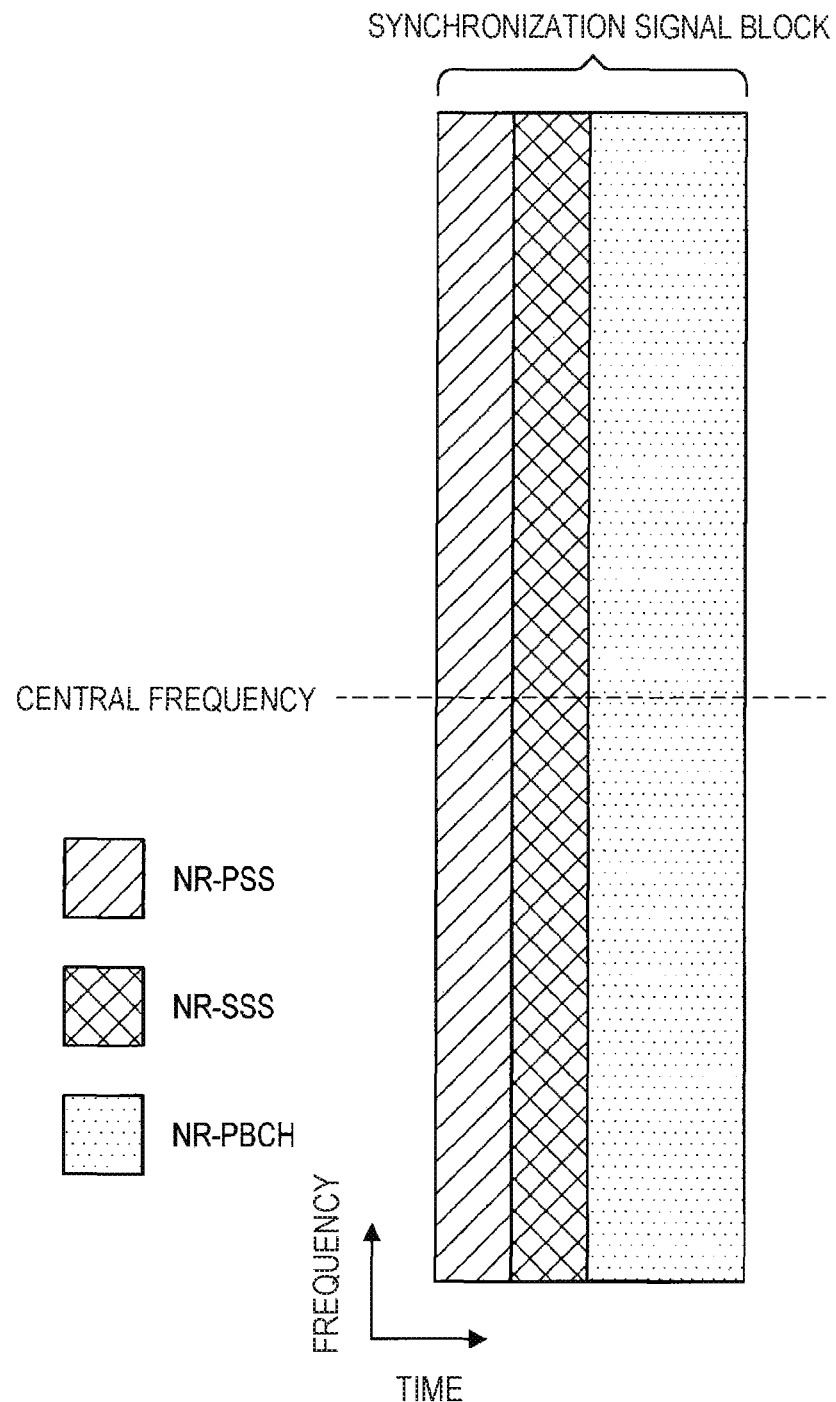
FIG. 16 is a diagram illustrating an example of a configuration of a synchronization signal block according to the present embodiment.

FIG. 16 is a diagram illustrating an example of a configuration of a synchronization signal block according to the present embodiment. In FIG. 16, an NR-PSS, an NR-SSS, and an NR-PBCH are multiplexed in a single synchronization signal block through time division. The terminal device 2 detects the NR-SSs and receives the NR-PBCH on the assumption that it is transmitted by a predetermined central frequency and a predetermined bandwidth.

Figure 17:
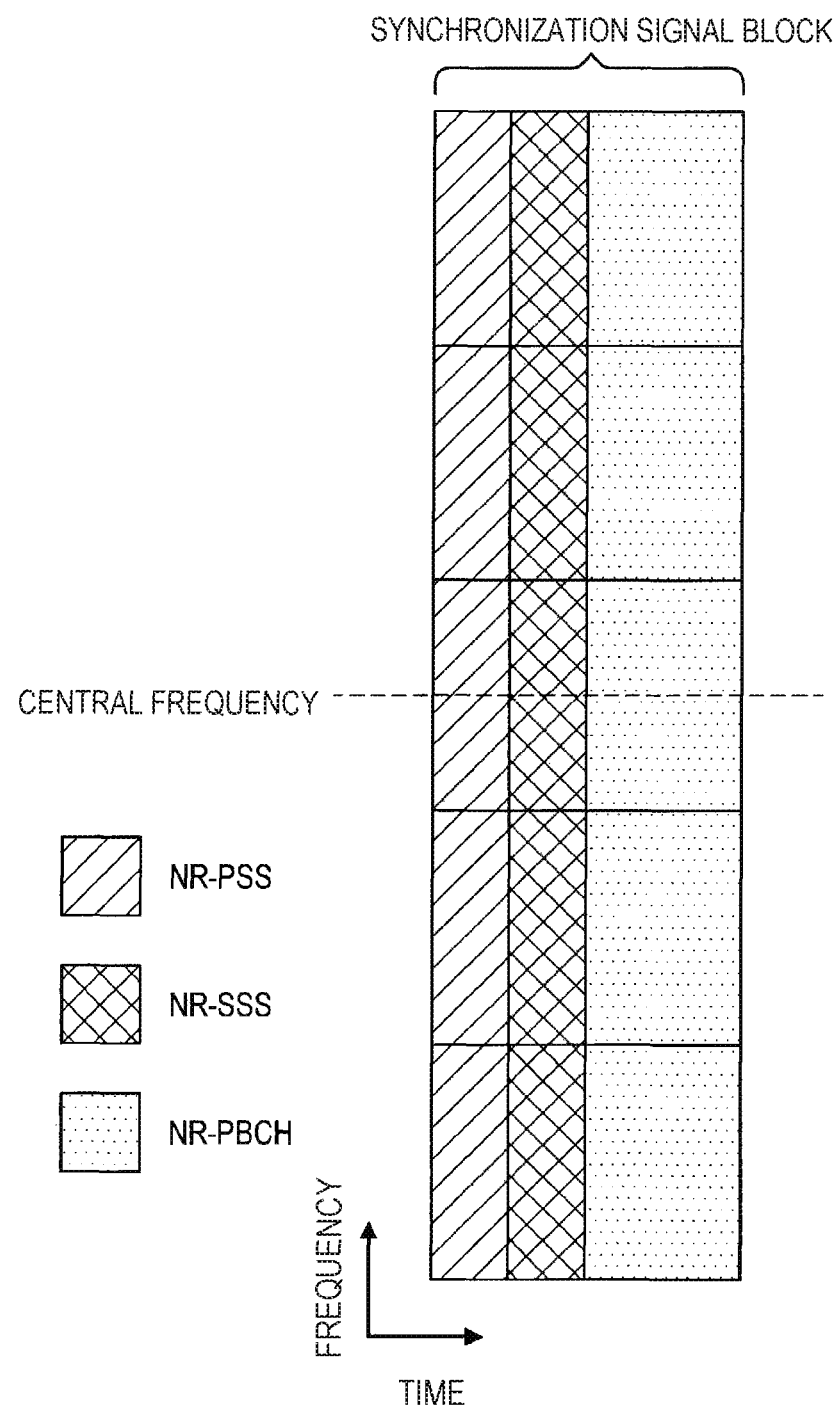
FIG. 17 is a diagram illustrating an example of a configuration of a synchronization signal block according to the present embodiment.

FIG. 17 is a diagram illustrating an example of a configuration of a synchronization signal block according to the present embodiment. In the synchronization signal block illustrated in FIG. 17, NR-SSs and an NR-PBCH are repeatedly transmitted in a frequency direction. In the example of the synchronization signal block illustrated in FIG. 17, the synchronization signal block is repeated five times with respect to a frequency axis. Each synchronization signal block is preferably a band that is narrower than a minimum reception bandwidth stipulated for the terminal device 2. Accordingly, it is easy to transmit the NR-SSs and the NR-PBCH to a wider area than the synchronization signal block illustrated in FIG. 16, and it is possible to improve a detection probability of the NR-SSs and reception quality of the NR-PBCH.

Note that, the different synchronization signal blocks of the frequency axis illustrated in FIG. 17 may be transmitted by different beams. In other words, the terminal device 2 may assume that the different synchronization signal blocks of the frequency axis are transmitted by different antennas, different antenna ports, or different TRPs. Accordingly, a beam sweep period gets shortened, and system overhead is reduced.

In addition, in NR, a synchronization signal burst and a synchronization signal burst set may be defined.

Figure 18:
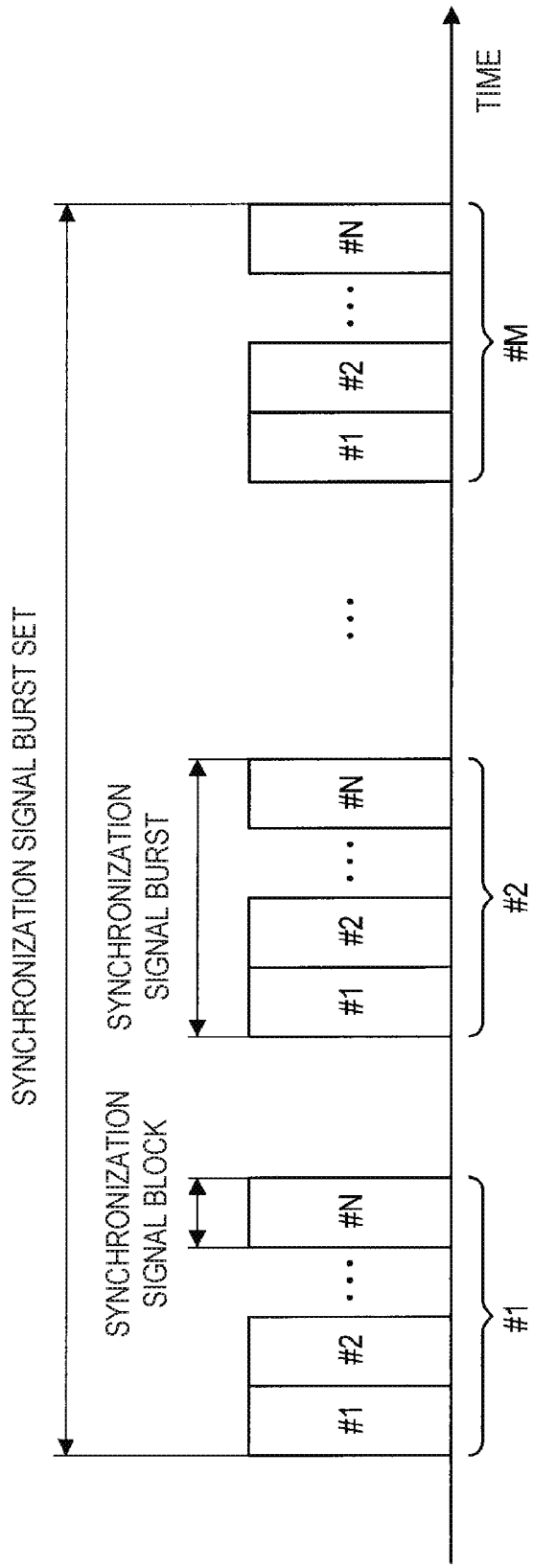
FIG. 18 is a diagram illustrating an example of configurations of synchronization signal bursts and a synchronization signal burst set according to the present embodiment.

FIG. 18 is a diagram illustrating an example of configurations of synchronization signal bursts and a synchronization signal burst set according to the present embodiment. The synchronization signal burst includes one or more synchronization signal blocks. In the example illustrated in FIG. 18, N number of synchronization signal blocks are defined as a synchronization signal burst. The respective synchronization signal blocks in the synchronization signal burst may be sequential. A synchronization signal burst set includes one or more synchronization signal bursts. In the example illustrated in FIG. 18, M number of synchronization signal bursts may be defined as one synchronization signal burst set.

The terminal device 2 is synchronized with an NR cell on the assumption that the synchronization signal burst set is periodically transmitted. The terminal device 2 performs a process on the assumption that the synchronization signal burst set is periodically transmitted. On the other hand, the base station device 1 does not have to transmit the synchronization signal burst set at a predetermined tine instance. At the time of initial connection, the terminal device 2 tries to detect the synchronization signal burst set while assuming a first cycle. The cycles of the synchronization signal burst set may be set in a higher layer. The terminal device 2 may overwrite a value of a set cycle in the case where a cycle is set by the higher layer.

Note that, synchronization signal burst sets transmitted at different time instances do not have to be transmitted at a same antenna port and at a same TRP.

Note that, one of sub frames in which the synchronization signal burst set is located is preferably a sub frame #0. In other words, the synchronization signal burst set is preferably located in the sub frame #0. The terminal device 2 is capable of acknowledging sub frame numbers of respective times by recognizing a top of the synchronization signal burst set.

Figure 19:
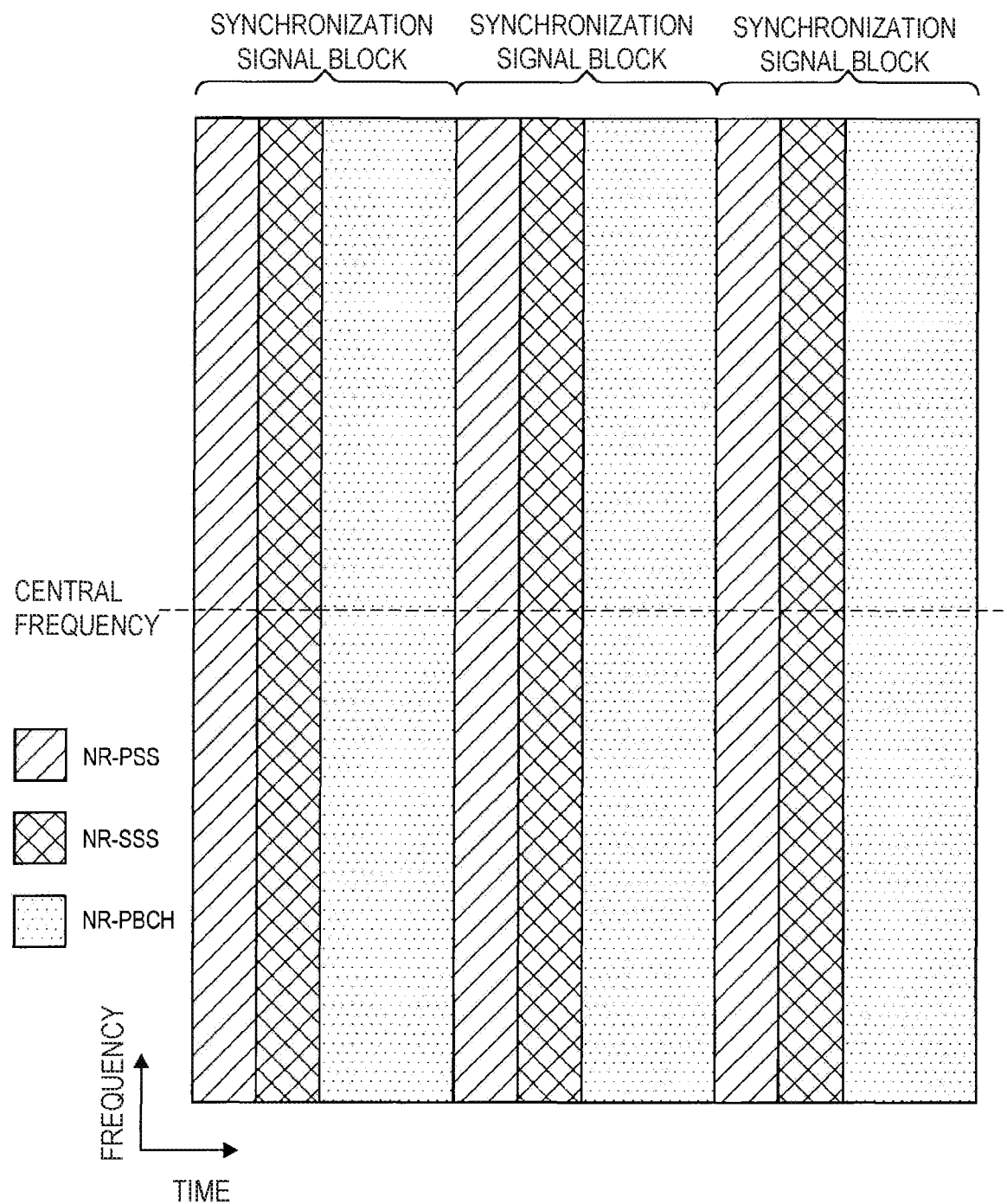
FIG. 19 is a diagram illustrating an example of configurations of synchronization signal blocks at a time of a synchronization signal burst according to the present embodiment.

FIG. 19 is a diagram illustrating an example of configurations of synchronization signal blocks at a time of the synchronization signal burst according to the present embodiment. In the example illustrated in FIG. 19, synchronization signal blocks of a same bandwidth are sequentially transmitted in a time axis. Contents of the respective synchronization signal blocks are decided according to transmission methods. For example, in the case of repetitive transmission, the contents of the respective transmission blocks are the same. On the other hand, in the case of beam sweep transmission, at least parts of the contents of the respective synchronization signal blocks are different from each other. For example, the contents of the synchronization signal blocks include a sequence of an NR-SS, information of an NR-MIB, or the like.

Figure 20:
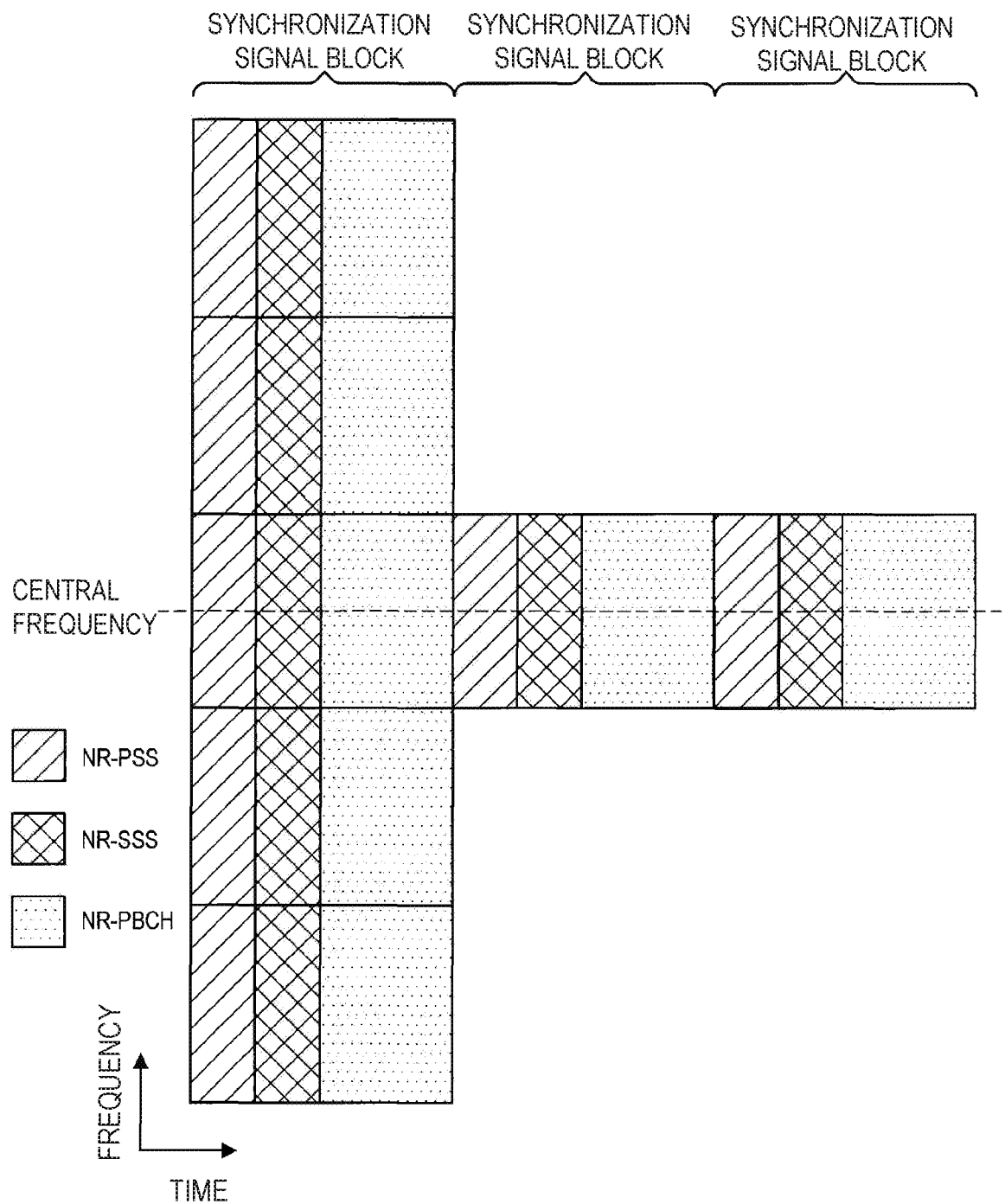
FIG. 20 is a diagram illustrating an example of configurations of synchronization signal blocks at a time of a synchronization signal burst according to the present embodiment.

FIG. 20 is a diagram illustrating an example of configurations of synchronization signal blocks at a time of a synchronization signal burst according to the present embodiment. In the example illustrated in FIG. 20, synchronization signal blocks are repeatedly transmitted in a frequency axis and a time axis. In addition, in the example illustrated in FIG. 20, five synchronization signal blocks are transmitted at a first time instance, and one synchronization signal block is transmitted at a second time instance and a third time instance. Therefore, by using the five synchronization signal blocks in the first time instance, it is possible to improve detection quality with regard to a terminal device 2 that receives a wide area. At the same time, with regard to a terminal device 2 that receives a narrow area, it is possible to improve detection quality of synchronization signal blocks by receiving a combination of synchronization signal blocks of a central frequency at the first to third time instances.

Indexes in a time axis (such as time indexes) are allocated to the respective synchronization signal blocks. The terminal device 2 is notified of the time indexes of the synchronization signal blocks by using the synchronization signal blocks. By using the time indexes of the synchronization signal blocks, it is possible for the terminal device 2 to acknowledge downlink transmission beams, radio frames, and/or sub frame boundaries of the base station device 1 in the synchronization signal blocks.

For example, the time index of the synchronization signal block is an offset value from a boundary of a slot or a sub frame.

For example, the time index of the synchronization signal block is indicated by an index of an OFDM symbol.

Examples of a notification of the time index of the synchronization signal block include a notification using a sequence of an NR-SS.

The examples of the notification of the time index of the synchronization signal block include a notification using information included in an NR-MIB.

The examples of the notification of the time index of the synchronization signal block include a notification using a bit mapping location of an NR-PBCH. As a specific example, the terminal device 2 is capable of acknowledging a time index of a synchronization signal block by using a mapping start location of an encoded bit of an NR-PBCH included in the synchronization signal block.

The examples of the notification of the time index of the synchronization signal block include a notification using a CRC mask of an NR-PBCH. As a specific example, a predetermined CRC mask corresponding to a time index is multiplexed with a CRC bit of an NR-PBCH, and then the NR-PBCH is transmitted. The terminal device 2 performs blind detection of a CRC mask that may be multiplexed with a CRC bit, through the CRC check. As a result of the CRC check, the terminal device 2 is capable of acknowledging a time index by using a value corresponding to a CRC mask that has succeeded in decoding the NR-PBCH.

The examples of the notification of the time index of the synchronization signal block include a notification using a sequence of an MRS.

Note that, in the case of the single beam operation, the terminal device 2 does not have to be notified of a time index of a synchronization signal block.

<System Information According to Present Embodiment>

The system information is information for broadcasting setting in a transmission target cell of the system information. For example, the system information includes information related to access to the transmission target cell of the system information, information related to cell selection, information related to another RAT or another system, or the like. The system information may be deemed as control information.

The system information is classified into an MIB and an SIB. The MIB is information that has a fixed payload size and that is broadcasted through a PBCH. The MIB includes information for acquiring the SIB. The SIB is system information other than the MIB. The SIB may be broadcasted through a PDSCH.

In addition, it is possible to classify the system information into first system information (corresponding to first control information), second system information (corresponding to second control information), and third system information (corresponding to third control information). The first system information and the second system information include information related to access to a transmission target cell of the system information, information related to acquisition of other system information, and information related to cell selection. In LTE, information included in the MIB is deemed as the first system information, and information included in an SIB 1 and an SIB 2 is deemed as the second system information. In the case where some pieces of the first system information and the second system information have not been acquired from a certain cell, the terminal device 2 assumes that access to the certain cell is prohibited. The third system information is system information other than the first system information and the second system information.

The MIB is information of a physical layer that is necessary to receive the system information. The MIB includes a downlink system bandwidth, a part of system frame numbers, SIB scheduling information, or the like.

The SIB 1 is scheduling information of system information other than the SIB 1 and cell access restriction information. The SIB 1 includes cell access information, cell selection information, maximum uplink transmission power information, TDD setting information, a system information cycle, system information mapping information, length of an SI window, or the like.

The SIB 2 includes connection prohibition information, common radio resource setting information (radioResourceConfigCommon), uplink carrier information, or the like. The common radio resource setting information includes setting information of a PRACH and an RACH that are common to cells. At the time of initial access, the terminal device 2 performs the random access procedure on the basis of the setting information of the PRACH and the RACH acquired from the SIB 2.

<System Information of NR According to Present Embodiment>

The system information is broadcasted by an NR cell also in NR.

A physical channel that carries the system information may be transmitted by a slot or a mini-slot. The mini-slot is defined by the number of symbols that is smaller than the number of symbols of the slot. Since the physical channel that carries the system information is transmitted by the mini-slot, it is possible to shorten necessary time for the beam sweep and it is possible to reduce overhead.

First System Information and Second System Information

The first system information is transmitted through an NR-PBCH, and the second system information is transmitted through a physical channel that is different from the NR-PBCH.

In the NR, the first system information preferably includes information specific to a terminal group. The base station device 1 transmits the first system information to the terminal group. More specifically, the base station device 1 transmits the first system information including the information specific to the terminal group, to the terminal group. The terminal group is a group including one or more terminal devices 2. On the other hand, the terminal device 2 receives the first system information transmitted to the terminal group to which one or more terminal devices including the own terminal device belongs. More specifically, the terminal device 2 receives the first system information including the information specific to the terminal group to which the terminal device 2 itself belongs.

For example, the terminal group is a group to which a plurality of terminal devices 2 belongs. The plurality of terminal devices 2 are grouped by a predetermined beam. Specifically, to the terminal group, some or all terminal devices 2 capable of receiving a predetermined beam transmitted by the base station device 1 may belong. In other words, to the terminal group, some or all terminal devices 2 that are located in an irradiation area of the predetermined beam transmitted by the base station device 1 may belong. In such cases, each of the terminal devices 2 belonging to the terminal group recognizes an identifier related to the predetermined beam. Specifically, the terminal device 2 recognizes an identifier related to a beam that has been successfully received. Since the identifier related to the beam that has been successfully received is recognized, it is also possible to recognize the terminal group to which the terminal device 2 itself belongs.

For example, the terminal group may be a group to which a plurality of terminal devices 2 belongs. The plurality of terminal devices 2 are grouped by a predetermined TRP. Specifically, to the terminal group, some or all terminal devices 2 capable of communicating with the predetermined TRP may belong. In such a case, each of the terminal devices 2 belonging to the terminal group recognizes an identifier related to the predetermined TRP. Specifically, the terminal device 2 recognizes an identifier related to the TRP that is capable of communication. Since the identifier related to the TRP that is capable of communication is recognized, it is also possible to recognize the terminal group to which the terminal device 2 itself belongs.

For example, the terminal group may be a group to which a plurality of terminal devices 2 belongs. The plurality of terminal devices 2 are grouped by a predetermined cell. Specifically, to the terminal group, some or all terminal devices 2 that connect to the predetermined cell may belong. In such a case, each of the terminal devices 2 belonging to the terminal group recognizes an identifier related to the predetermined cell. Specifically, the terminal device 2 recognizes an identifier related to the cell to which the terminal device 2 itself connects. Since the identifier related to the cell to which the terminal device 2 itself connects is recognized, it is also possible to recognize the terminal group to which the terminal device 2 itself belongs.

The above-described identifier recognized by the terminal device 2 is information specific to the terminal group to which the terminal device 2 belongs. For example, the identifier recognized by the terminal device 2 may be the above-described index (such as time index) of the synchronization signal block. In other words, the index of the synchronization signal block may be deemed as the information specific to the terminal group.

For example, the base station device 1 transmits synchronization signal blocks that are different for respective beams, by using the beams. Next, the terminal device 2 recognizes the index of the transmitted synchronization signal block by using the beam that has successfully received. Therefore, it can be said that the information specific to the terminal group is information specific to a beam that is receivable for a plurality of terminal devices 2 belonging to the terminal group.

For example, TRPs transmit respective synchronization signal blocks that are different for respective TRPs. Next, the terminal device 2 recognizes an index of a synchronization signal block transmitted from a TRP that is capable of communication. Therefore, it can be said that the information specific to the terminal group is information specific to a TRP that is capable of communication with a plurality of terminal devices 2 belonging to the terminal group.

For example, the base station device 1 transmits synchronization signal blocks that are different for respective cells, among cells operated by the base station device 1 itself. Next, the terminal device 2 recognizes an index of a synchronization signal block transmitted in a connected cell. Therefore, it can be said that the information specific to the terminal group is information specific to a cell that connects to a plurality of terminal devices 2 belonging to the terminal group.

Note that, the index of the synchronization signal block may be deemed as a piece of the first control information.

The first system information includes information that is necessary for acquiring at least the second system information.

For example, the first system information includes information related to a physical channel that carries the second system information. Details thereof will be described later.

For example, the first system information includes scheduling information of the physical channel that carries the second system information. Examples of the scheduling information include a cycle, a time offset, a central frequency, a bandwidth, and the like.

For example, the first system information includes information related to a transmittance scheme of the physical channel that carries the second system information. Examples of the information related to the transmittance scheme of the physical channel include the number of antenna ports of the physical channel, antenna port numbers, information related to a CRC, information related to the transmittance scheme such as Space Frequency Block Coding (SFBC), Frequency-Switched Transmit Diversity (FSTD), or Cyclic Delay Diversity, and the like.

For example, the first system information includes a system frame number.

For example, the first system information includes information related to a sub carrier interval that is used for transmission of the physical channel that carries at least the second system information.

For example, the first system information includes setting information of a common control subband.

The first system information and/or the second system information includes information related to at least the random access procedure. Specifically, the information related to the random access procedure is setting information of the NR-PRACH and the NR-RACH.

Examples of the setting information of the NR-PRACH and the NR-RACH include information related to a sequence of the NR-PRACH, information related to a resource of the NR-PRACH, information related to repetitive transmission of the NR-PRACH, and the like.

For example, the second system information includes information related to cell selection. Examples of the information related to cell selection include setting information related to evaluation of cell selection, setting information related to an access right to a neighbor cell, setting information related to a resource of an NR-SS of the neighbor cell, and the like.

Examples of the setting information related to evaluation of cell selection include a threshold of the evaluation of the cell selection, an offset for expanding a cell range, and the like.

Examples of the setting information related to the access right to the neighbor cell include a list of cells that deny access (black list), and the like.

Examples of the setting information related to the resource of the NR-SS of the neighbor cell include information related to a frequency place of the NR-SS, information related to a cycle of an NR-SS burst set, and the like.

Examples of the physical channel that carries the second system information include an NR-Secondary Physical Broadcast Channel (NR-SPBCH). The NR-SPBCH is a channel that is not scheduled by an NR-PDCCH. Information carried through the NR-SPBCH has a fixed payload size. The NR-SPBCH is periodically transmitted. The NR-SPBCH and the NR-PBCH are different in payload sizes, resource mapping, and cycles.

Examples of the physical channel that carries the second system information include an NR-PDSCH. The NR-PDSCH is scheduled by an NR-PDCCH to which a CRC scrambled by an SI-RNTI is attached. Note that, information carried through the NR-PDSCH is encoded by using an LDPC code.

The physical channel that carries the second system information is preferably transmitted by QPSK, whereas the physical channel may be transmitted by using another modulation scheme such as 16QAM or 64QAM.

In the NR, the second system information preferably includes information specific to a terminal group. The base station device 1 transmits the second system information to the terminal group. More specifically, the base station device 1 transmits the second system information including the information specific to the terminal group, to the terminal group. On the other hand, the terminal device 2 receives the second system information transmitted to the terminal group to which one or more terminal devices including the own terminal device belongs. More specifically, the terminal device 2 receives the second system information including the information specific to the terminal group to which the terminal device 2 itself belongs.

The terminal group is as described above. In other words, for example, the terminal group may be a group to which a plurality of terminal devices 2 belongs. The plurality of terminal devices 2 are grouped by a predetermined beam. In this case, each of the terminal devices 2 belonging to the terminal group recognizes an identifier related to the predetermined beam. Alternatively, for example, the terminal group may be a group to which a plurality of terminal devices 2 belongs. The plurality of terminal devices 2 are grouped by a predetermined TRP. In this case, each of the terminal devices 2 belonging to the terminal group recognizes an identifier related to the predetermined TRP. Alternatively, for example, the terminal group may be a group to which a plurality of terminal devices 2 belongs. The plurality of terminal devices 2 are grouped by a predetermined cell. In this case, each of the terminal devices 2 belonging to the terminal group recognizes an identifier related to the predetermined cell.

The base station device 1 transmits the second system information to the terminal group on the basis of the information specific to the terminal group. Next, the terminal devices 2 receive the second system information transmitted to the terminal group to which the terminal devices 2 belong, on the basis of the information specific to the terminal group. Here, for example, the information specific to the terminal group is information related to a synchronization signal block transmitted toward the terminal group. Specifically, the information specific to the terminal group may be information related to a synchronization signal block that is transmitted by using a beam receivable for the terminal devices 2 belonging to the terminal group. Alternatively, the information specific to the terminal group may be information related to a synchronization signal block that is transmitted from a TRP that is capable of communication with the terminal devices 2 belonging to the terminal group. Alternatively, the information specific to the terminal group may be information related to a synchronization signal block that is transmitted in a cell that connects to the terminal devices 2 belonging to the terminal group. Next, transmission and reception of the second system information based on the information specific to the terminal group will be described.

In NR, a physical channel that carries the second system information is associated with a physical channel that carries the first system information. The terminal devices 2 decode the second system information on the basis of the physical channel that carries the first system information.

Figure 21:
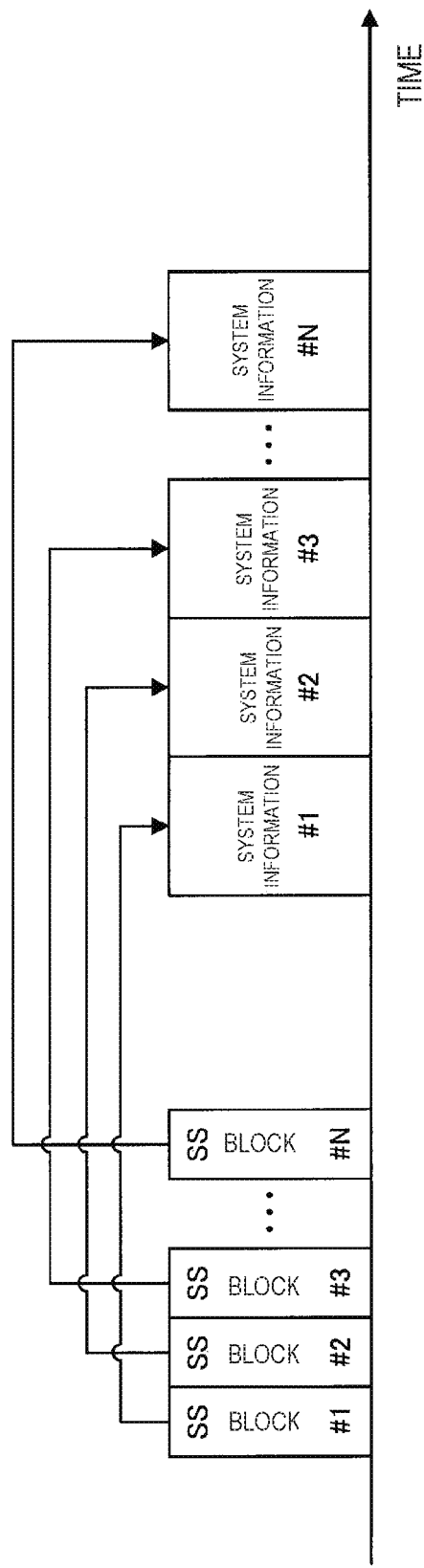
FIG. 21 is a diagram illustrating an example of system information corresponding to synchronization signal blocks according to the present embodiment.

FIG. 21 is a diagram illustrating an example of system information corresponding to synchronization signal blocks according to the present embodiment. In the example illustrated in FIG. 21, a synchronization signal block #1 to a synchronization signal block #N are transmitted, and then system information #1 to system information #N are transmitted. The synchronization signal block #1 is associated with the system information #1, and the synchronization signal block #2 is associated with the system information #2. As described above, synchronization signal blocks and system information are associated with each other on a one-to-one basis. The terminal device 2 decodes corresponding system information on the basis of a predetermined synchronization signal block, in the case where the predetermined synchronization signal block is received.

Therefore, the terminal device 2 acquires system information associated with the received synchronization signal block, and it becomes difficult to acquire system information associated with the other synchronization signal blocks that the terminal device 2 has not received. In other words, the terminal device 2 acquires the system information that is suitable for the terminal device 2, and the terminal device 2 does not have to acquire system information that is not suitable for the terminal device 2. In other words, the terminal device 2 is capable of acquiring only system information that is suitable for the terminal device 2.

Next, with reference to FIG. 22, a flow of a transmission process of the system information corresponding to the synchronization signal blocks illustrated in FIG. 21 will be described.

Figure 22:
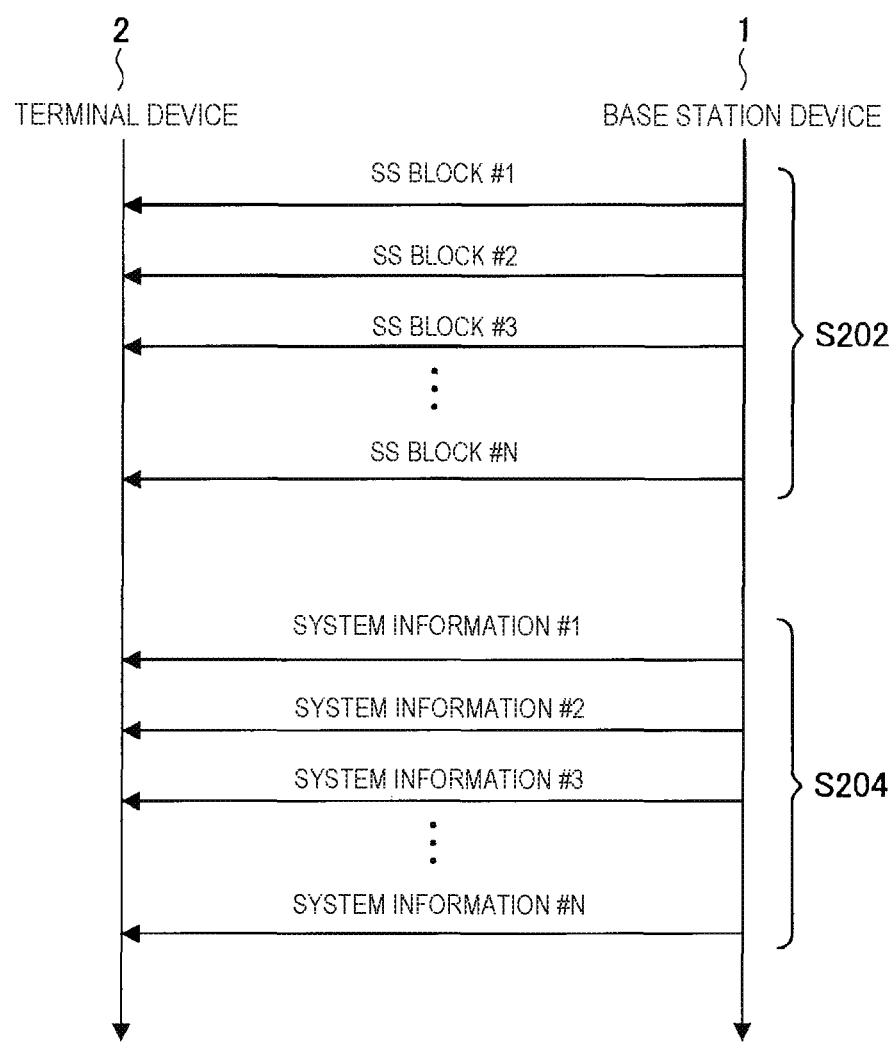
FIG. 22 is a sequence diagram illustrating an example of a flow of a transmission process of system information corresponding to synchronization signal blocks according to the present embodiment.

FIG. 22 is a sequence diagram illustrating an example of the flow of the transmission process of the system information corresponding to synchronization signal blocks according to the present embodiment. The base station device 1 and the terminal device 2 are involved in this sequence. As illustrated in FIG. 22, the base station device 1 first transmits respective synchronization signal (SS) blocks #1 to #N (Step S202). The terminal device 2 selects an SS block suitable for the terminal device 2, on the basis of reception quality of NR-SSs included in the SS blocks and decoding results of NR-PBCHs. Next, the base station device 1 transmits respective physical channels including system information #1 to system information #N (Step S204). By using information obtained from the selected SS block, the terminal device 2 receives a piece of system information associated with the selected SS block among the system information #1 to the system information #N.

As an example of the association, a resource of the physical channel that carries the second system information is decided on the basis of the physical channel that carries the first system information.

For example, the resource of the physical channel that carries the second system information is indicated by an NR-MIB included in an NR-PBCH. Information related to the resource is a part or all of a cycle, a time offset, a bandwidth, a central frequency, a resource block, and the number of repetitions.

For example, the resource of the physical channel that carries the second system information is decided on the basis of a condition for decoding the NR-PBCH. For example, the condition is a time index. Specifically, a correspondence relation between the time index and a time and/or frequency resource is decided, and the resource is decided on the basis of a value of the time index. The terminal device 2 tries to decode a physical channel after some sub frames on the basis of the time index for which the NR-PBCH has been detected.

For example, the resource of the physical channel that carries the second system information is fixed by a predetermined resource. For example, the resource is necessarily located in an initial sub frame.

For example, the resource of the physical channel that carries the second system information is scheduled by DCI of an NR-PDCCH placed in a CSS. In this case, a common control subband including the CSS is set by an NR-MIB included in an NR-PBCH. The common control subband is a control subband commonly set for the terminal devices 2 or the terminal group. Examples of the setting information of the common control subband include a bandwidth or a PRB of the control subband, a sub carrier interval, a CP length, a time period or the number of symbols of the common control subband, and the like. Some or all pieces of the setting information of the common control subband may be different for respective synchronization signal blocks. In other words, settings of the common control subband may be independent from synchronization signal blocks.

In addition, as an example of the association, the physical channel that carries the second system information is encrypted or encoded on the basis of information of the physical channel that carries the first system information. In addition, the physical channel that carries the second system information is decoded on the basis of information of the physical channel that carries the first system information. For example, identification information of a synchronization signal block is used as the information of the physical channel that carries the second system information. Examples of the identification information of the synchronization signal block include a time index of the synchronization signal block. In other words, the physical channel that carries the second control information may be encrypted or encoded on the basis of the information specific to the terminal group, and then it may be decrypted/decoded. Details thereof will be described below.

For example, the information of the physical channel that carries the first system information is used for scrambling the physical channel that carries the second system information. As a specific example, the identification information of the synchronization signal block is used for calculating an initial value $c_{init}$ of a scrambling sequence c. Note that, for example, the scrambling is performed in accordance with the following equation (1).

[Math. 1]

$$b(i)=(a(i)+c(i)) \bmod 2 \quad (1)$$

Here, in the equation (1), a(i) represents an i-th bit in a bit string before a scrambling process, b(i) represents an i-th bit in the bit string after the scrambling process, and c(i) represents an i-th bit in the scramble sequence.

For example, the information of the physical channel that carries the first system information is used for deciding a CRC mask of the physical channel that carries the second system information. A CRC is scrambled by using the CRC mask.

For example, the identification information of the synchronization signal block is used for deciding one of a plurality of CRC masks. A correspondence table of identification information of the synchronization signal blocks and CRC masks is defined, and a bit string of a CRC mask is uniquely decided with regard to a predetermined piece of the identification information. A table 1 is a diagram illustrating an example of the correspondence table of time indexes and CRC masks. Respective bit strings of CRC masks are associated with time indexes #0 to #N. The terminal device 2 acquires a bit string of a CRC mask from the acquired correspondence table of values of the time indexes and the CRC masks.

Note that, it is possible to apply the CRC masks to a control channel that schedules the physical channel that carries the second system information.

Note that, it is preferable to adopt a bit string with a long distance between codes as a candidate for the CRC mask.

TABLE 1

Example of correspondence table of time indexes and CRC masks

| Time index | CRC mask $<c_0, c_1, \ldots, c_{15}>$ |
|---|---|
| 0 | <0, 0, 0, 0, 0, 0, 0, 0, 0, 0, 0, 0, 0, 0, 0, 0> |
| 1 | <1, 1, 1, 1, 1, 1, 1, 1, 1, 1, 1, 1, 1, 1, 1, 1> |

TABLE 1-continued

Example of correspondence table of time indexes and CRC masks

| Time index | CRC mask $<c_0, c_1, \ldots, c_{15}>$ |
|---|---|
| 2 | <0, 1, 0, 1, 0, 1, 0, 1, 0, 1, 0, 1, 0, 1, 0, 1> |
| . | . |
| . | . |
| . | . |
| N | <1, 0, 1, 0, 1, 0, 1, 0, 1, 0, 1, 0, 1, 0, 1, 0> |

For example, the identification information of the synchronization signal block is used for calculating a value of an SI-RNTI. As a specific example, the SI-RNTI is calculated by using the following equation:

$$\text{SI-RNTI} = A \cdot \text{time index} + C$$

Here, A and C are predetermined constants. The terminal device 2 descrambles a CRC by using a CRC mask obtained by converting the SI-RNTI into a bit string.

As described above, according to the present embodiment, the system information including the information specific to the terminal group is transmitted to the terminal group. This is beneficial for various kinds of use cases.

For example, a use case is considered. In the use case, first system information and second system information including information specific to a small cell are transmitted to a plurality of terminal devices 2 that connects with the small cell. For example, information common to macro cells is transmitted as system information of the macro cells, and pieces of information that are different between small cells are transmitted as the first system information and the second system information. This reduces overhead related to transmission of system information. Therefore, it is possible to improve transmission efficiency of the whole system.

For another example, a use case is considered. In the use case, first system information and second system information including information specific to a beam are transmitted to a plurality of terminal devices 2 that establish communication by using the beam. Also in this case, it is possible to reduce overhead related to transmission of system information in a similar way. Therefore, it is possible to improve transmittance efficiency of the whole system.

Third System Information

In addition, in NR, system information (that is, third system information) other than the first system information and the second system information is also broadcasted. Examples of the third system information include information related to MBMS, information related to side link communication, information related to emergency alert, and the like.

The third system information is transmitted through the NR-PDSCH. The NR-PDSCH is scheduled by DCI to which a CRC scrambled by an SI-RNTI is attached.

Preferably, the third system information is further divided into a plurality of pieces of system information on the basis of difference in system information request conditions. The pieces of divided system information are also referred to as system information blocks. The respective blocks of the divided third system information are transmitted through NR-PDSCHs. The different system information blocks are broadcasted in different cycles.

The respective system information blocks may correspond to unique SI-RNTIs. In other words, CRCs scrambled using different SI-RNTIs are attached to respective pieces of NR-DCI for scheduling NR-PDSCHs including different system information blocks.

The third system information does not have to be transmitted or broadcasted periodically. For example, the third system information may be transmitted in response to a control information request that requests to transmit control information. The control information request may also be referred to as a system information (SI) request. The base station device 1 that has received the system information request transmits third system information in response to the system information request. The third system information may be broadcasted to a plurality of terminal devices 2, or may be notified specifically to a terminal device 2 that is a transmission source of the system information request. For example, the base station device 1 receives the system information request, and transmits the third system information based on the system information request to the terminal device 2 that is the transmission source of the system information request or a terminal group to which the transmission source terminal device 2 that is the transmission source belongs. On the other hand, the terminal device 2 transmits the system information request, and receives the third system information transmitted to the terminal device 2 or the terminal group to which the terminal device 2 belongs, on the basis of the system information request.

Figure 23:
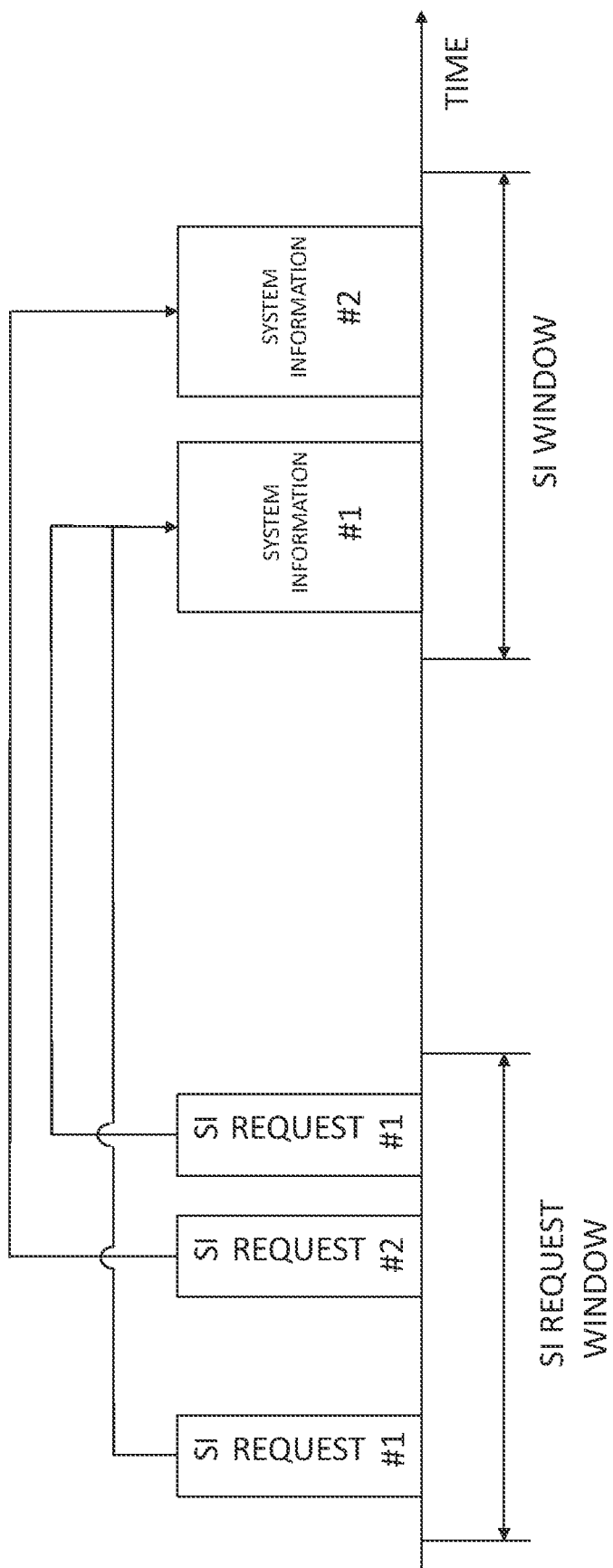
FIG. 23 is a diagram illustrating an example of system information corresponding to system information requests according to the present embodiment.

FIG. 23 is a diagram illustrating an example of system information corresponding to system information requests according to the present embodiment. In FIG. 23, system information #1 and system information #2 are system information blocks that are different from each other. In addition, the system information #1 corresponds to a system information request #1, and the system information #2 corresponds to a system information request #2. As illustrated in FIG. 23, each terminal device 2 transmits a system information request associated with desired system information, to the base station device 1 in a term of a system information (SI) request window. The base station device 1 transmits requested system information in a term of a predetermined system window, in the case where the base station device 1 has normally detected the system information requests transmitted from the respective terminal devices 2. The system information may be transmitted to all the terminal devices 2 in a cell, or may be transmitted to a predetermined terminal group. The terminal devices 2 try to acquire system information in the term of the system information window.

Next, with reference to FIG. 24, a flow of a transmission process of the system information corresponding to the system information requests illustrated in FIG. 23 will be described.

Figure 24:
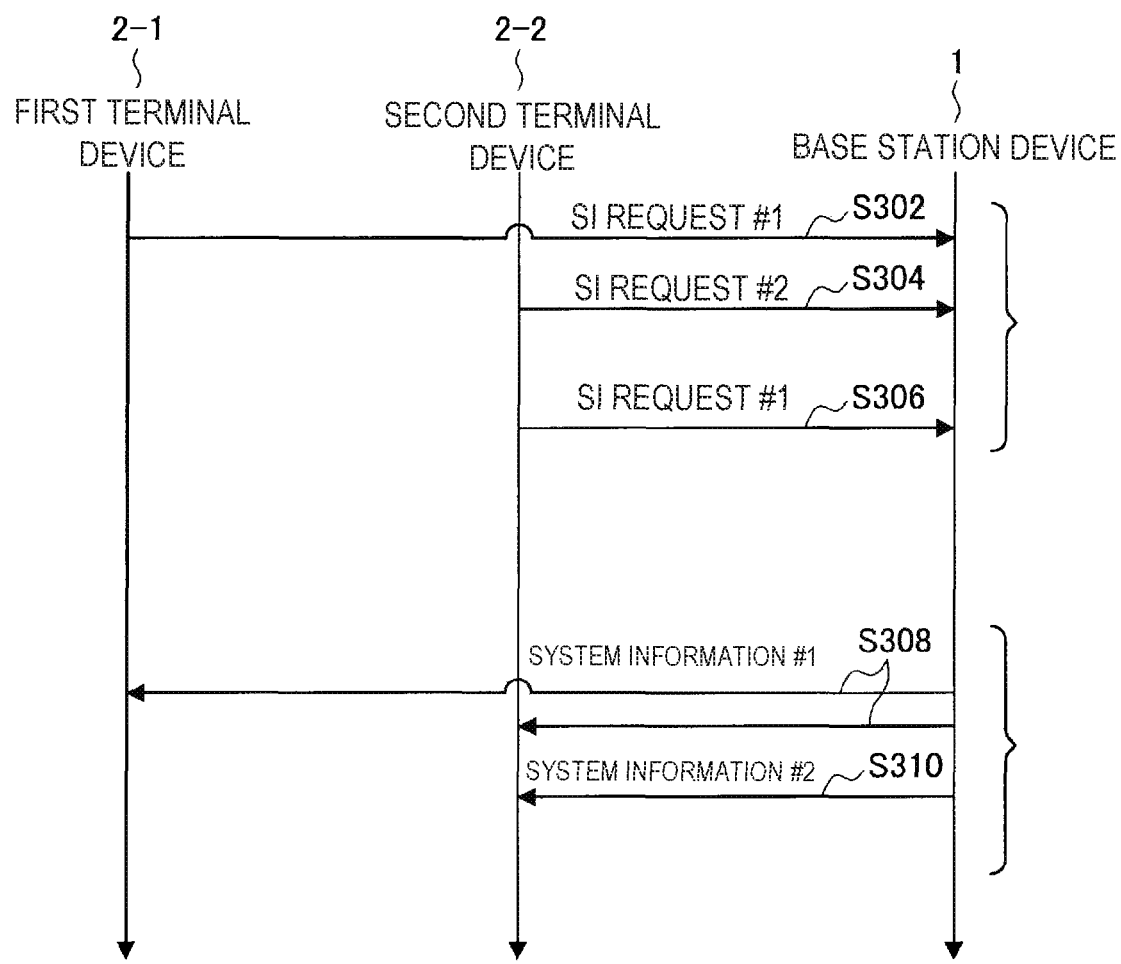
FIG. 24 is a sequence diagram illustrating an example of a flow of a transmission process of system information corresponding to system information requests according to the present embodiment.

FIG. 24 is a sequence diagram illustrating an example of the flow of the transmission process of system information corresponding to system information requests according to the present embodiment. In FIG. 24, system information #1 and system information #2 are system information blocks that are different from each other. In addition, the system information #1 corresponds to a system information (SI) request #1, and the system information #2 corresponds to a system information (SI) request #2. First, in a term of a system information request window, a first terminal device 2-1 transmits the system information request #1 to the base station device 1 (Step S302). In addition, in the term of the system information request window, a second terminal device 2-2 transmits the system information request #1 and the system information request #2 to the base station device 1 (Steps S304 and S306). In the case where the base station device 1 has normally detected the system information requests, the base station device 1 transmits the system information #1 to the first terminal device 2-1 and the second terminal device 2-2 (Step S308) and transmits the system information #2 to the second terminal device 2-2 (Step S310) in the term of the system information window. Note that, the system information #2 may be transmitted to the first terminal device 2, and the terminal device 2 may try to acquire the system information #2.

System Information Request

Examples of the uplink channels or signals used for the system information requests from the terminal devices 2 include NR-PRACHs, NR-SRSs, NR-PUCCHs, NR-PUSCHs, and the like.

In the idol mode or in the inactive mode, it is preferable for the terminal device 2 to make a system information request through the NR-PRACH. In other words, in a case where the terminal device 2 is in the idol mode or the inactive mode, it is desirable for the terminal device 2 to transmit the system information request through a physical channel for transmitting a random access preamble. In this case, a preamble of the NR-PRACH and/or an NR-PRACH resource are associated with a type of a requested system information block. In the case where a predetermined system information is desired, the terminal device 2 transmits the NR-PRACH by using the NR-PRACH resource and/or the NR-PRACH preamble corresponding to the requested system information. This enables the terminal device 2 to acquire the desired information by transmitting the NR-PRACH preamble in accordance with the desired information. Therefore, it is possible to reduce overhead in comparison with the case where the system information request is separately transmitted.

In the connected mode, it is preferable for the terminal device 2 to make a system information request through the NR-PUCCH or the NR-PUSCH. In this case, the base station device 1 is notified of information related to the type of the requested system information.

An example of a system information request transmission process will be described. First, the terminal device 2 acquires a broadcast state of the third system information from the first system information and/or the second system information. In the case where desired system information is broadcasted, the terminal device 2 tries to acquire the system information on the basis of set scheduling information (cycle of system information and period of SI window). On the other hand, in the case where the desired system information is not broadcasted, the terminal device 2 makes a desired system information request in a set system information (SI) request window and tries to acquire the desired system information transmitted in the SI window.

Another example of a system information request transmission process will be described. First, the terminal device 2 acquires a broadcast state of the third system information from the first system information and/or the second system information. In the case where desired system information is broadcasted, the terminal device 2 tries to acquire the system information on the basis of set scheduling information (cycle of system information and period of SI window). On the other hand, in the case where the desired system information is not broadcasted, the terminal device 2 tries to acquire the desired system information transmitted in the SI window. Next, in the case where the desired system information has not been sequentially read a predetermined number of times, the desired system information request is made in the set system information (SI) request window, and it is tried to acquire the desired system information transmitted in the SI window. Note that, the predetermined number of times may be set by using the first system information or the second system information.

An example of a system information transmission process performed in response to a system information request, will be described. After a system information request is normally received, the base station device 1 periodically broadcasts the third system information corresponding to the received system information request. At the same time, the base station device 1 updates a field indicating a broadcast state of the third system information from a state indicating that the third system information is not broadcasted, to a state indicating that the third system information is broadcasted. In addition, the base station device 1 transmits the third system information corresponding to the received system information request, from a system information window that is immediately after the reception of the system information request. Alternatively, the base station device 1 transmits the third system information corresponding to the received system information request, from a system information window after a modification period elapses since the reception of the system information request. On the other hand, the terminal device 2 tries to acquire third system information in a period of a system information window.

Another example of the system information transmission process performed in response to a system information request, will be described. After a system information request is normally received, the base station device 1 transmits the third system information a predetermined number of times, the third system information corresponding to the received system information request. After the predetermined number of transmissions, the base station device 1 stops transmission of the third system information. For example, the predetermined number of times may be the number of redundancy versions of the NR-PDSCH. For example, the predetermined number of times is set by using the first system information and/or the second system information. On the other hand, the terminal device 2 tries to acquire the third system information in a period of a system information window.

Note that, in the above-described example, the terminal device 2 may transmit an HARQ response in response to reception of the system information. It is possible for the terminal device 2 to send an HARQ response in response to reception of system information, by using the NR-PRACH, the NR-PUSCH, or the NR-PUCCH resource independently set for the terminal device 2 or associated with the terminal device 2. By receiving the HARQ response, the base station device 1 is capable of determining to transmit or stop the system information. Therefore, it is possible for the base station device 1 to recognize that each terminal device 2 has normally acquired the system information, and this enables more effective broadcasting.

In the case where the desired system information is acquired, it is preferable to transmit no system information request during a predetermined period of time in view of power to be consumed by the terminal devices 2 and efficiency of radio resources. For example, the predetermined period of time is a timer representing relative time from acquisition time. For example, the predetermined period of time is indicated by absolute time such as a predetermined system frame number or the like. For example, the predetermined period of time may be a system information modification period. For example, the predetermined period of time is time until a notification of change in SI is issued through paging or the like.

Information of the system information request window is included in the first system information and/or the second system information. The system information request window is set in a predetermined cycle, a predetermined time offset, and a predetermined period. For example, information related to the predetermined cycle is represented by a system frame number. For example, information related to a predetermined period is represented by a number of sub frames or a number of slots. In addition, the system information request window may be decided further on the basis of information related to a reception beam of the base station device 1. Examples of the information related to the reception beam of the base station device 1 include the time index.

Information of the system information window corresponding to the system information request is included in the first system information and/or the second system information. The system information window is set in a predetermined cycle, a predetermined time offset, and a predetermined period. For example, information related to the predetermined cycle is represented by a system frame number. For example, information related to a predetermined period is represented by a number of sub frames or a number of slots. In addition, the system information window may be decided further on the basis of information related to a reception beam of the base station device 1. Examples of the information related to the reception beam of the base station device 1 include the time index.

Before sending the system information request, the terminal device 2 flushes a broadcast HARQ process. The broadcast HARQ process is an HARQ process for receiving the system information.

Note that, the first system information and the second system information may be sent through a same physical channel. For example, the first system information and the second system information may be sent through an NR-PBCH.

3. APPLICATION EXAMPLES

The technology according to the present disclosure can be applied to various products. For example, the base station device 1 may be realized as any type of evolved Node B (eNB) such as a macro eNB or a small eNB. The small eNB may be an eNB that covers a cell, such as a pico eNB, a micro eNB, or a home (femto) eNB, smaller than a macro cell. Instead, the base station device 1 may be realized as another type of base station such as a NodeB or a base transceiver station (BTS). The base station device 1 may include a main entity (also referred to as a base station device) that controls wireless communication and one or more remote radio heads (RRHs) disposed at different locations from the main entity. Further, various types of terminals to be described below may operate as the base station device 1 by performing a base station function temporarily or semi-permanently.

Further, for example, the terminal device 2 may be realized as a mobile terminal such as a smartphone, a tablet personal computer (PC), a notebook PC, a portable game terminal, a portable/dongle mobile router or a digital camera, or an in-vehicle terminal such as a car navigation device. Further, the terminal device 2 may be realized as a terminal that performs machine to machine (M2M) communication (also referred to as a machine type communication (MTC) terminal). Moreover, the terminal device 2 may be a wireless communication module mounted on the terminal (for example, an integrated circuit module configured on one die).

<3.1. Application Examples for Base Station Device>

First Application Example

Figure 25:
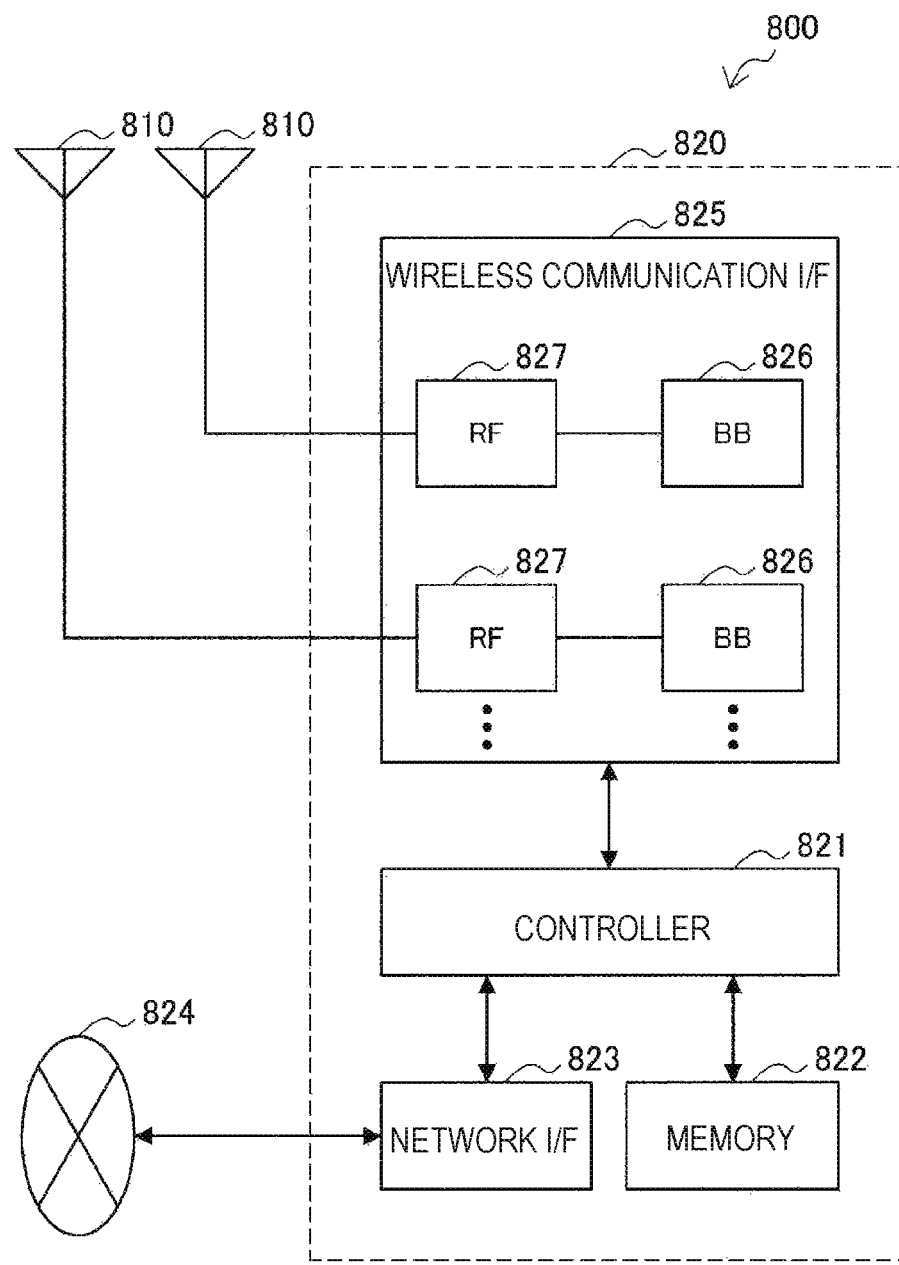
FIG. 25 is a block diagram illustrating a first example of a schematic configuration of an eNB.

FIG. 25 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g., a plurality of antenna elements constituting a MIMO antenna) and is used for the base station apparatus 820 to transmit and receive a wireless signal. The eNB 800 may include the plurality of the antennas 810 as illustrated in FIG. 25, and the plurality of antennas 810 may, for example, correspond to a plurality of frequency bands used by the eNB 800. It should be noted that while FIG. 25 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the eNB 800 may be connected to a core network node or another eNB through a logical interface (e.g., S1 interface or X2 interface). The network interface 823 may be a wired communication interface or a wireless communication interface for wireless backhaul. In the case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826, an RF circuit 827, and the like. The BB processor 826 may, for example, perform encoding/decoding, modulation/demodulation, multiplexing/demultiplexing, and the like, and performs a variety of signal processing on each layer (e.g., L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further, the module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 25, and the plurality of BB processors 826 may, for example, correspond to a plurality of frequency bands used by the eNB 800. Further, the wireless communication interface 825 may also include a plurality of the RF circuits 827, as illustrated in FIG. 25, and the plurality of RF circuits 827 may, for example, correspond to a plurality of antenna elements. Note that FIG. 25 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 25, the higher layer processing unit 101, the control unit 103, the receiving unit 105 and/or the transmitting unit 107 described with reference to FIG. 8 may be implemented by the wireless communication interface 825 (such as the BB processor 826 and/or the RF circuit 827), the controller 821 and/or the network interface 823. For example, the wireless communication interface 825, the controller 821 and/or the network interface 823 may transmit the first control information and the second control information, or may receive a control information request and transmit corresponding third control information. For example, a processor included in the wireless communication interface 825 may implement the functions for performing such operation. The eNB 800, the base station device 820, or the module may be provided as a device that performs such operation. In addition, it is possible to provide a program that causes a processor to perform the above-described operation. In addition, it is possible to provide a readable recording medium having the above-described program recorded thereon. In addition, the antenna 810 may implement the transceiving antenna 109.

Second Application Example

Figure 26:
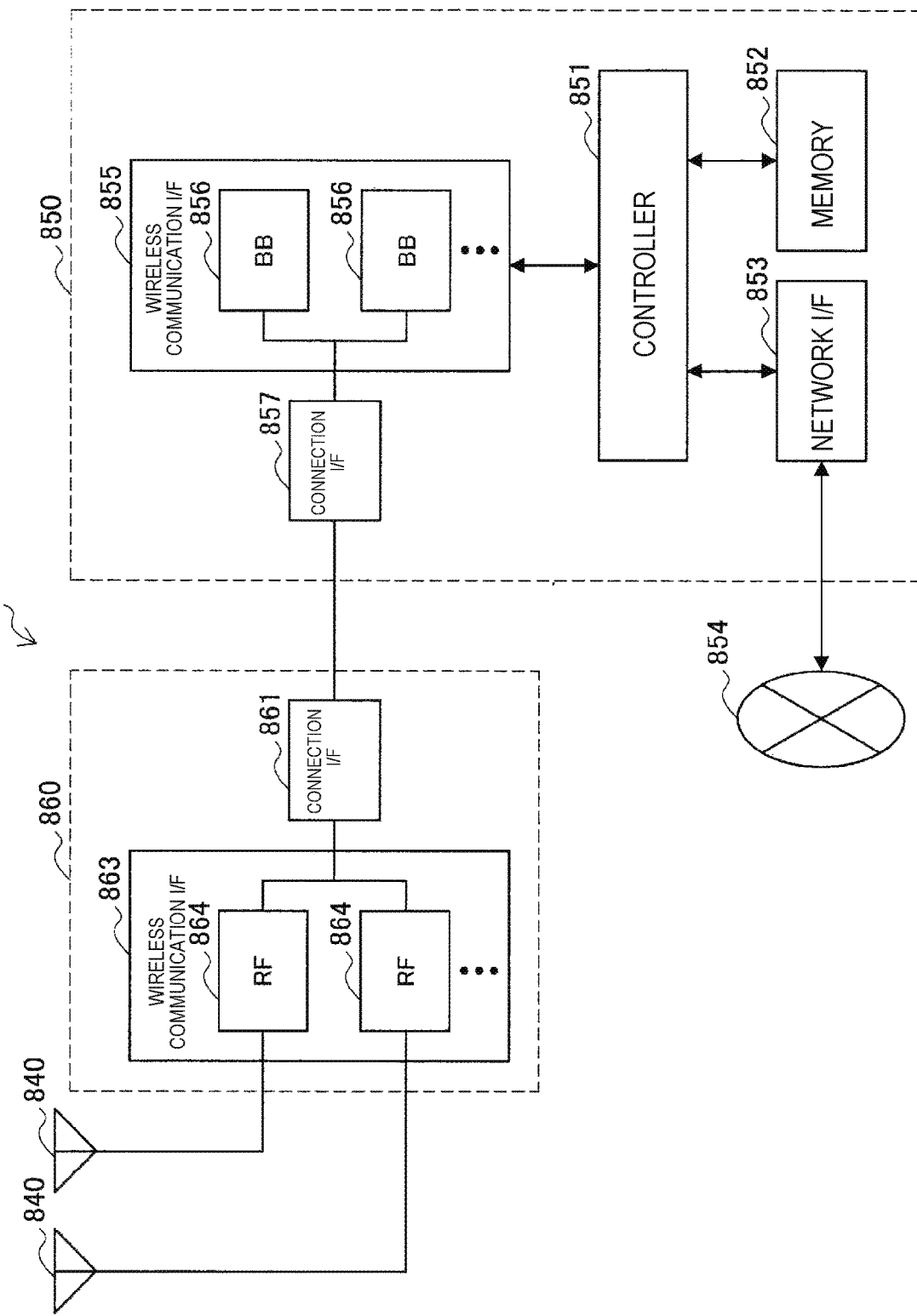
FIG. 26 is a block diagram illustrating a second example of the schematic configuration of the eNB.

FIG. 26 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. Further, the base station apparatus 850 and the RRH 860 may be connected to each other by a high speed line such as optical fiber cables.

Each of the antennas 840 includes a single or a plurality of antenna elements (e.g., antenna elements constituting a MIMO antenna), and is used for the RRH 860 to transmit and receive a wireless signal. The eNB 830 may include a plurality of the antennas 840 as illustrated in FIG. 26, and the plurality of antennas 840 may, for example, correspond to a plurality of frequency bands used by the eNB 830. Note that FIG. 26 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 25.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 25 except that the BB processor 856 is connected to an RF circuit 864 of the RRH 860 via the connection interface 857. The wireless communication interface 855 may include a plurality of the BB processors 856, as illustrated in FIG. 26, and the plurality of BB processors 856 may, for example, correspond to a plurality of frequency bands used by the eNB 830. Note that FIG. 26 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the high speed line.

The wireless communication interface 863 transmits and receives a wireless signal via the antenna 840. The wireless communication interface 863 may typically include the RF circuit 864 or the like. The RF circuit 864 may include a mixer, a filter, an amplifier and the like, and transmits and receives a wireless signal via the antenna 840. The wireless communication interface 863 may include a plurality of the RF circuits 864 as illustrated in FIG. 26, and the plurality of RF circuits 864 may, for example, correspond to a plurality of antenna elements. Note that FIG. 26 illustrates an example in which the wireless communication interface 863 includes the plurality of RF circuits 864, but the wireless communication interface 863 may include the single RF circuit 864.

In the eNB 830 illustrated in FIG. 26, the higher layer processing unit 101, the control unit 103, the receiving unit 105 and/or the transmitting unit 107 described with reference to FIG. 8 may be implemented by the wireless communication interface 855, the wireless communication interface 863 (such as the BB processor 856 and/or the RF circuit 864), the controller 851 and/or the network interface 853. For example, the wireless communication interface 855, the wireless communication interface 863, the controller 851 and/or the network interface 853 may transmit the first control information and the second control information, or may receive a control information request and transmit corresponding third control information. For example, a processor included in the wireless communication interface 855 and/or the wireless communication interface 863 may implement the functions for performing such operation. The eNB 830, the base station device 850, or the module may be provided as a device that performs such operation. In addition, it is possible to provide a program that causes a processor to perform the above-described operation. In addition, it is possible to provide a readable recording medium having the above-described program recorded thereon. In addition, the antenna 840 may implement the transceiving antenna 109.

<3.2. Application Examples for Terminal Device>

First Application Example

Figure 27:
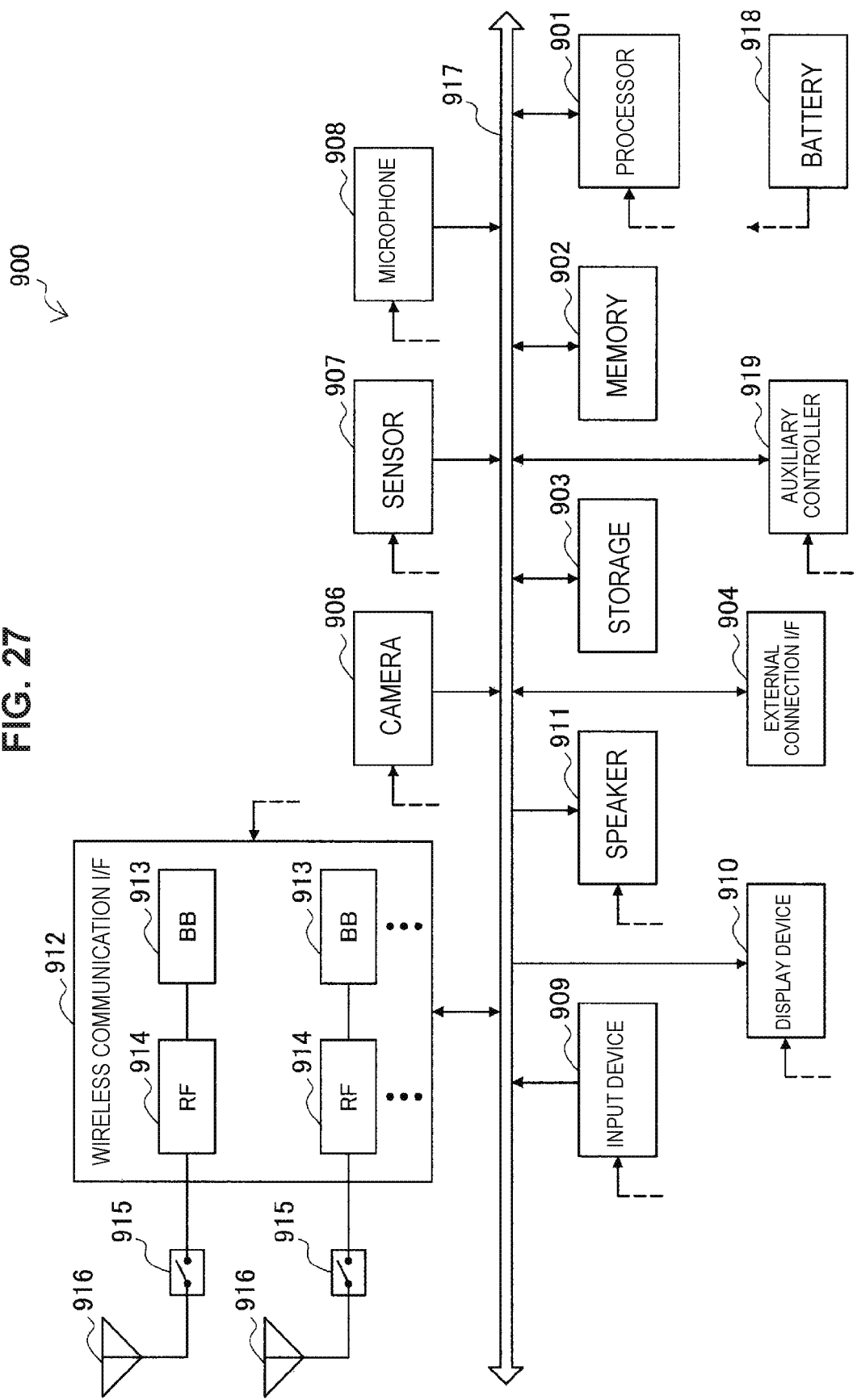
FIG. 27 is a block diagram illustrating an example of a schematic configuration of a smartphone.

FIG. 27 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes, for example, an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, an acceleration sensor and the like. The microphone 908 converts a sound that is input into the smartphone 900 to an audio signal. The input device 909 includes, for example, a touch sensor which detects that a screen of the display device 910 is touched, a key pad, a keyboard, a button, a switch or the like, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 27. Note that FIG. 27 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 27. Note that FIG. 27 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies electric power to each block of the smartphone 900 illustrated in FIG. 27 via a feeder line that is partially illustrated in the figure as a dashed line. The auxiliary controller 919, for example, operates a minimally necessary function of the smartphone 900 in a sleep mode.

In the smartphone 900 illustrated in FIG. 27, the higher layer processing unit 201, the control unit 203, the receiving unit 205 and/or the transmitting unit 207 described with reference to FIG. 9 may be implemented by the wireless communication interface 912 (such as the BB processor 913 and/or the RF circuit 914), the processor 901 and/or the auxiliary controller 919. For example, the wireless communication interface 912, the processor 901 and/or the auxiliary controller 919 may receive the first control information and the second control information, or may transmit a control information request and receive corresponding third control information. For example, a processor included in the wireless communication interface 912 may implement the functions for performing such operation. The smartphone 900 or the module described above may be provided as a device that performs such operation. In addition, it is possible to provide a program that causes a processor to perform the above-described operation. In addition, it is possible to provide a readable recording medium having the above-described program recorded thereon. In addition, the antenna 916 may implement the transceiving antenna 209.

Second Application Example

Figure 28:
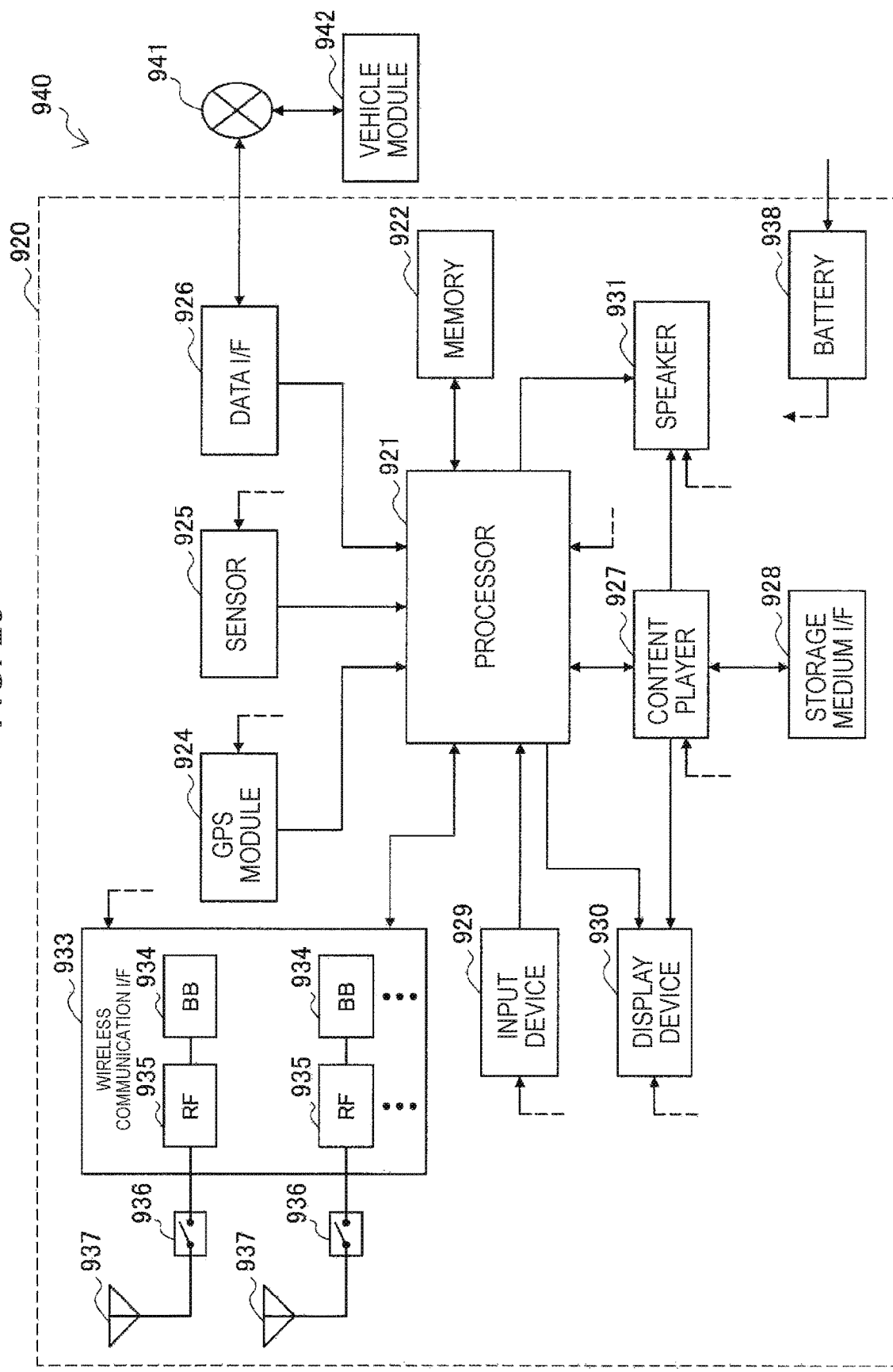
FIG. 28 is a block diagram illustrating an example of a schematic configuration of a car navigation apparatus.

FIG. 28 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g., latitude, longitude, and altitude) of the car navigation apparatus 920. The sensor 925 may include a sensor group including, for example, a gyro sensor, a geomagnetic sensor, a barometric sensor and the like. The data interface 926 is, for example, connected to an in-vehicle network 941 via a terminal that is not illustrated, and acquires data such as vehicle speed data generated on the vehicle side.

The content player 927 reproduces content stored in a storage medium (e.g., CD or DVD) inserted into the storage medium interface 928. The input device 929 includes, for example, a touch sensor which detects that a screen of the display device 930 is touched, a button, a switch or the like, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 28. Note that FIG. 28 illustrates an example in which the wireless communication interface 933 includes a plurality of BB processors 934 and a plurality of RF circuits 935, but the wireless communication interface 933 may include a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 may include a plurality of antennas 937 as illustrated in FIG. 28. Note that FIG. 28 illustrates an example in which the car navigation apparatus 920 includes a plurality of antennas 937, but the car navigation apparatus 920 may include a single antenna 937.

Further, the car navigation apparatus 920 may include the antenna 937 for each wireless communication system. In this case, the antenna switch 936 may be omitted from a configuration of the car navigation apparatus 920.

The battery 938 supplies electric power to each block of the car navigation apparatus 920 illustrated in FIG. 28 via a feeder line that is partially illustrated in the figure as a dashed line. Further, the battery 938 accumulates the electric power supplied from the vehicle.

In the car navigation apparatus 920 illustrated in FIG. 28, the higher layer processing unit 201, the control unit 203, the receiving unit 205 and/or the transmitting unit 207 described with reference to FIG. 9 may be implemented by the wireless communication interface 933 (such as the BB processor 934 and/or the RF circuit 935), and/or the processor 921. For example, the wireless communication interface 933 and/or the processor 921 may receive the first control information and the second control information, or may transmit a control information request and receive corresponding third control information. For example, a processor included in the wireless communication interface 933 may implement the functions for performing such operation. The car navigation apparatus 920 or the module described above may be provided as a device that performs such operation. In addition, it is possible to provide a program that causes a processor to perform the above-described operation. In addition, it is possible to provide a readable recording medium having the above-described program recorded thereon. In addition, the antenna 937 may implement the transceiving antenna 209.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

4. CONCLUSION

With reference to FIG. 1 to FIG. 28, details of the embodiment of the present disclosure have been described above. As described above, the base station device 1 according to the present embodiment transmits first control information including information specific to a terminal group, to the terminal group including one or more terminal devices, and transmits second control information to the terminal group on the basis of the information specific to the terminal group. As described above, the first control information and the second control information are transmitted to the terminal group to which one or more terminal devices belong. Therefore, it is possible for the base station device 1 to notify the plurality of terminal devices 2 of control information that is common to the terminal group, through one-time transmission. Therefore, it is possible to reduce overhead of control information in comparison with a case where control information is notified to each terminal device. In addition, it is also possible to perform control more flexibly in comparison with a case where the same control information is transmitted to all the terminal devices 2. As a result, it is possible to improve transmission efficiency of the wireless communication system.

In addition, the terminal device 2 according to the present embodiment receives the first control information that includes information specific to the terminal group and that has been transmitted to the terminal group to which one or more terminal devices including the own terminal device 2 belongs, and receives the second control information transmitted to the terminal group, on the basis of the information specific to the terminal group. This enables the terminal device 2 to operate under the flexible control performed by the base station device 1 on the plurality of terminal devices 2.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In the processes described with reference to the flowcharts and the sequence diagrams in the present specification may not necessarily be performed in the sequences illustrated in the drawings. Several processing steps may be performed in parallel. In addition, additional processing steps may be adopted or some of the processing steps may be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A base station device including a transmission processing unit configured to transmit first control information including information specific to a terminal group, to the terminal group including one or more terminal devices, and transmit second control information to the terminal group on the basis of the information specific to the terminal group.

(2)

The base station device according to (1), in which a part of a plurality of terminal devices that connects to a predetermined cell belongs to the terminal group.

(3)

The base station device according to (1), in which the information specific to the terminal group is information specific to a beam that is receivable for the plurality of terminal devices belonging to the terminal group.

(4)

The base station device according to (3), in which the information specific to the beam is an index of a synchronization signal block transmitted by using the beam.

(5) The base station device according to any one of (1) to (4), in which the first control information includes information related to a physical channel that carries the second control information.

(6)

The base station device according to any one of (1) to (5), in which the physical channel that carries the second control information is encrypted or encoded on the basis of the information specific to the terminal group.

(7)

The base station device according to any one of (1) to (6), in which the first control information is transmitted through a broadcast channel, and the second control information is transmitted through a physical channel that is different from the broadcast channel.

(8)

The base station device according to any one of (1) to (7), further including a reception processing unit configured to receive a control information request that requests transmission of control information, in which the transmission request unit transmits third control information based on the control information request, to the terminal group to which the terminal device that is a transmission source of the control information request belongs.

(9)

A terminal device including a reception processing unit configured to receive first control information that includes information specific to a terminal group and that has been transmitted to the terminal group to which one or more terminal devices including the own terminal device belong, and receive second control information transmitted to the terminal group, on the basis of the information specific to the terminal group.

(10)

The terminal device according to (9), further including a transmission processing unit configured to transmit a control information request that requests transmission of control information, in which the reception processing unit receives third control information that has been transmitted to the terminal group and that is based on the control information request.

(11)

The terminal device according to (10), in which, in a case where the terminal device is in an idol mode or an inactive mode, the transmission processing unit transmits the control information request through a physical channel for transmitting a random access preamble.

(12)

The terminal device according to (11), in which the transmission processing unit transmits a random access preamble corresponding to requested control information.

(13)

The terminal device according to (11) or (12), in which the transmission processing unit transmits a random access preamble through a resource corresponding to requested control information.

(14)

The terminal device according to any one of (10) to (13), in which the reception processing unit decrypts or decodes a physical channel that carries the second control information on the basis of the information specific to the terminal group.

(15)

A method to be executed by a processor, the method including:

transmitting first control information including information specific to a terminal group, to the terminal group including one or more terminal devices; and transmitting second control information to the terminal group on the basis of the information specific to the terminal group.

(16)

A method to be executed by a processor, the method including:

receiving first control information that includes information specific to a terminal group and that has been transmitted to the terminal group to which one or more terminal devices including an own terminal device belong; and receiving second control information transmitted to the terminal group, on the basis of the information specific to the terminal group.

(17)

A recording medium having a program recorded thereon, the program causing a computer to function as a transmission processing unit configured to transmit first control information including information specific to a terminal group, to the terminal group including one or more terminal devices, and transmit second control information to the terminal group on the basis of the information specific to the terminal group.

(18)

A recording medium having a program recorded thereon, the program causing a computer to function as a reception processing unit configured to receive first control information that includes information specific to a terminal group and that has been transmitted to the terminal group to which one or more terminal devices including an own terminal device belong, and receive second control information transmitted to the terminal group, on the basis of the information specific to the terminal group.

REFERENCE SIGNS LIST 1 base station device
101 higher layer processing unit
103 control unit
105 receiving unit
1051 decoding unit
1053 demodulating unit
1055 demultiplexing unit
1057 wireless receiving unit
1059 channel measuring unit
107 transmitting unit
1071 encoding unit
1073 modulating unit
1075 multiplexing unit
1077 wireless transmitting unit
1079 downlink reference signal generating unit
109 transceiving antenna
2 terminal device
201 higher layer processing unit
203 control unit
205 receiving unit
2051 decoding unit
2053 demodulating unit
2055 demultiplexing unit
2057 wireless receiving unit
2059 channel measuring unit
207 transmitting unit
2071 encoding unit
2073 modulating unit
2075 multiplexing unit
2077 wireless transmitting unit
2079 uplink reference signal generating unit
209 transceiving antenna

The invention claimed is:

1. A communication apparatus comprising:
circuitry configured to
receive a synchronization signal block composed of a synchronization signal and PBCH (Physical Broadcast Channel);

receive a physical channel including PDSCH (Physical Downlink Shared Channel), the PDSCH being scheduled by PDCCH (Physical Downlink Control Channel), and the PDCCH being located in a common search space and being added CRC (Cyclic Redundancy Check) which is scrambled by SI-RNTI (System Information Radio Network Temporary identifier); and set configuration of connection to a cell, based on first system information included in the PBCH, and second system information included in the PDSCH, wherein a resource of the physical channel scheduled for the PDSCH is determined based on the first system information and an index of the synchronization signal block.

2. The communication apparatus according to claim 1, wherein the resource of the physical channel scheduled for the PDSCH is determined based on a time offset specified in the first system information.

3. The communication apparatus according to claim 1, wherein the first system information includes at least one of a number of resource blocks of a common control subband for the common search space, a number of symbols of the common control subband for the common search space, and a subcarrier spacing of the common control subband for the common search space.

4. The communication apparatus according to claim 1, wherein the circuitry is further configured to receive a RS (Reference Signal) for demodulating the PBCH, wherein the index of the synchronization signal block is allocated to the synchronization signal block, and the index of the synchronization signal block is determined based on a series of received RSs or information included in the PBCH.

5. The communication apparatus according to claim 4, wherein the index of the synchronization signal block is further determined based on the information included in the PBCH.

6. The communication apparatus according to claim 4, wherein the PBCH is scrambled based on a physical cell identifier obtained from a PSS (Primary Synchronization Signal) or a SSS (Secondary Synchronization Signal), and based on the index of the synchronization signal block.

7. The communication apparatus according to claim 4, wherein the circuitry is configured to receive the synchronization signal block by determining a period of transmitting the synchronization signal block under a condition that the period of transmitting the synchronization signal block is set by an upper layer, and wherein the circuitry is configured to receive the synchronization signal block by determining an initial period of transmitting the synchronization signal block under a condition that the period of transmitting the synchronization signal block is not set by the upper layer.

8. A method to be executed by a processor, the method comprising:

receiving a synchronization signal block composed of a synchronization signal and PBCH (Physical Broadcast Channel);

receiving a physical channel including PDSCH (Physical Downlink Shared Channel), the PDSCH being scheduled by PDCCH (Physical Downlink Control Channel), and the PDCCH being located in a common search space and being added CRC (Cyclic Redundancy Check) which is scrambled by SI-RNTI (System Information Radio Network Temporary Identifier); and setting configuration of connection to a cell, based on first system information included in the PBCH, and second system information included in the PDSCH, wherein a resource of the physical channel scheduled for the PDSCH is determined based on the first system information and an index of the synchronization signal block.

9. A non-transitory computer readable medium having a program, when executed, the program causing a computer to perform operations comprising:

receiving a synchronization signal block composed of a synchronization signal and PBCH (Physical Broadcast Channel);

receiving a physical channel including PDSCH (Physical Downlink Shared Channel), the PDSCH being scheduled by PDCCH (Physical Downlink Control Channel), and the PDCCH being located in a common search space and being added CRC (Cyclic Redundancy Check) which is scrambled by SI-RNTI (System Information Radio Network Temporary Identifier); and setting configuration of connection to a cell, based on first system information included in the PBCH, and second system information included in the PDSCH, wherein a resource of the physical channel scheduled for the PDSCH is determined based on the first system information and an index of the synchronization signal block.

* * * * *